United States Patent [19]
Biederman et al.

[11] Patent Number: 5,842,267
[45] Date of Patent: Dec. 1, 1998

[54] METHOD AND APPARATUS FOR FORMING PARTS OF A PREDETERMINED SHAPE FROM A CONTINUOUS STOCK MATERIAL

[75] Inventors: Ronald R. Biederman, Vernon, Conn.; Thomas Trevor Bludis, Reisterstown; Stephen R. Crosby, Whitehall, both of Md.; Kyle J. Eppley, Norristown, Pa.; Charles P. Gure, Westboro, Mass.; Timothy T. McKenzie, Baltimore, Md.; Gregory H. Selke, West Chester, Pa.; Paul Andrew Stone, Glen Rock, Pa.; Jeffrey W. Tartamella, York, Pa.; Rickey James Thomas, Lineboro, Md.; Charles T. Wetherington, Oakville, Canada

[73] Assignee: Black & Decker, Inc., Newark, Del.

[21] Appl. No.: 662,665

[22] Filed: Jun. 14, 1996

Related U.S. Application Data

[63] Continuation-in-part of Ser. No. 514,071, Aug. 11, 1995, Pat. No. 5,697,738, which is a continuation-in-part of Ser. No. 366,986, Dec. 30, 1994, Pat. No. 5,700,113.

[51] Int. Cl.$^6$ ............................. B23B 51/00; B23P 23/00
[52] U.S. Cl. ............................. 29/558; 29/33 P; 29/34 R; 29/563; 29/564; 76/108.1; 72/185; 72/338; 72/402; 83/73; 83/209; 408/1 R; 408/224; 408/228
[58] Field of Search .................................... 408/1 R, 224, 408/225, 228, 227; 29/34 R, 563, 564, 33 P, 33 Q, 557, 558; 76/101.1, 108.1, 108.6; 72/185, 338, 340, 341, 373, 375, 402, 414, 470; 83/33, 73, 209

[56] References Cited

U.S. PATENT DOCUMENTS

| 85,107 | 12/1868 | LeCount . |
|---|---|---|
| D. 240,263 | 6/1976 | Southall . |
| D. 278,065 | 3/1985 | Sydlowski et al. . |
| 606,319 | 6/1898 | Watrous . |
| 1,004,902 | 10/1911 | Potter . |
| 1,335,980 | 4/1920 | Mueller . |
| 1,418,485 | 6/1922 | Smith ..................................... 408/224 |
| 1,483,082 | 2/1924 | Dosimont . |
| 1,595,588 | 8/1926 | Tuttle . |
| 1,625,131 | 4/1927 | Miller . |
| 1,738,032 | 12/1929 | Behrman et al. . |
| 2,063,753 | 12/1936 | Pohlman . |

(List continued on next page.)

FOREIGN PATENT DOCUMENTS

| 1097104 | 3/1981 | Canada . |
|---|---|---|
| 118 806 | 9/1984 | European Pat. Off. . |
| 2 636 182 | 2/1978 | Germany . |
| 4 207 964 | 3/1992 | Germany . |
| 56-74343 | 6/1981 | Japan . |
| 63-52730 | 3/1988 | Japan . |
| 547268 | 4/1977 | U.S.S.R. . |
| 1 277 117 | 7/1972 | United Kingdom . |
| 2 130 935 | 6/1984 | United Kingdom . |
| 2 271 948 | 5/1994 | United Kingdom . |

*Primary Examiner*—Daniel W. Howell
*Attorney, Agent, or Firm*—Bell Seltzer Intellectual Property Group of Alston & Bird, LLP

[57] ABSTRACT

The present invention provides a method and apparatus for forming a plurality of parts, such as spade-type boring bits, from a continuous stock material. Thus, the various steps of the forming method of the present invention can be performed to predetermined portions of the continuous stock material, prior to separating the continuous stock material into a number of discrete parts. The efficiency of the forming process is enhanced since individual parts need not be individually transported and oriented during the forming operations. By not requiring that the individual parts be separately transported and oriented during the forming operations, the quality of the parts formed by the forming method and apparatus of the present invention will also be enhanced since such separate transportation and orientation of individual parts generally increases the opportunities for misalignment and contributes to poor tolerance control during the manufacturing process.

95 Claims, 28 Drawing Sheets

U.S. PATENT DOCUMENTS

| | | | |
|---|---|---|---|
| 2,091,128 | 8/1937 | Anderson . | |
| 2,159,842 | 5/1939 | Cook . | |
| 2,206,292 | 7/1940 | Rosenberg . | |
| 2,225,345 | 12/1940 | Lamoreaux | 72/402 |
| 2,310,675 | 2/1943 | Boyce . | |
| 2,326,106 | 8/1943 | Van Ness et al. . | |
| 2,332,295 | 10/1943 | Bouchal . | |
| 2,335,791 | 11/1943 | Rea . | |
| 2,360,080 | 10/1944 | Steinberg . | |
| 2,403,651 | 7/1946 | Fulke . | |
| 2,526,489 | 10/1950 | Liddicoat . | |
| 2,627,292 | 2/1953 | Kronwall . | |
| 2,645,138 | 7/1953 | Mitchhart . | |
| 2,659,406 | 11/1953 | Locke . | |
| 2,681,673 | 6/1954 | Mackey . | |
| 2,692,627 | 10/1954 | Stearns . | |
| 2,697,951 | 12/1954 | Müller . | |
| 2,748,460 | 6/1956 | Ulrich . | |
| 2,765,760 | 10/1956 | Lyon . | |
| 2,782,824 | 2/1957 | Robinson . | |
| 2,794,468 | 6/1957 | Huxtable . | |
| 2,883,888 | 4/1959 | Stewart . | |
| 2,905,031 | 9/1959 | Appel et al. . | |
| 2,962,066 | 11/1960 | Deliso . | |
| 2,978,932 | 4/1961 | Frueauff, Jr. . | |
| 3,045,515 | 7/1962 | Kralowetz . | |
| 3,154,978 | 11/1964 | Baker | 72/402 |
| 3,292,412 | 12/1966 | Costabile . | |
| 3,354,690 | 11/1967 | Beckwell . | |
| 3,381,515 | 5/1968 | Orloff . | |
| 3,504,575 | 4/1970 | Makino et al. . | |
| 3,603,130 | 9/1971 | Ruget . | |
| 3,613,432 | 10/1971 | Schenk et al. . | |
| 3,802,244 | 4/1974 | Jackman | 72/402 |
| 3,805,580 | 4/1974 | Leiker . | |
| 3,824,026 | 7/1974 | Gaskins . | |
| 3,850,494 | 11/1974 | Nebendorf . | |
| 3,920,350 | 11/1975 | Southall . | |
| 3,972,585 | 8/1976 | Dalgleish et al. . | |
| 3,997,279 | 12/1976 | Porter . | |
| 4,004,446 | 1/1977 | Dalgleish et al. . | |
| 4,012,970 | 3/1977 | Hintz et al. . | |
| 4,050,841 | 9/1977 | Hildebrandt . | |
| 4,107,964 | 8/1978 | Smith | 72/402 |
| 4,252,011 | 2/1981 | MacNitt, Jr. et al. . | |
| 4,265,105 | 5/1981 | MacNitt, Jr. et al. . | |
| 4,286,904 | 9/1981 | Porter et al. . | |
| 4,306,442 | 12/1981 | Schröck . | |
| 4,312,211 | 1/1982 | MacNitt, Jr. et al. . | |
| 4,339,940 | 7/1982 | MacKay et al. . | |
| 4,530,229 | 7/1985 | Walker . | |
| 4,531,396 | 7/1985 | MacNitt, Jr. et al. . | |
| 4,578,982 | 4/1986 | Schröck . | |
| 4,620,822 | 11/1986 | Haque et al. . | |
| 4,625,593 | 12/1986 | Schmotzer . | |
| 4,682,917 | 7/1987 | Williams, III et al. . | |
| 4,722,216 | 2/1988 | Fencl . | |
| 4,753,558 | 6/1988 | Jansson . | |
| 4,774,828 | 10/1988 | Schröck . | |
| 4,796,456 | 1/1989 | Schmoll et al. . | |
| 4,836,006 | 6/1989 | Brown . | |
| 4,838,062 | 6/1989 | Prenn . | |
| 4,942,756 | 7/1990 | Charzewski . | |
| 4,950,111 | 8/1990 | Thomas . | |
| 4,984,445 | 1/1991 | Ohuchi et al. . | |
| 4,996,863 | 3/1991 | Keeler . | |
| 5,010,759 | 4/1991 | Yokomizo et al. . | |
| 5,056,967 | 10/1991 | Hageman . | |
| 5,061,127 | 10/1991 | Thomas . | |
| 5,099,993 | 3/1992 | Schimke et al. . | |
| 5,145,018 | 9/1992 | Schimke et al. . | |
| 5,149,234 | 9/1992 | Durfee, Jr. . | |
| 5,184,689 | 2/1993 | Sheirer et al. . | |
| 5,193,951 | 3/1993 | Schimke . | |
| 5,221,166 | 6/1993 | Bothum . | |
| 5,229,441 | 7/1993 | Shinjo . | |
| 5,286,143 | 2/1994 | Schimke . | |
| 5,291,806 | 3/1994 | Bothum . | |
| 5,323,697 | 6/1994 | Shröck . | |
| 5,335,530 | 8/1994 | Homm . | |
| 5,433,561 | 7/1995 | Schimke . | |
| 5,452,970 | 9/1995 | Sundstrom et al. . | |
| 5,697,738 | 12/1997 | Stone et al. | 408/225 |
| 5,700,113 | 12/1997 | Stone et al. | 408/225 |

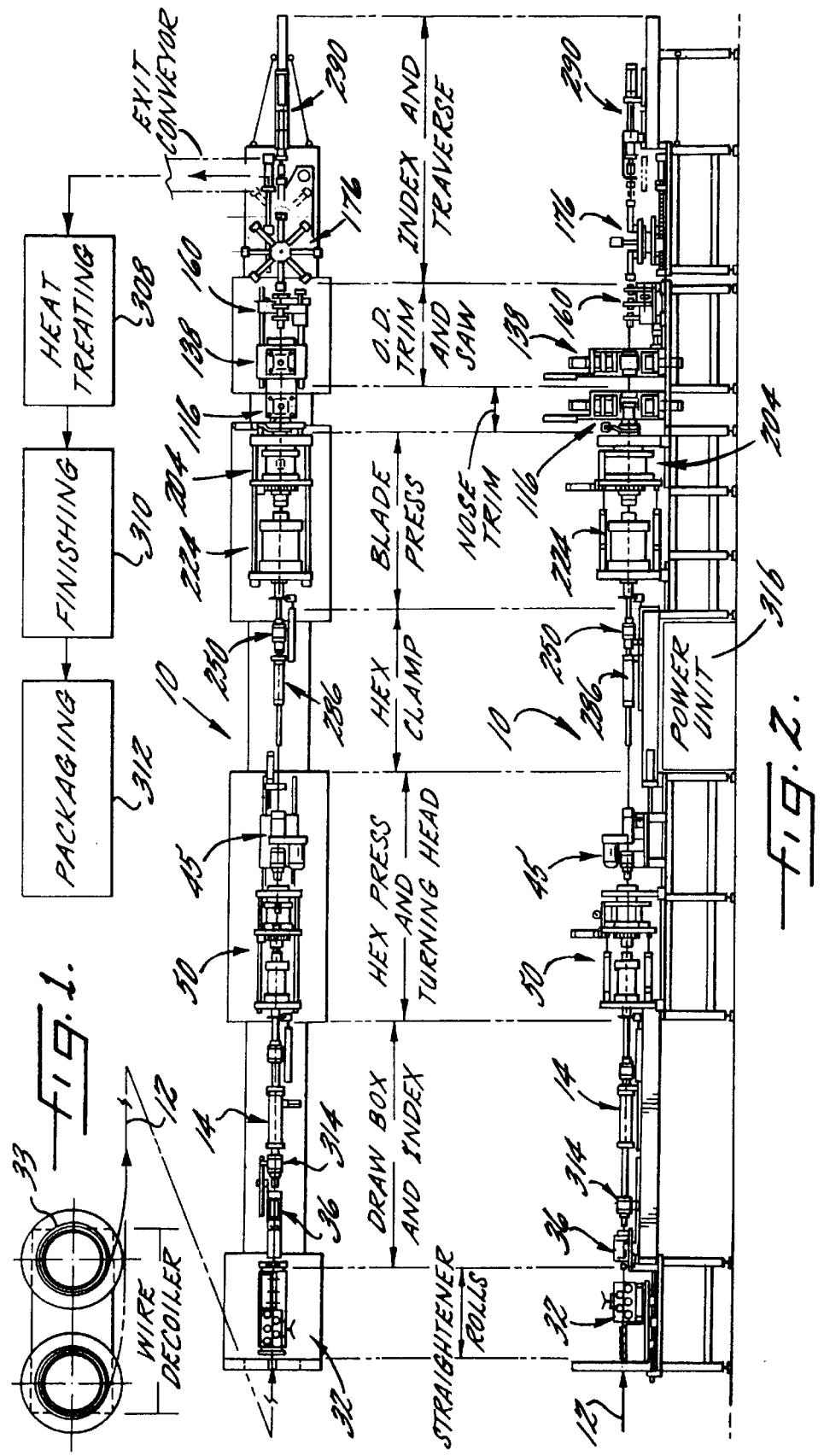

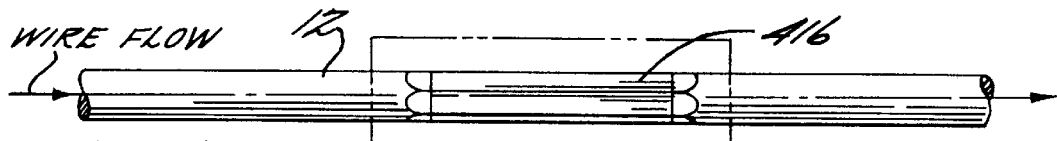
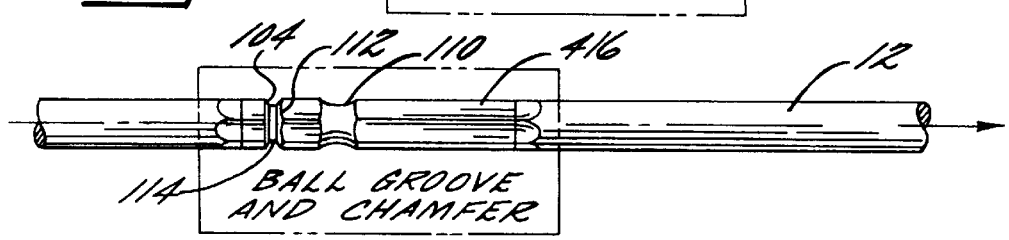
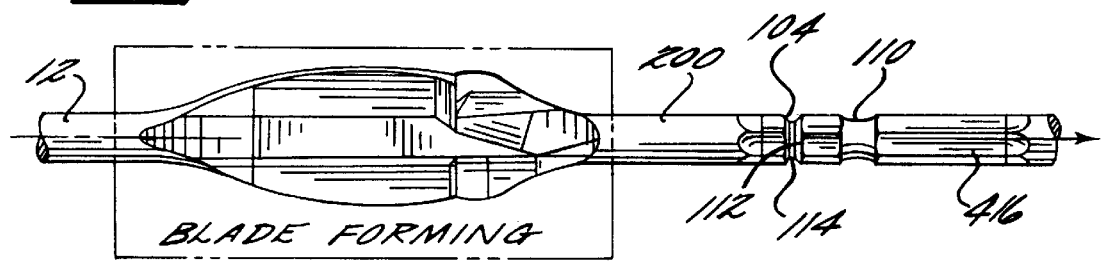
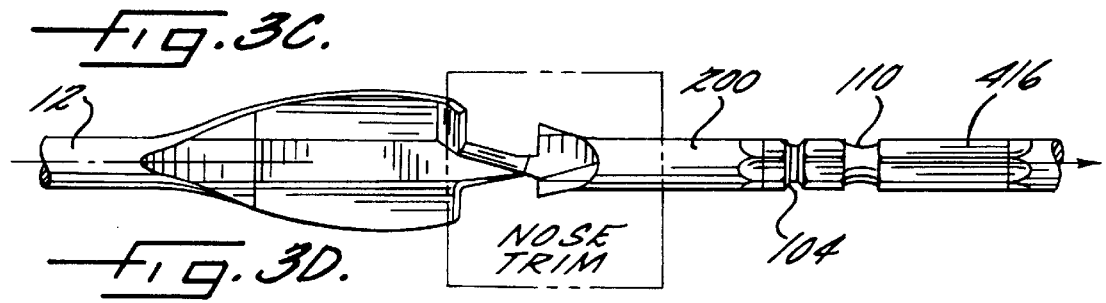
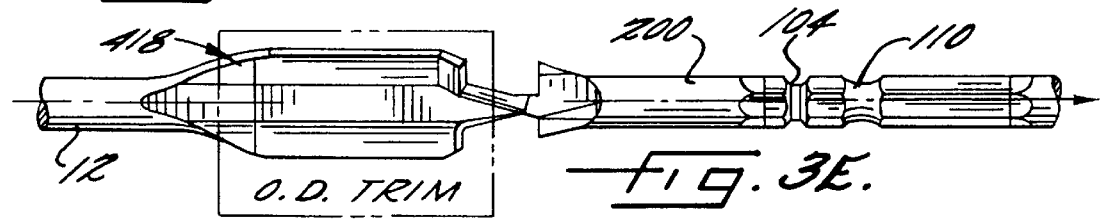
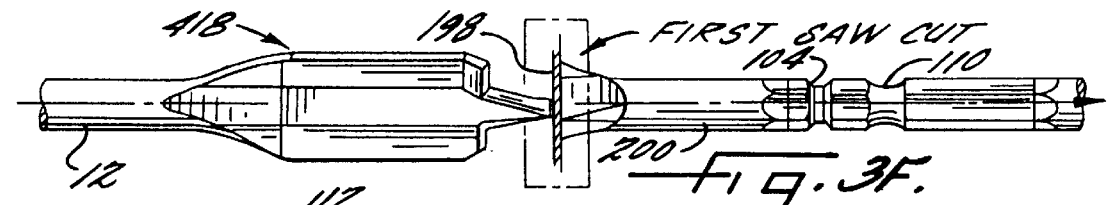
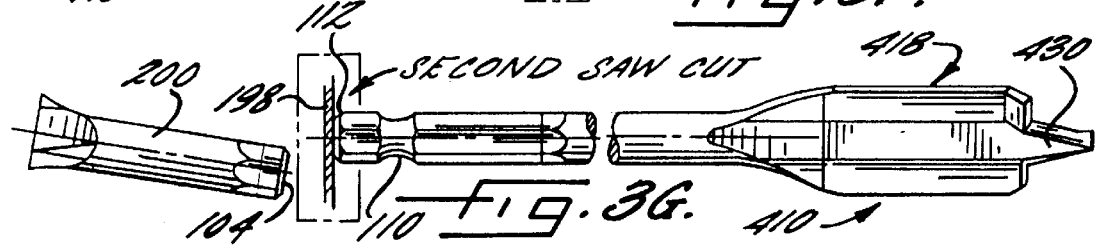

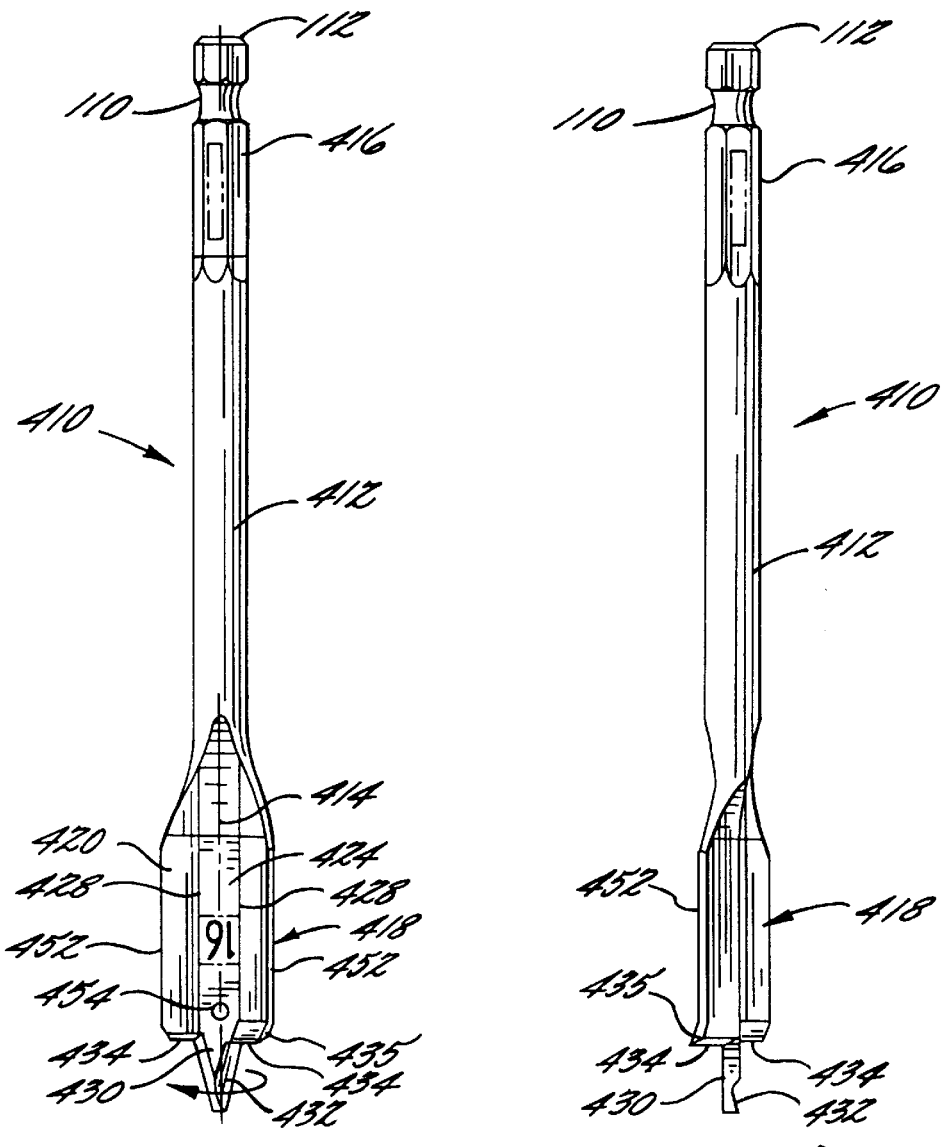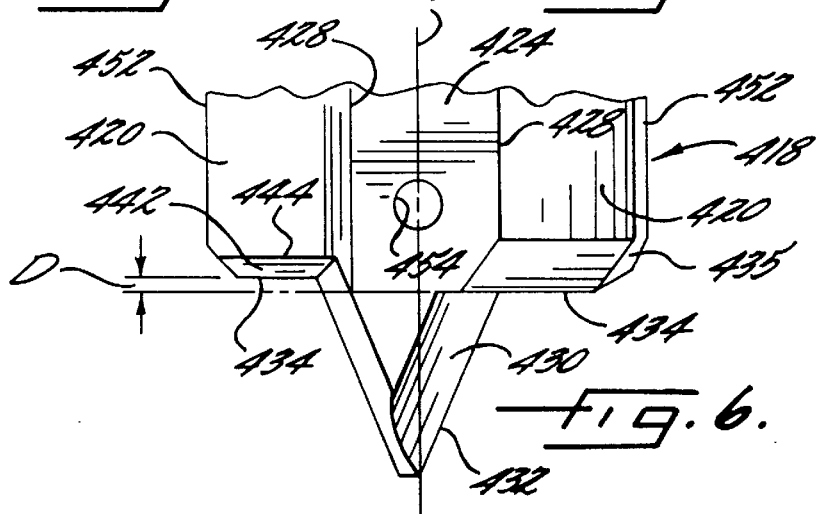

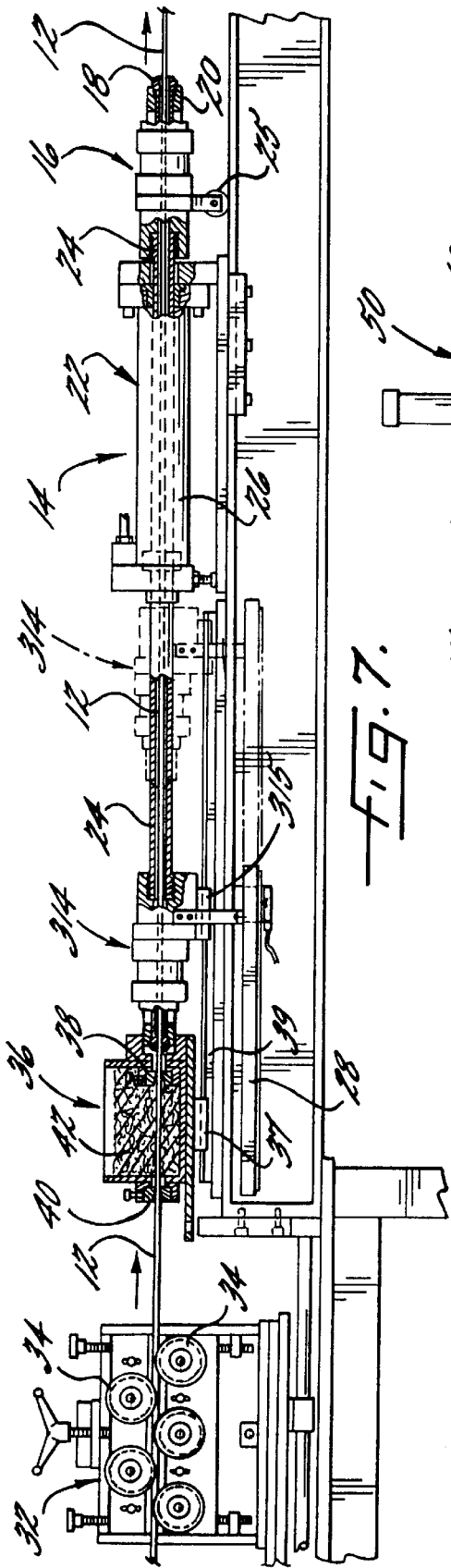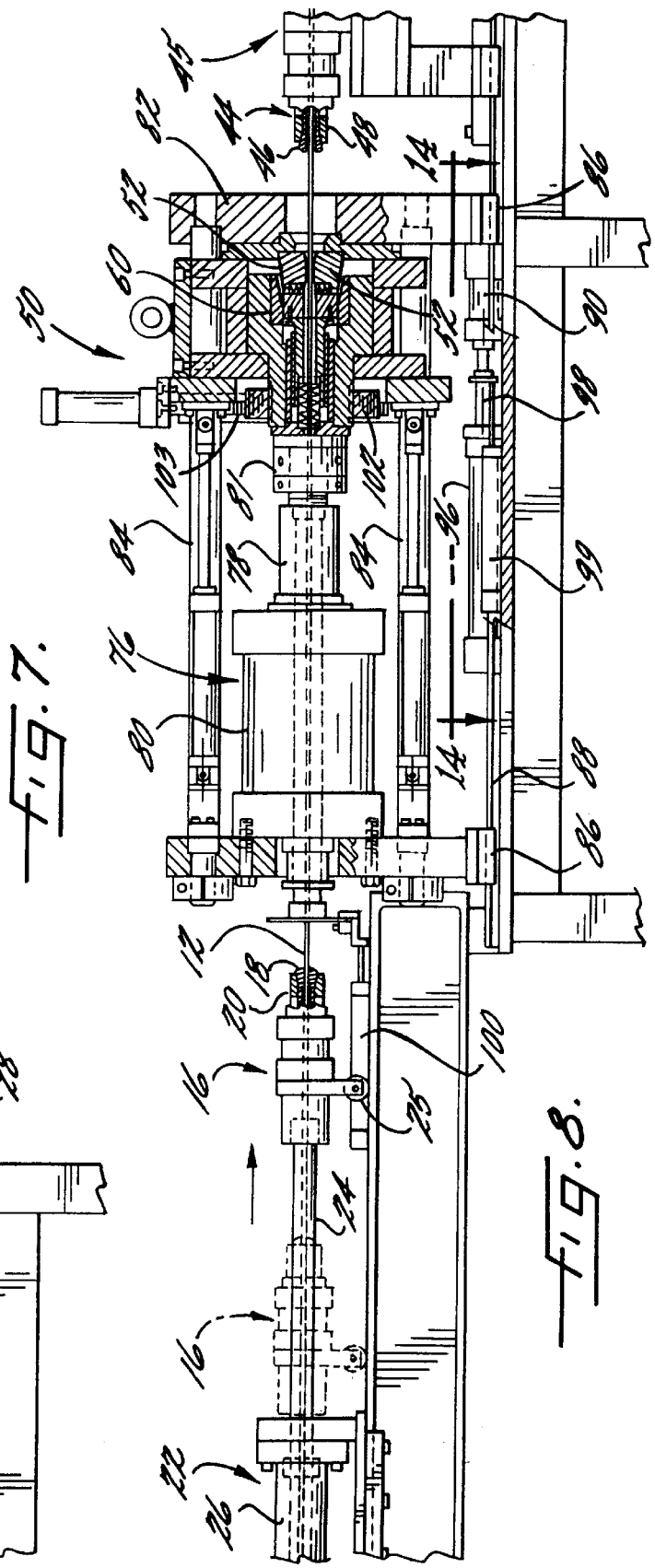

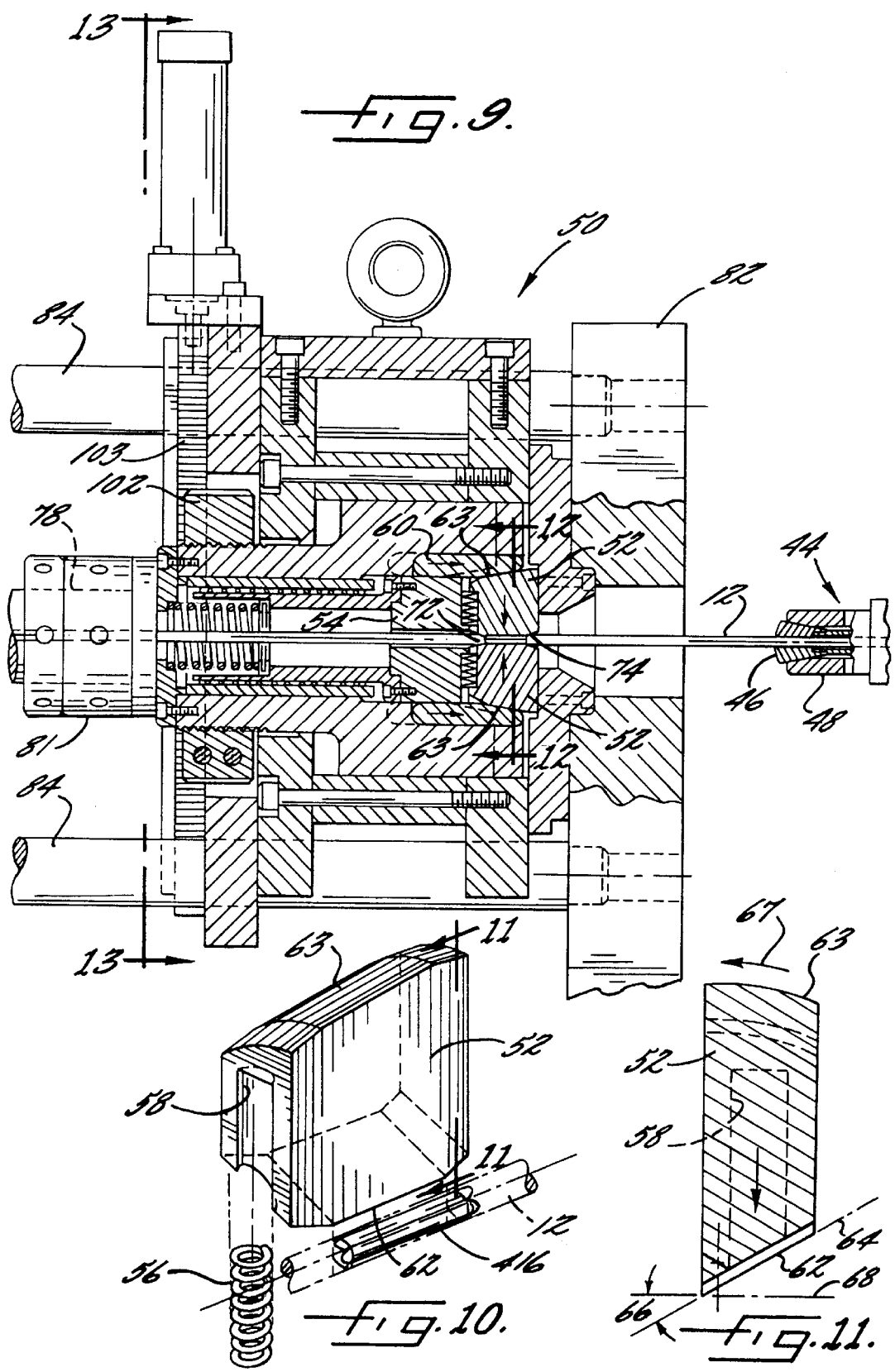

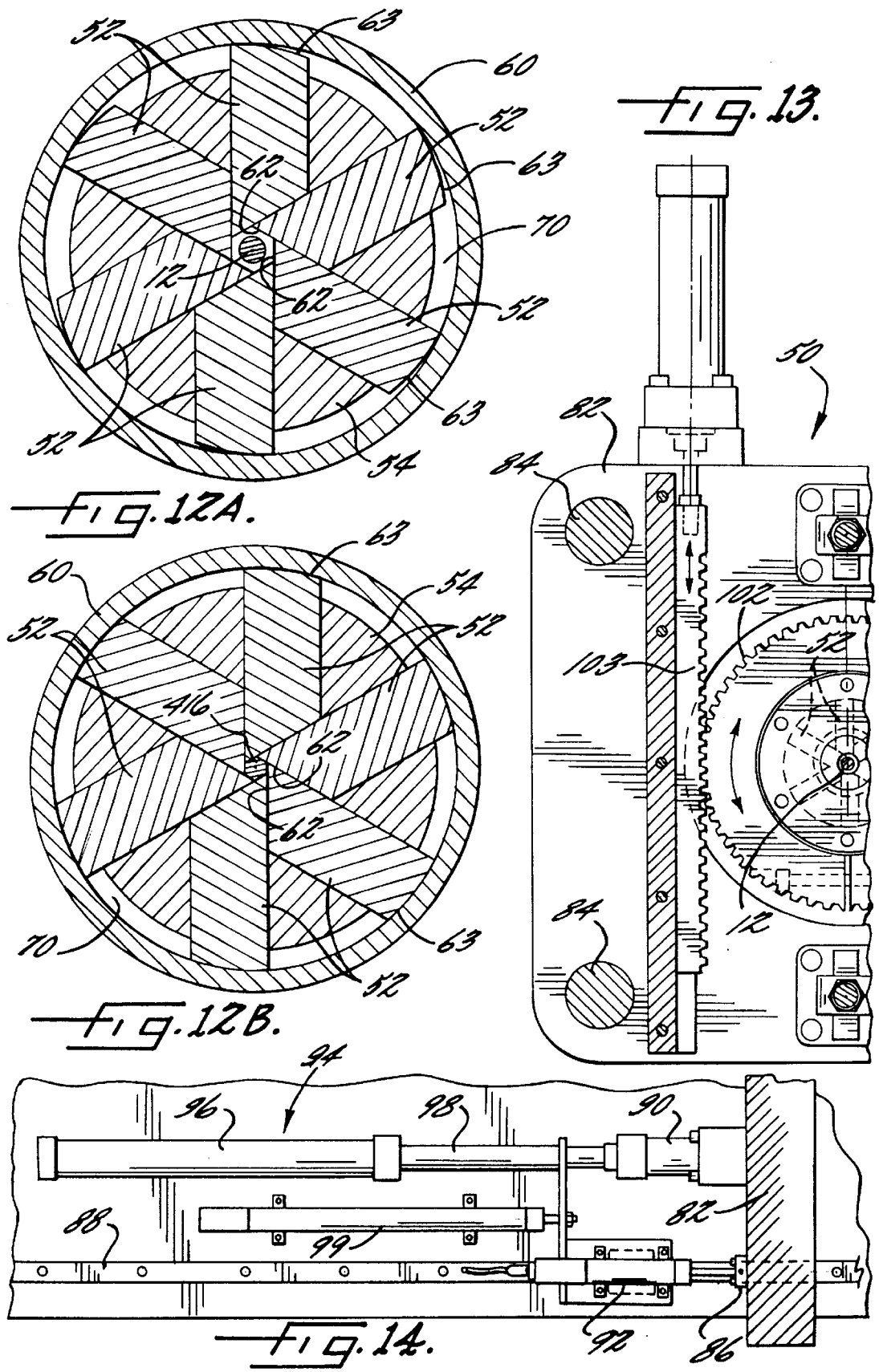

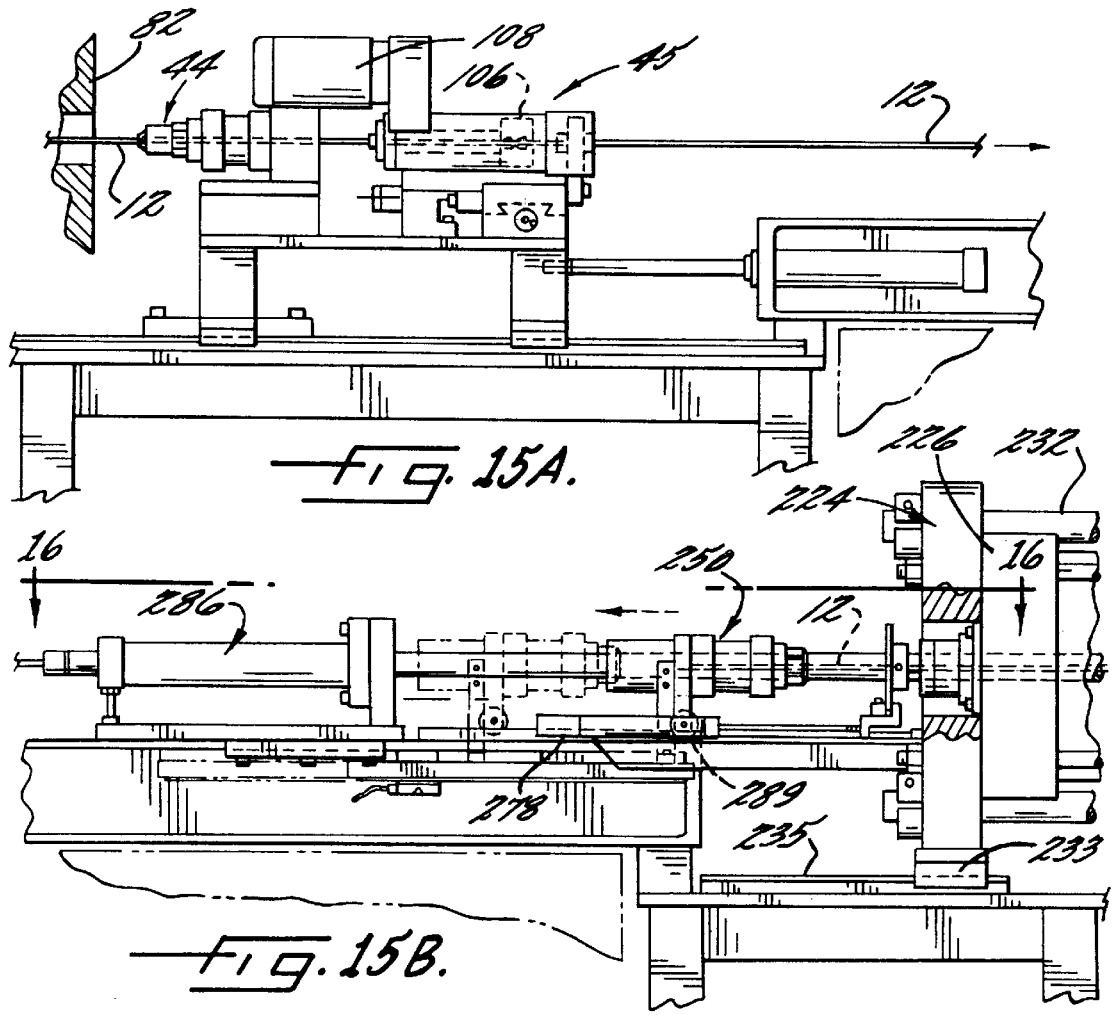
Fig. 15A.
Fig. 15B.
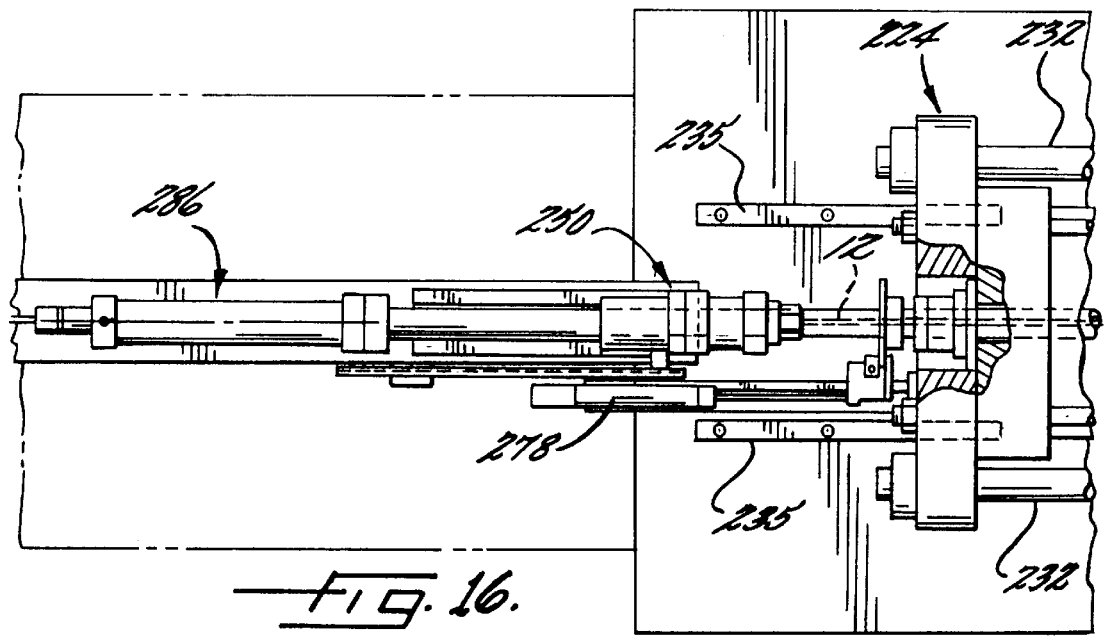
Fig. 16.

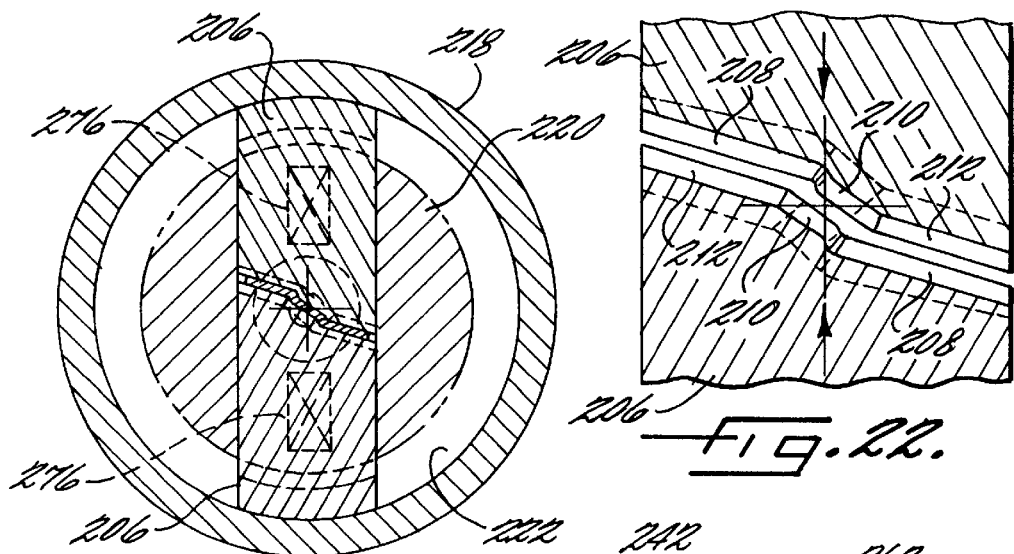
FIG. 21.
FIG. 22.
FIG. 23.
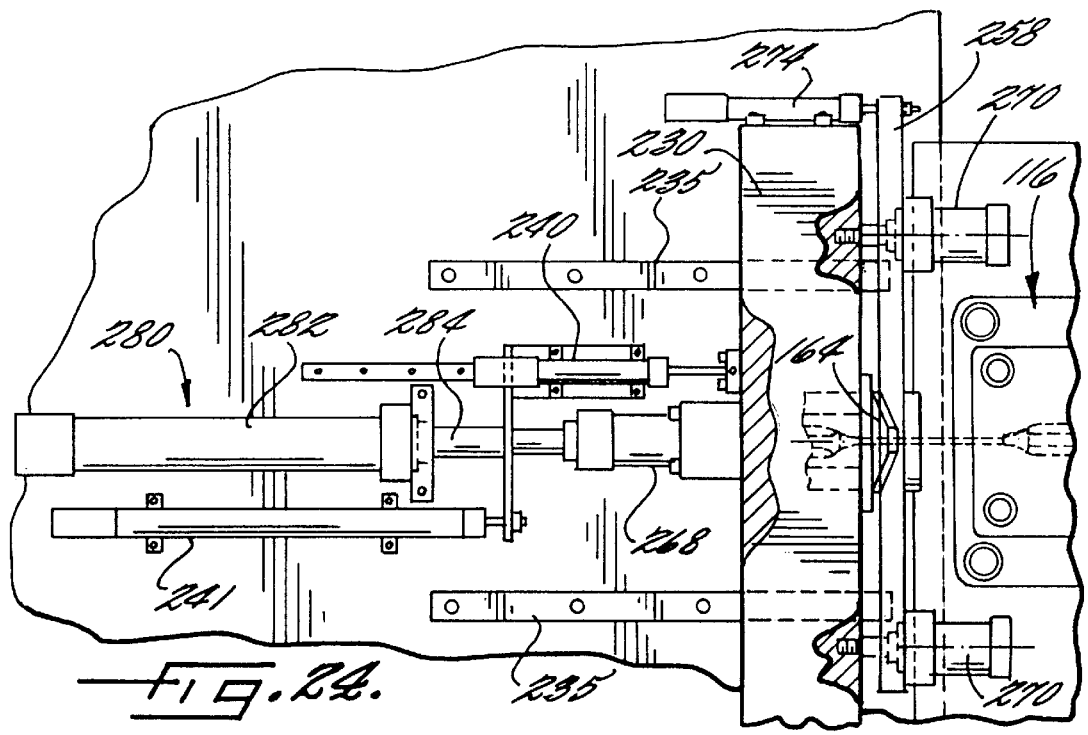
FIG. 24.

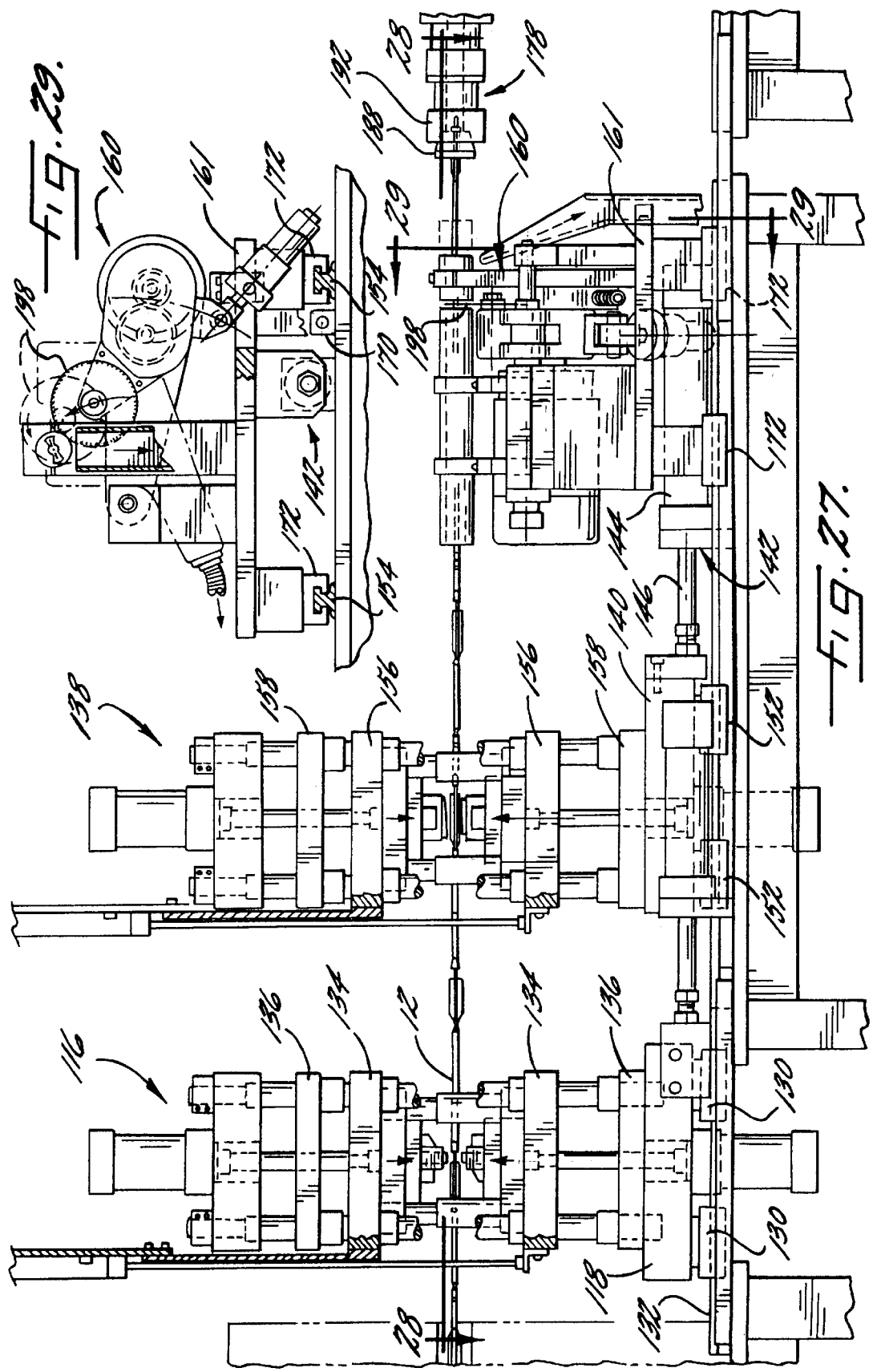

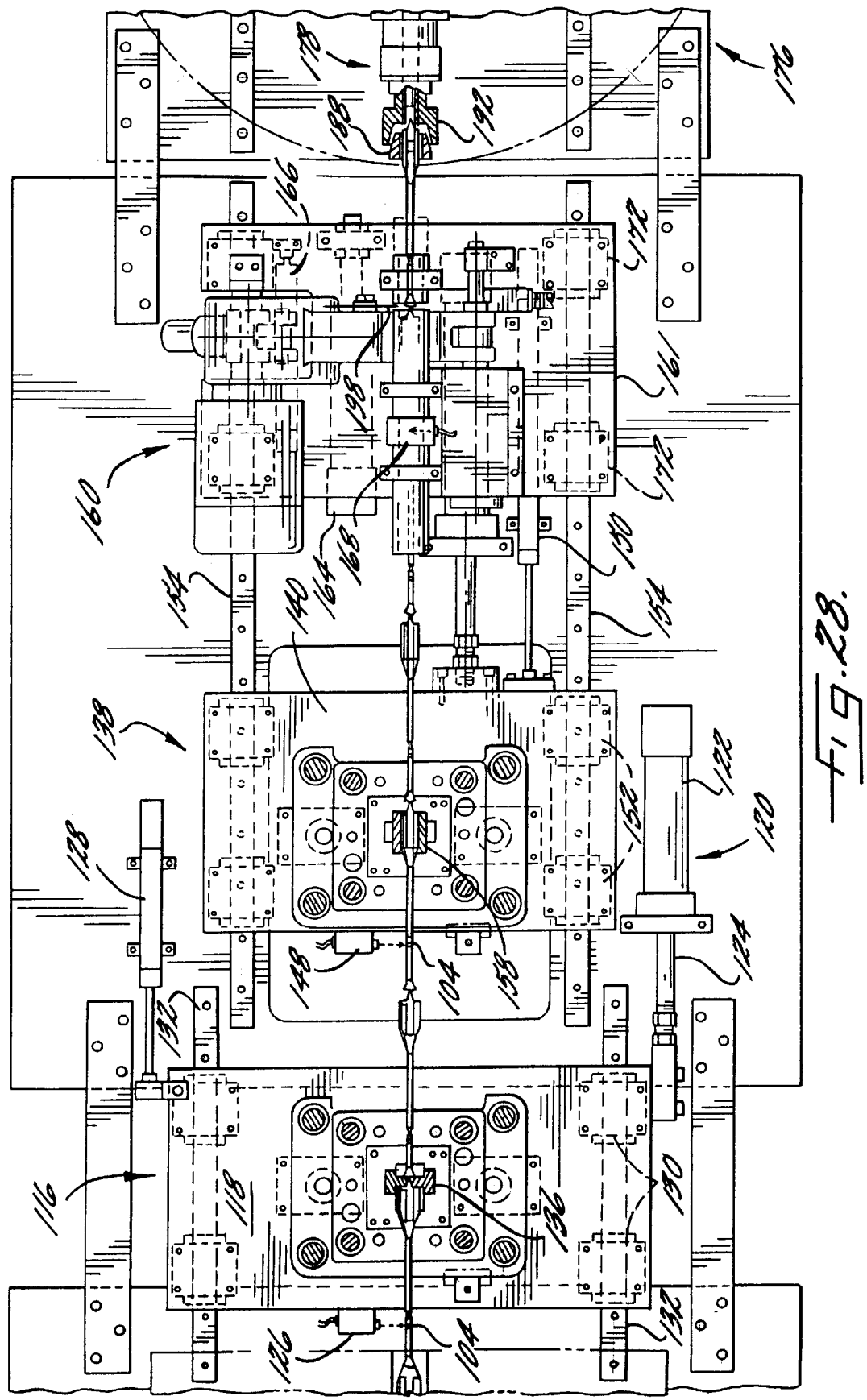

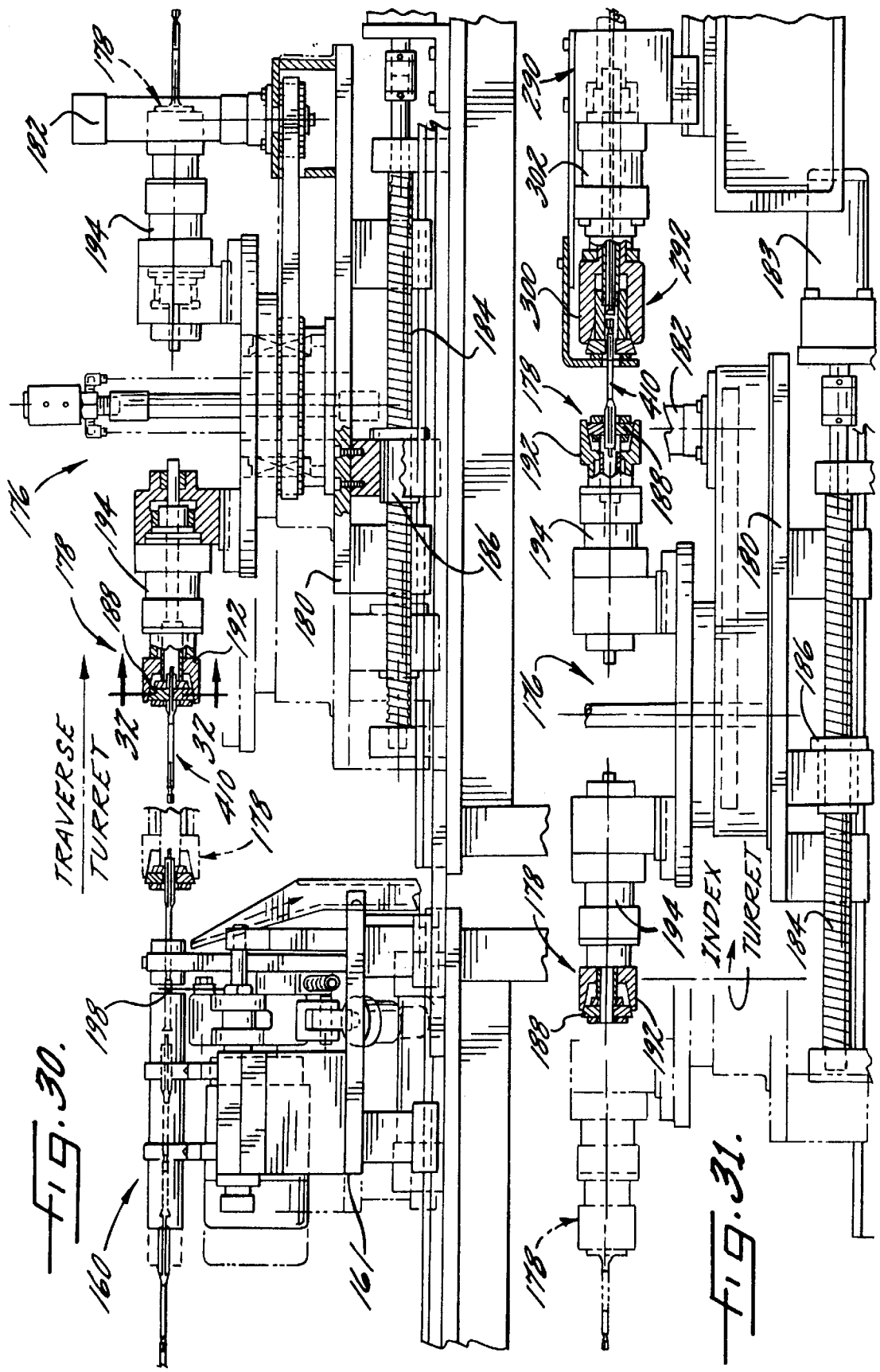

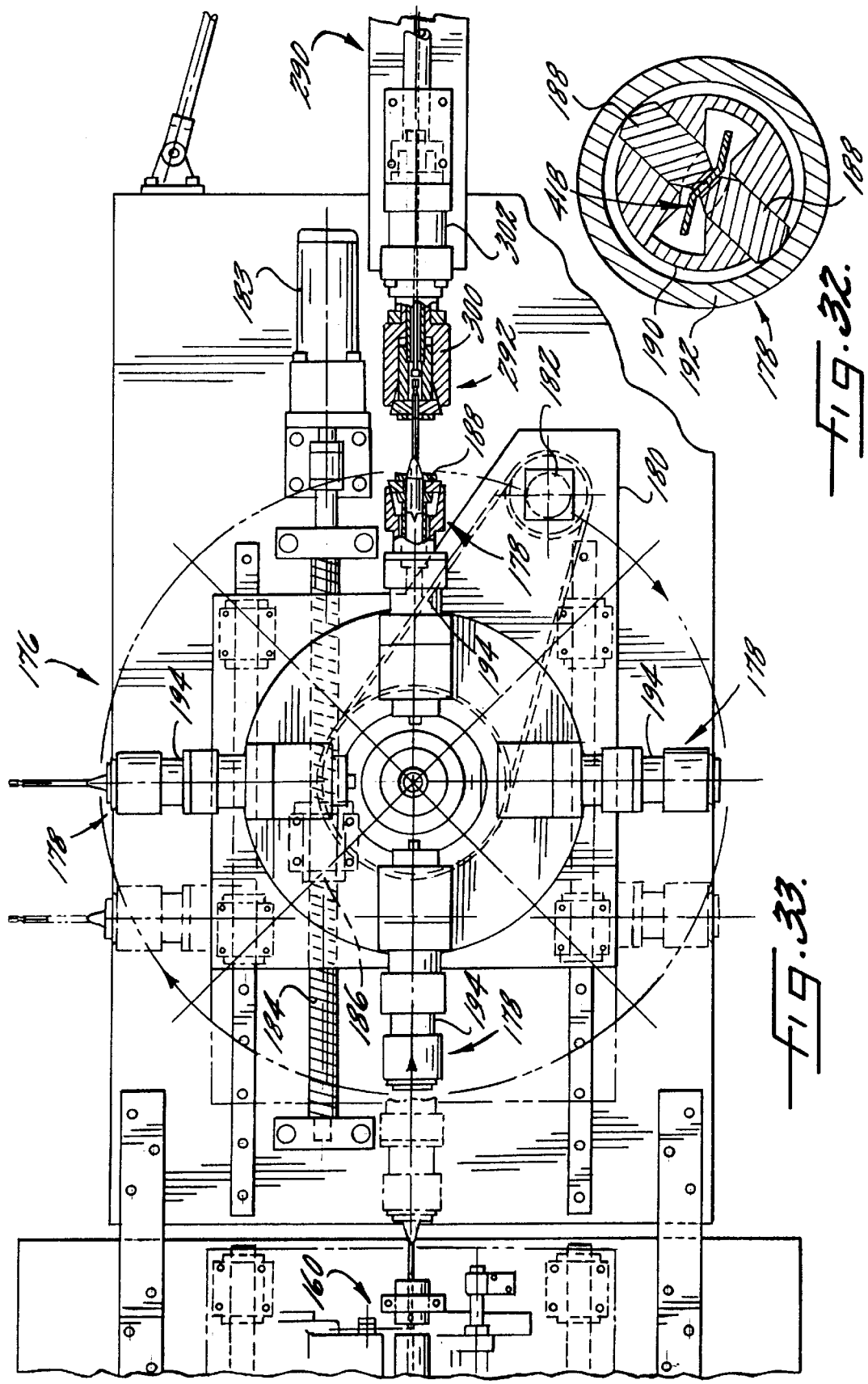

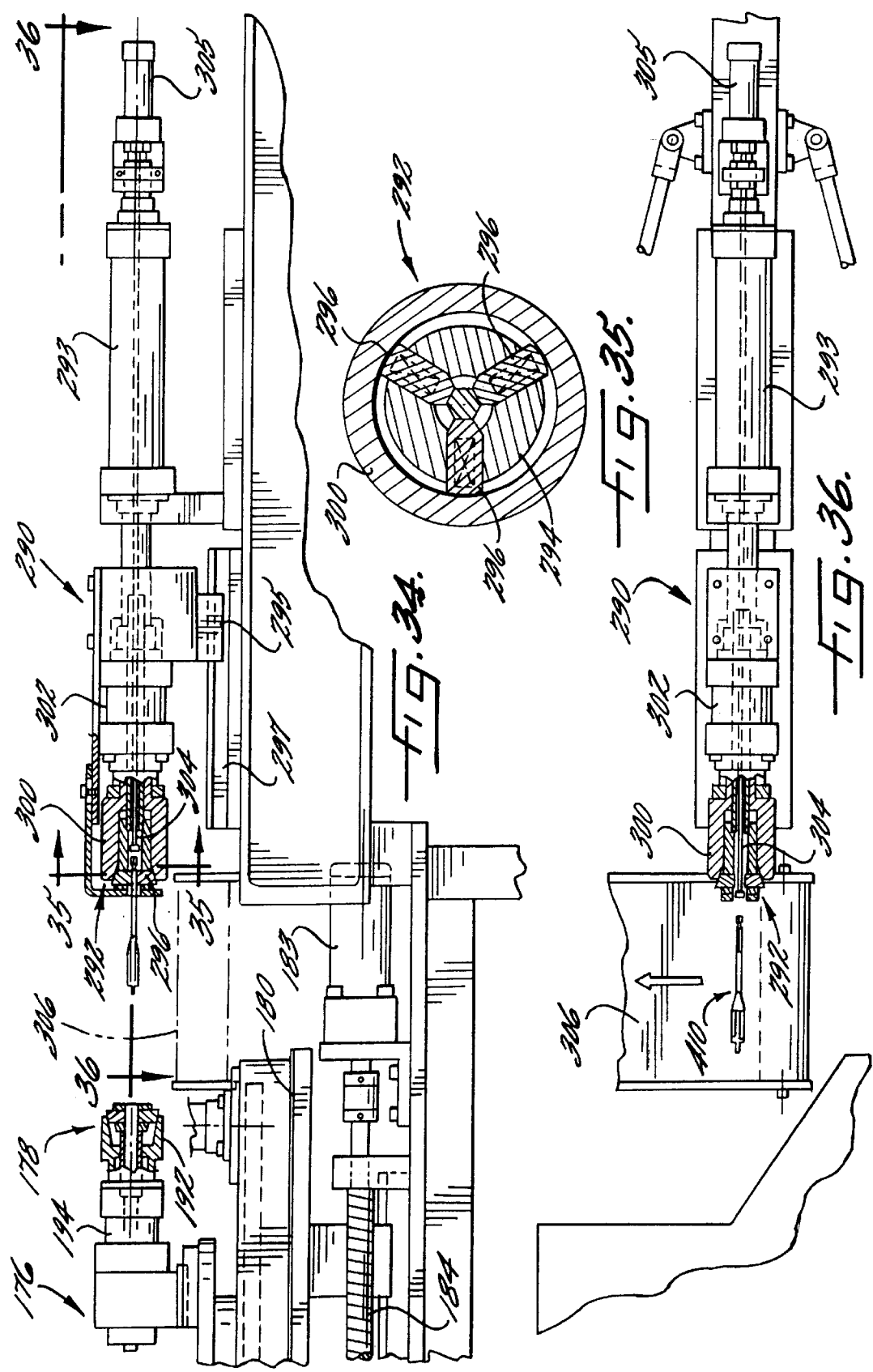

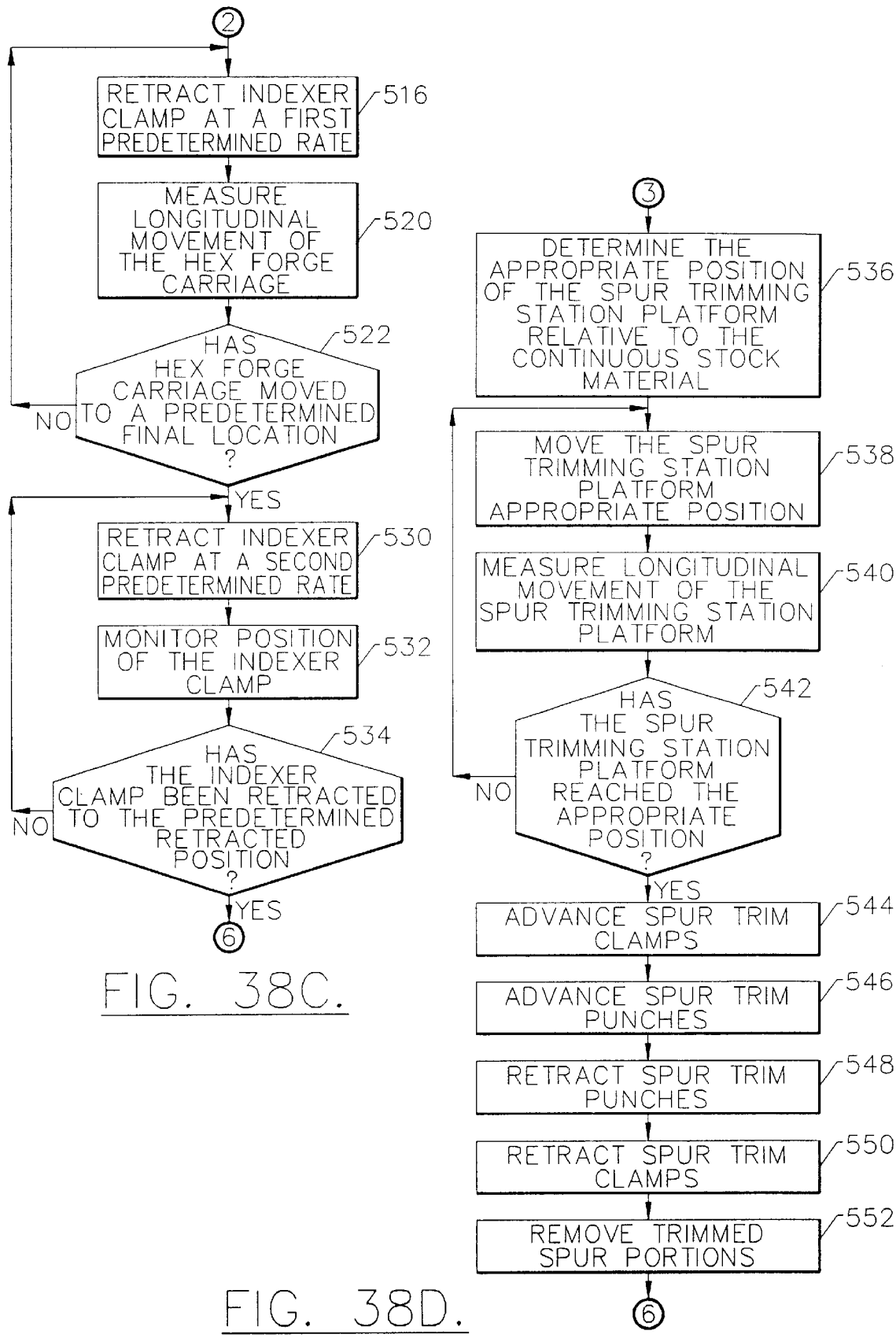

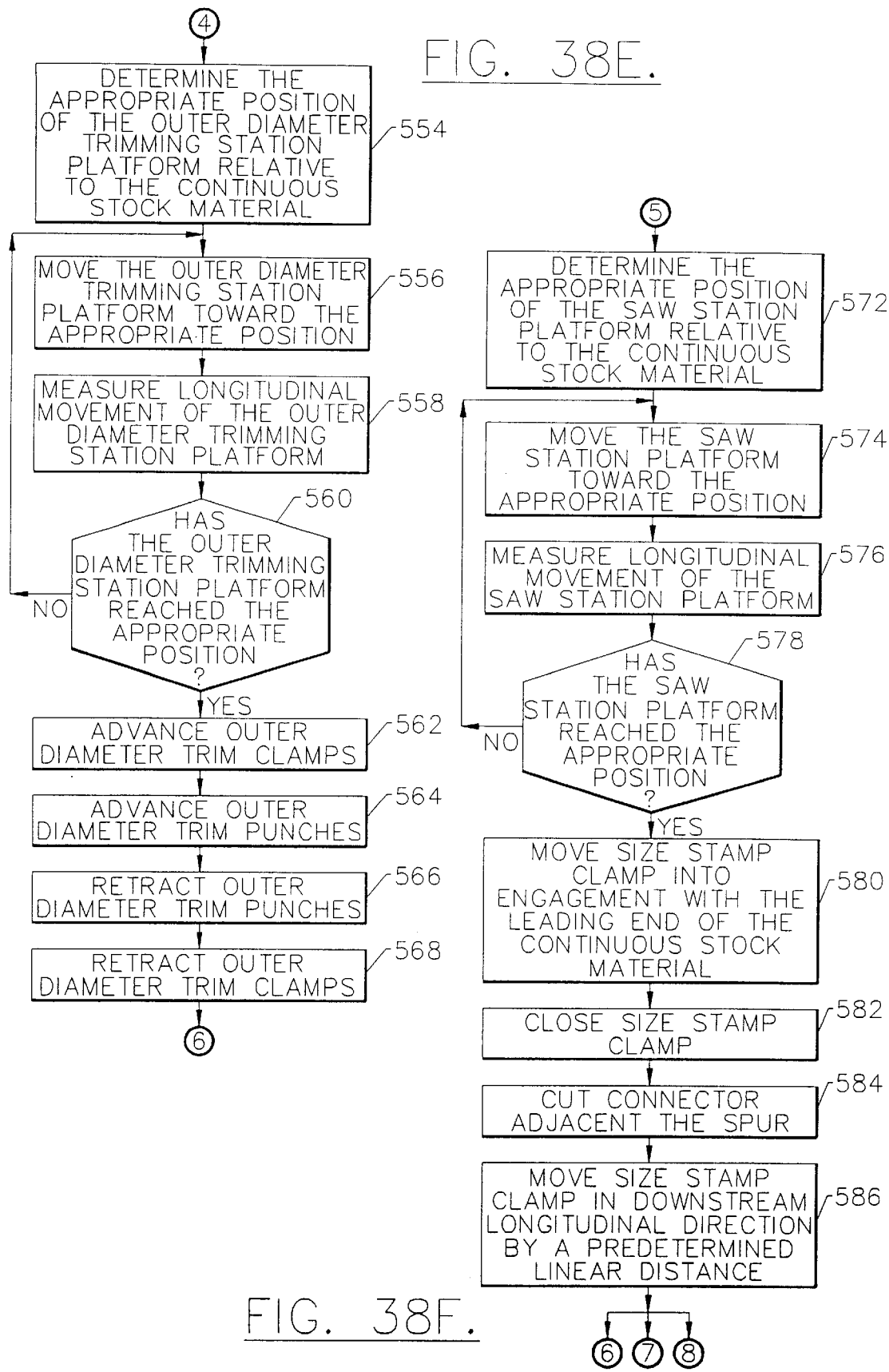

METHOD AND APPARATUS FOR FORMING PARTS OF A PREDETERMINED SHAPE FROM A CONTINUOUS STOCK MATERIAL

RELATED APPLICATIONS

This application is a continuation-in-part of U.S. patent application Ser. No. 08/514,071, filed Aug. 11, 1995, U.S. Pat. No. 5,697,738, which is a C-I-P of Ser. No. 08/366,986, filed Dec. 30, 1994, now U.S. Pat. No. 5,700,113, the contents of both of which are expressly incorporated in their entirety herein.

FIELD OF THE INVENTION

The present invention relates generally to methods and apparatus for forming parts of a predetermined shape, such as drill bits and, more particularly, spade-type boring bits, from a continuous stock material.

BACKGROUND OF THE INVENTION

Each day, a myriad of metal and plastic parts of a variety of predetermined shapes are manufactured, such as by a forging process in which a permanent change in the shape of the part occurs. These parts are oftentimes manufactured in large quantities and are used in many different applications. For example, a number of tools, such as drill bits, screwdriver bits, router bits, percussion bits and jigsaw and reciprocating saw blades, are produced in mass quantities every day. Likewise, a number of other parts, such as fasteners, impact wrench anvils, coil and ballpoint chisels, gears, shafts, equalizer beams and actuator rods, are also manufactured in large quantities every day.

Accordingly, a number of manufacturing processes have been developed to form parts of a predetermined shape in large numbers. These manufacturing processes generally include a number of independent operations or steps which are performed in a predetermined sequence in order to create parts of the desired shape. For example, typical processes for manufacturing metal parts generally include forging operations, trimming operations, heat-treating operations and grinding and other finishing operations.

These manufacturing processes are typically designed to form a number of discrete workpieces into respective parts of a predetermined shape. Thus, these conventional manufacturing processes generally include an initial step of providing a number of discrete workpieces of the desired size and length. For example, a metal wire or rod can be cut into a number of discrete pieces prior to beginning the actual manufacturing process. Thereafter, the plurality of discrete workpieces are individually processed in order to create a plurality of parts of the predetermined shape.

As a result, each discrete part must generally be collected following every operation of these conventional manufacturing processes such that the part can be transported to the next stage or operation of the manufacturing process. In addition, since the parts must generally be aligned in a predetermined manner during each operation of these manufacturing processes, each part must generally be individually oriented prior to each next stage of the manufacturing process. Thus, even though parts are generally collected and transported between stages of these manufacturing processes in batches, these conventional manufacturing processes still generally require extensive handling of the parts in order to collect, transport and properly orient the parts between each stage of these manufacturing processes. These conventional manufacturing processes also typically require a relatively large number of parts to be in process at all times due to the batch-type processing. As will be apparent, the time and labor required to collect, transport and properly orient parts during these conventional manufacturing processes decreases the efficiency with which these parts are fabricated and, correspondingly, increases the cost of the resulting parts.

The inefficiencies created by handling and processing a plurality of discrete parts and the increased costs of maintaining a relatively large number of partially formed parts in process are particularly significant for those manufacturing processes which are designed to produce a large number of parts each day, such as tens of thousands, if not hundreds of thousands, of parts each day. For example, conventional manufacturing processes which produce metallic parts, such as drill bits, router bits, fasteners, percussion bits, jig saw and reciprocating saw blades, impact wrench anvils, coil and ballpoint chisels, gears, shafts, screwdriver bits, equalizer beams and actuator rods, generally produce parts at rates up to thousands or more per day.

In order to demonstrate the inherent inefficiencies of these conventional manufacturing processes which individually process a large number of discrete parts, the manufacturing process employed to form spade-type boring bits (hereinafter referred to as "spade-bits") is described hereinafter. Spade bits are typically formed by a hot forging process. According to this process, a coil of wire stock of a given diameter is cut into pieces, each of which is approximately the length of an individual spade bit. Each piece is then headed to form a portion of material with an increased diameter at the first end of the segment, i.e., a bulb of material having an increased diameter over a shorter length at the first end. Either during this initial heated process or following further heating of the bulb of material, the part is forged by compressing the heated bulb of material between a pair of opposed dies. Typically, the pair of opposed dies are closed in a rectilinear manner such that the heated bulb of material is subjected to compressive forces which displace the material into the predetermined fixed boundary shape defined by the dies. The forged part can then be trimmed and finished to produce spade bits such as those described above. An identification mark can also be stamped on the spade bit during its processing.

By initially cutting the wire stock and/or billets into a number of discrete pieces, however, the parts must be individually handled and processed throughout the hot forging process, thereby decreasing the efficiency with which the spade bits are fabricated and, correspondingly, increasing the resulting costs of the spade bits. For example, each individual part must be collected following each stage of the fabrication process and transported to the next stage. In addition, each individual part must be appropriately aligned during each step of the process to ensure that the input shape of the part serves as a proper and admissible preform to satisfy the requirement of each subsequent die operation, including die fill, such that the resulting spade bits meet the desired product tolerances.

SUMMARY OF THE INVENTION

In view of the foregoing background, it is an object of the present invention to provide a method and apparatus for manufacturing a plurality of parts of a predetermined shape which reduces the handling, orienting and processing of individual parts during the manufacturing process.

It is also an object of the present invention to provide a method and apparatus for manufacturing a plurality of parts of a predetermined shape which reduces the number of parts in process at any one time during the manufacturing process and which improves the tolerance control and quality of the resulting parts.

It is a further and more particular object of the present invention to provide a method and apparatus for forming a plurality of parts of a predetermined shape which reduces the energy required in order to form the desired part, thereby reducing the inherent cost of parts.

These and other objects are provided, according to the present invention, by a method and apparatus for forming a plurality of parts, such as spade bits, from a continuous stock material. Thus, the various steps of the forming method of the present invention can be performed to predetermined portions of the continuous stock material, prior to separating the continuous stock material into a number of discrete parts. The efficiency of the forming process is enhanced since individual parts need not be transported and oriented numerous times during the forming operations. By not requiring that the individual parts be handled during the forming operations, the quality of the parts formed by the forming method and apparatus of the present invention will also be enhanced since such handling of individual parts generally increases the opportunities for misalignment and contributes to poor tolerance control during the manufacturing process.

According to the forming method and apparatus of the present invention, an indexer incrementally advances the continuous stock material along a predetermined path such that the stock material advances longitudinally in a downstream direction. Following each intermittent advance of the continuous stock material, a clamp securely grips and holds a fixed portion of the continuous stock material. While the fixed portion of the continuous stock material is clamped, another portion of the continuous stock material is formed, such as with a forge, into a first predetermined shape. According to the present invention, the clamp and, more particularly, the fixed portion of the continuous stock material held by the clamp is disposed in a predetermined longitudinal direction relative to the formed portion of the continuous stock material which is shaped into the first predetermined shape.

As a result of processing a continuous stock material, the continuous stock material grows in both longitudinal directions during the forming operations. According to the method of the present invention, however, the longitudinal growth of the continuous stock material created during the forming step is at least partially compensated for by allowing movement of the continuous stock material in a longitudinal direction opposite the predetermined longitudinal direction established by the relative positions of the fixed portion of the continuous stock material and the formed portion of the continuous stock material. By compensating for the longitudinal growth of the continuous stock material, the forming method and apparatus of the present invention can form the continuous stock material into a plurality of parts prior to separating the stock material into the plurality of discrete parts, thereby increasing the manufacturing efficiency of the parts.

The forming apparatus of the present invention also preferably includes a longitudinal growth monitor for monitoring the longitudinal growth of the continuous stock material during forming operations. The forming apparatus also advantageously includes a controller, responsive to the longitudinal growth monitor, for terminating forming operations once the longitudinal growth of the continuous stock material is at least as great as a predetermined growth threshold. Accordingly, the forming method and apparatus of the present invention can readily manufacture parts of a predetermined shape and size in a precisely controlled fashion.

According to one embodiment, the forge includes a plurality of dies disposed about the continuous stock material and means for at least partially and, more typically, completely closing the plurality of dies about the stock material. Once closed, the plurality of dies define a cavity of a predetermined shape which, in turn, defines the shape of at least a portion of the resulting part. According to the present invention, the plurality of at least partially closed dies also define entry and exit ports through which the continuous stock material extends.

The means for at least partially closing the plurality of dies about the continuous stock material preferably includes a die housing which defines an internal cavity adapted to receive and circumferentially encompass the plurality of dies, thereby structurally reinforcing the forging dies during the forging process. Thus, by at least partially inserting the plurality of dies within the internal cavity defined by the die housing, the plurality of dies can be at least partially closed about the continuous stock material.

Upon completion of the forging process, the plurality of dies can be withdrawn from the die housing such that the dies open, thereby releasing the continuous stock material. Thereafter, the die housing can be rotated relative to the plurality of dies, prior to reinserting the plurality of dies within the internal cavity defined by the die housing, such as during a subsequent forming step. As a result of the relative rotation of the dies to the die housing, the wear and degradation of the die housing which occurs during the forging process is distributed relatively evenly about the entire circumference of the internal cavity so as to lengthen the effective life of the die housing.

The forge of the present invention also preferably includes a carriage on which the plurality of dies are mounted. The carriage is mounted to move in a longitudinal direction relative to the continuous stock material. As a result, the carriage can move in a longitudinal direction opposite the predetermined longitudinal direction established by the relative positions of the fixed portion of the continuous stock material and the formed portion of the continuous stock material in order to further compensate for the longitudinal growth of the continuous stock material created during the forming operations. In particular, the carriage is adapted to move to compensate for the longitudinal growth of that portion of the continuous stock material between the formed portion of the continuous stock material and the fixed portion of the continuous stock material. As a result of this longitudinal movement of the carriage, the plurality of dies remain at least partially closed about the same portion of the stock material during the entire forming step.

According to one advantageous embodiment, the forge also includes biasing means for longitudinally biasing the carriage with a predetermined longitudinal bias force so as to retard the longitudinal movement of the carriage. According to one aspect of the present invention, the longitudinal bias force applied by the biasing means can be altered according to a predetermined schedule. For example, the biasing means can increase the longitudinal bias force over time to encourage lateral expansion of the workpiece within the cavity defined by the plurality of dies such that the entire cavity is filled.

While the clamp continues to hold the fixed portion of the continuous stock material, the forming method and apparatus of the present invention can form another portion of the continuous stock material into a second predetermined shape, such as with a second forge. Once both portions of the continuous stock material have been formed, the clamp can release the fixed portion of the continuous stock material such that the continuous stock material can be further advanced along the predetermined path. Thereafter, the steps of the forming method can be repeated such that parts which have both the first and second predetermined shapes can be fabricated in mass.

According to one advantageous embodiment of the present invention, the continuous stock material includes a number of longitudinally spaced apart registration features. For example, the continuous stock material can include a registration feature defined between those portions of the continuous stock material which will be formed into respective ones of the plurality of parts by the forming method and apparatus of the present invention.

Accordingly, the forming apparatus of one advantageous embodiment of the present invention can include a sensor for identifying a registration feature on the continuous stock material. According to this embodiment, the forge can therefore include positioning means for positioning the forge such that the portion of continuous stock material which is formed is longitudinally spaced from the registration feature identified by the sensor by a predetermined distance. Likewise, the clamp of the forming apparatus of this embodiment of the present invention can also include positioning means for positioning the clamp such that the clamp securely grips a fixed portion of the continuous stock material which is longitudinally spaced from the registration feature by a predetermined distance.

The forming method and apparatus of one embodiment of the present invention can also include trimming means, such as a trimmer, disposed downstream of the forge for trimming predetermined portions of each part. The trimmer can also include positioning means for positioning the trimmer such that the predetermined portions which are trimmed are spaced from the registration feature by a predetermined distance. Likewise, the forming apparatus of one embodiment can include a cutter, disposed downstream of the first and second forges, for cutting the continuous stock material following formation of the parts so as to thereby separate the continuous stock material into a plurality of discrete parts. As described above in conjunction with the forge, clamp and trimmer, the cutter can include positioning means for positioning the cutter such that the portion of the continuous stock material which is cut is longitudinally spaced from the registration feature by a predetermined distance. By identifying the registration features defined by the continuous stock material, the various operations of the forming method and apparatus of the present invention can be performed in a precise manner on predetermined portions of the continuous stock material.

According to one advantageous embodiment of the present invention, at least one forging die includes a contact surface which defines a portion of the cavity for contacting and shaping the workpiece into the predetermined shape of the resulting part. More often, the plurality of forging dies include at least two forging dies, such as upper and lower forging dies, which include respective contact surfaces to deform and shape the workpiece upon actuation or closing of the forging dies. According to this embodiment of the present invention, the plurality of forging dies are moved inwardly in a predetermined direction as the forging dies are inserted within the internal cavity defined by the die housing, thereby at least partially closing the forging dies about the continuous stock material. The predetermined inward direction in which the forging dies move is preferably oblique to the respective contact planes of the forging dies. For example, the contact plane of at least one forging die and a reference plane perpendicular to the predetermined direction of movement of the forging die define an angle of between about 10° and about 20° therebetween, according to one advantageous embodiment. The respective contact surfaces therefore impart both axial and radial forces to at least portions of the workpiece to form the part of predetermined shape within the cavity defined between the plurality of forging dies. Due to the shape of the contact surfaces and the resulting orientation of the axial and radial forces applied, compressive, tensile and shear forces are generated within the workpiece which facilitate the efficient formation of the part of predetermined shape. Accordingly, thin parts which have a relatively large diameter can be readily forged according to this aspect of the present invention. Further, the power required to forge parts of a predetermined size and shape is reduced in comparison to conventional compressive forging processes by imparting compressive, tensile and shear forces at desirable locations within the workpiece.

In addition to the inner contact surface, each forging die preferably includes an opposed outer surface having a predetermined shape for operably contacting the die housing. The predetermined shape of the outer surface of each forging die is typically different than the predetermined shape of the internal cavity of the die housing when the plurality of forging dies are in the open position. However, the forging dies preferably rotate upon their insertion into the die housing such that the predetermined shape of the outer surface of each forging die corresponds to the predetermined shape of the internal cavity of the die housing once the forging dies are in an operative or an at least partially closed position.

The forging apparatus can also include an alignment fixture for maintaining the forging dies in a predetermined aligned relationship during the forging process. According to one embodiment, the combination of the plurality of forging dies and the alignment fixture define a frustoconical die assembly. Likewise, the internal cavity defined by the die housing of this embodiment is also preferably frustoconical in shape such that complementary-shaped die assembly can be readily received therein.

The forming method and apparatus can impart relative motion between the die housing and the forging dies in a number of manners. For example, the forming apparatus of one embodiment can also include an annular piston rod disposed within an annular cylinder which defines a lengthwise extending opening through which the continuous stock material extends. The annular piston rod is maintained in operable contact with the die housing such that, upon extension of the annular piston rod, the die housing is urged about the plurality of forging dies.

The plurality of forming dies can also be employed to form parts of a predetermined shape by upsetting a workpiece within the forming dies. As described above, the plurality of forming dies cooperate to define a cavity which is open at both ends and which defines at least a portion of the predetermined shape of the resulting part. Moreover, the plurality of forming dies are preferably inwardly biased, such as within the internal cavity defined by the die housing. According to this embodiment, the forming apparatus can include first and second clamps disposed on opposite ends of the forming dies for clamping those portions of the workpiece which extend beyond the respective ends of the forming dies. In operation, at least one of the clamps can be urged toward the other of the clamps with sufficient force to overcome the inward biasing of the plurality of forming dies. Thus, the portion of the workpiece disposed within the cavity defined by the plurality of forming dies is upset and expands outwardly, thereby forcing the plurality of forming dies to move outwardly so as to define a larger cavity.

As will be apparent, the forming method and apparatus of the present invention is extremely versatile and can form a variety of different types of parts from a continuous stock material. According to one advantageous embodiment, however, the forming method and apparatus forms spade bits of a predetermined shape. In particular, the spade bit can include an elongate shank defining a central longitudinal axis and a blade portion joined at a rear end to one end of the shank. The spade bit can also include a spur extending axially from a forward end of the blade portion, opposite the rear end.

The blade portion of the spade bit of the present invention includes a pair of generally flat side segments which extend laterally in opposite directions from the central longitudinal axis. The side segments define respective lateral planes which are parallel to each other and the central longitudinal axis. The side segments also include respective forward cutting edges which are axially offset relative to each other to thereby define an axially advanced forward cutting edge and an axially rearward forward cutting edge. According to one advantageous embodiment, the forward cutting edges are axially offset by a predetermined axial offset, such as between about 0.010 inch and about 0.012 inch. By having forward cutting edges which are axially offset, the spade bit can more efficiently engage and remove portions of a workpiece during the boring of a hole. As a result, the longevity of a spade bit having axially offset forward cutting edges is also generally enhanced due to the more efficient removal of chip swarf during drilling operations.

Regardless of the type of parts formed by the forming method and apparatus of the present invention, the forming method and apparatus can effectively form a plurality of parts of a predetermined shape from a continuous stock material without separating the parts until most, if not all, of the forming operations have been completed. As a result, the forming method and apparatus of the present invention significantly increases the efficiency with which parts of a predetermined shape are manufactured, as well as the tolerance control and concomitant quality of the resulting parts. In addition, the forming method and apparatus of the present invention effectively decreases the number of partially formed parts which are in process at any one time, thereby further increasing the efficiency and decreasing the costs associated with the manufacture of parts of the predetermined shape according to the forming method and apparatus of the present invention.

BRIEF DESCRIPTION OF THE DRAWINGS

FIG. 1 is a schematic plan view of the forming apparatus of one embodiment of the present invention.

FIG. 2 is a side elevational view of at least portions of the forming apparatus of the embodiment of the present invention illustrated in FIG. 1.

FIGS. 3A, 3B, 3C, 3D, 3E, 3F, and 3G illustrate the various shapes into which the continuous stock material is formed by the forming method and apparatus of one advantageous embodiment of the present invention which is designed to fabricate spade bits.

FIG. 4 is a front elevational view of a spade bit according to one embodiment of the present invention.

FIG. 5 is a side elevational view of a spade bit of the embodiment of the present invention illustrated in FIG. 4.

FIG. 6 is a greatly enlarged fragmentary front elevational view of the blade portion of a spade bit of the embodiment of the present invention illustrated in FIG. 4.

FIG. 7 is a fragmentary cross-sectional side elevational view of a portion of the embodiment of the forming apparatus illustrated in FIG. 1 which depicts the straightener, the draw box, the load collet and the indexer in greater detail.

FIG. 8 is a fragmentary cross-sectional side elevational view of another portion of the embodiment of the forming apparatus illustrated in FIG. 1 which depicts the indexer, the hex forge and a portion of the turning head.

FIG. 9 is a fragmentary cross-sectional side elevational view of a portion of the hex forge, wherein the plurality of forging dies have been at least partially closed about the continuous stock material, and wherein the turning head clamp is closed.

FIG. 10 is a perspective view of one of the plurality of forging dies of the hex forge.

FIG. 11 is a cross-sectional view of the forging die of FIG. 10 as taken along line 11-11.

FIG. 12A is a cross-sectional end view of the hex forge of FIG. 9 and, more particularly, the die housing, the alignment fixture and the plurality of forging dies in which the plurality of forging dies have been opened.

FIG. 12B is a cross-sectional end view of the die housing shown in FIG. 12A as taken along line 12—12 of FIG. 9 in which the plurality of forging dies have been at least partially and, more specifically, completely closed about the continuous stock material.

FIG. 13 is a partial fragmentary cross-sectional end view of a portion of the hex forge which illustrates the toothed gear and associated rack for rotating the die housing following forging operations as taken along line 13—13 of FIG. 9.

FIG. 14 is a partial fragmentary cross-sectional plan view of a portion of the hex forge which illustrates the hydraulic cylinder assembly for positioning the hex forge carriage and the sensor for monitoring the relative location of the hex forge carriage as taken along line 14–14 of FIG. 8.

FIG. 15A is a side elevational view of a portion of the embodiment of the forming apparatus illustrated in FIG. 1 which depicts the turning head, including the turning head collet, in greater detail.

FIG. 15B is a side elevational view of a portion of the embodiment of the forming apparatus illustrated in FIG. 1 which depicts a portion of the blade press forge in greater detail.

FIG. 16 is a fragmentary cross-sectional plan view of a portion of the embodiment of the blade press forge illustrated in FIG. 15B as taken along line 16—16 of FIG. 15B.

19 which depicts the plurality of forging dies in an at least partially closed or operative position and which also depicts the upstream and downstream blade press clamps in a closed position.

Figure 20:
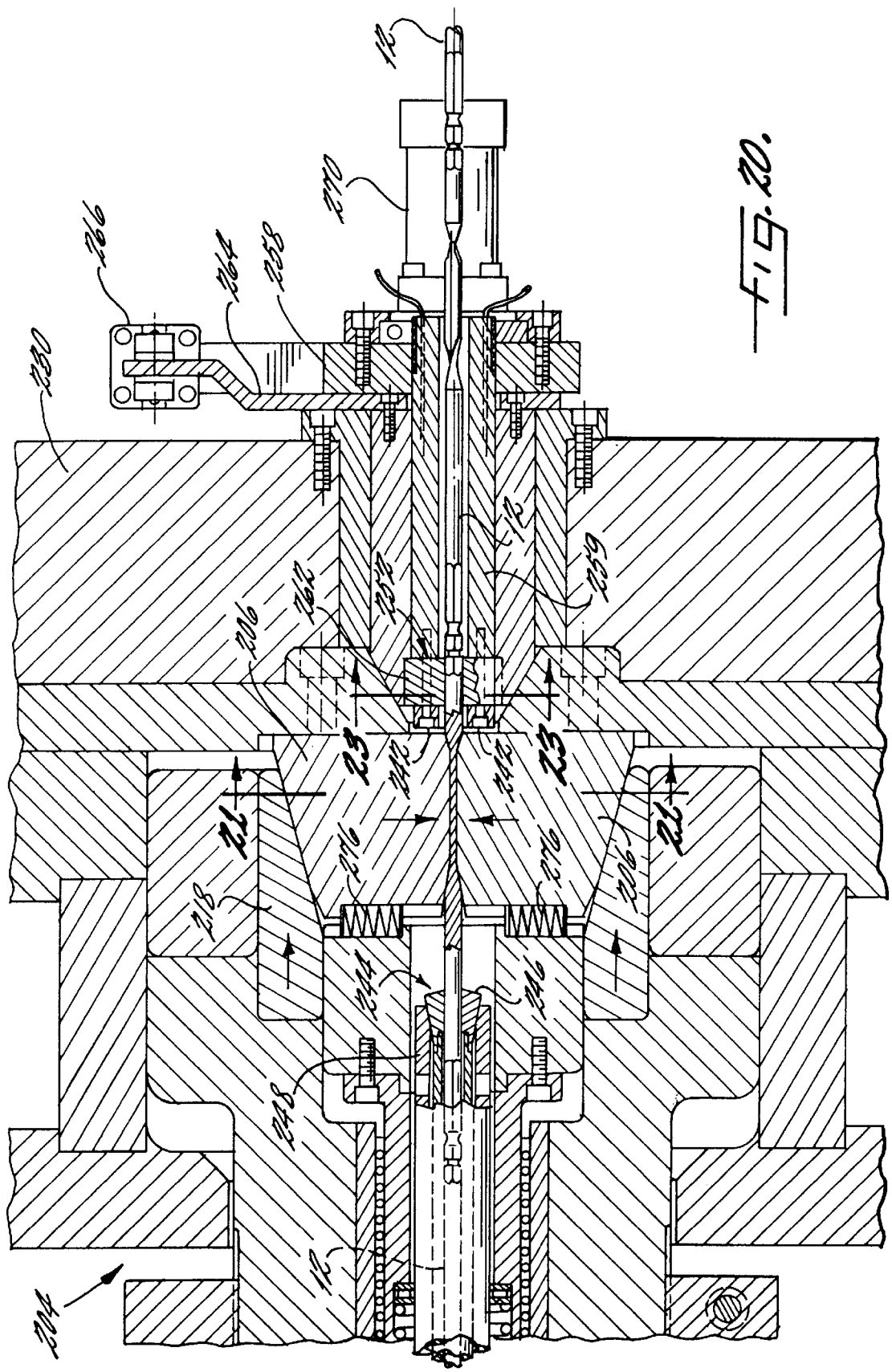
FIG. 20 is an enlarged fragmentary cross-sectional side view of a portion of the blade press forge illustrated in FIG.

FIG. 21 is a cross-sectional end view of the pair of opposed forging dies, the die housing and the alignment fixture of the blade press forge of one embodiment of the present invention as taken along the line 21—21 of FIG. 20.

FIG. 22 is a greatly enlarged fragmentary cross-sectional end view of the pair of opposed forging dies of the blade press forge of the embodiment of the present invention illustrated in FIG. 21 wherein the pair of opposed forging dies are in the at least partially closed or operative position.

FIG. 23 is a cross-sectional view of the downstream blade press clamp of the blade press of one embodiment of the present invention as taken along line 23—23 of FIG. 20.

Figure 19:
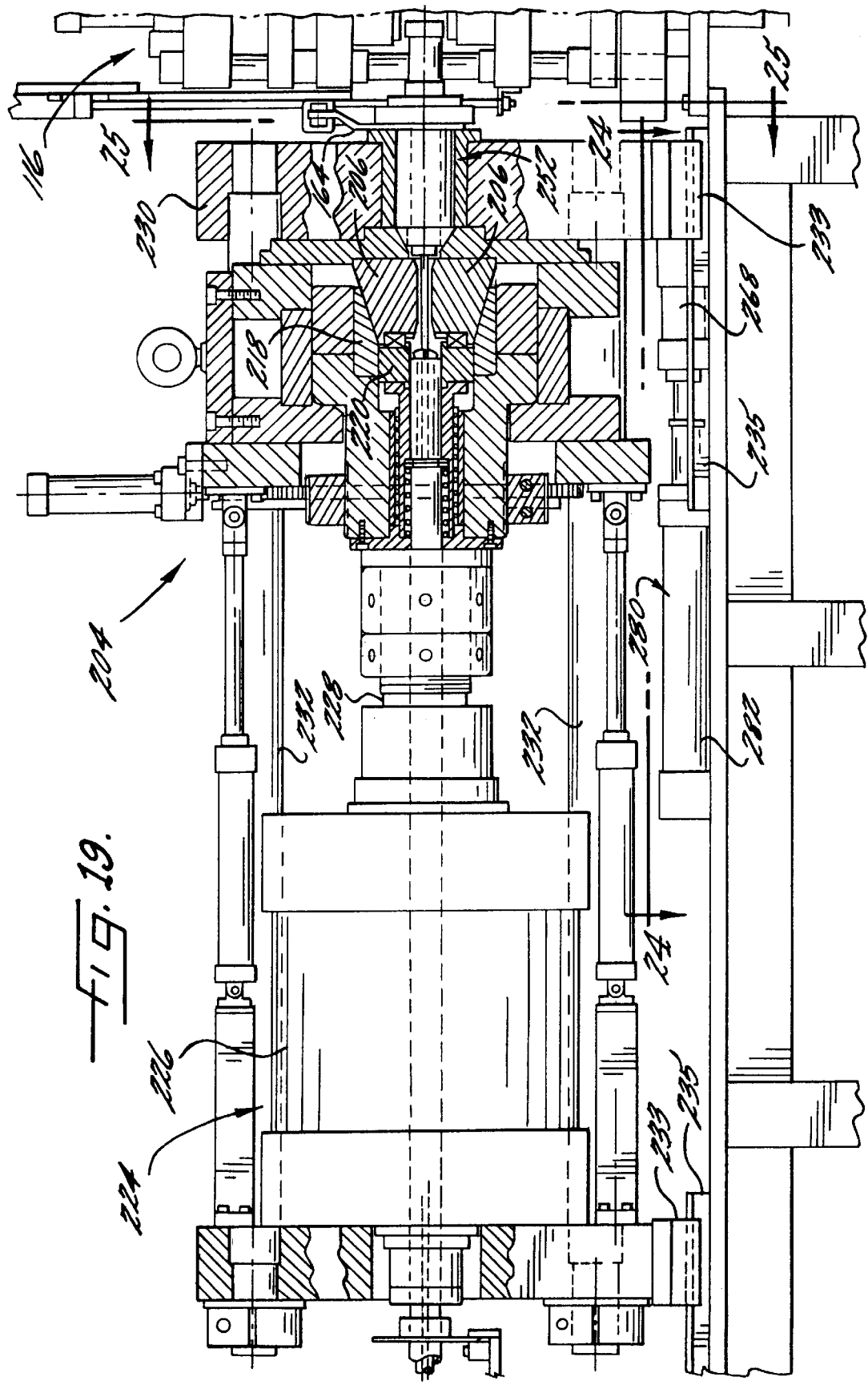
FIG. 19 is a fragmentary cross-sectional side elevational view of the blade press forge of one embodiment of the present invention wherein the pair of opposed forging dies are in the open position.

FIG. 24 is a fragmentary cross-sectional plan view of a portion of the embodiment of the blade press forge illustrated in FIG. 19 as taken along line 24—24 of FIG. 19.

Figure 25:
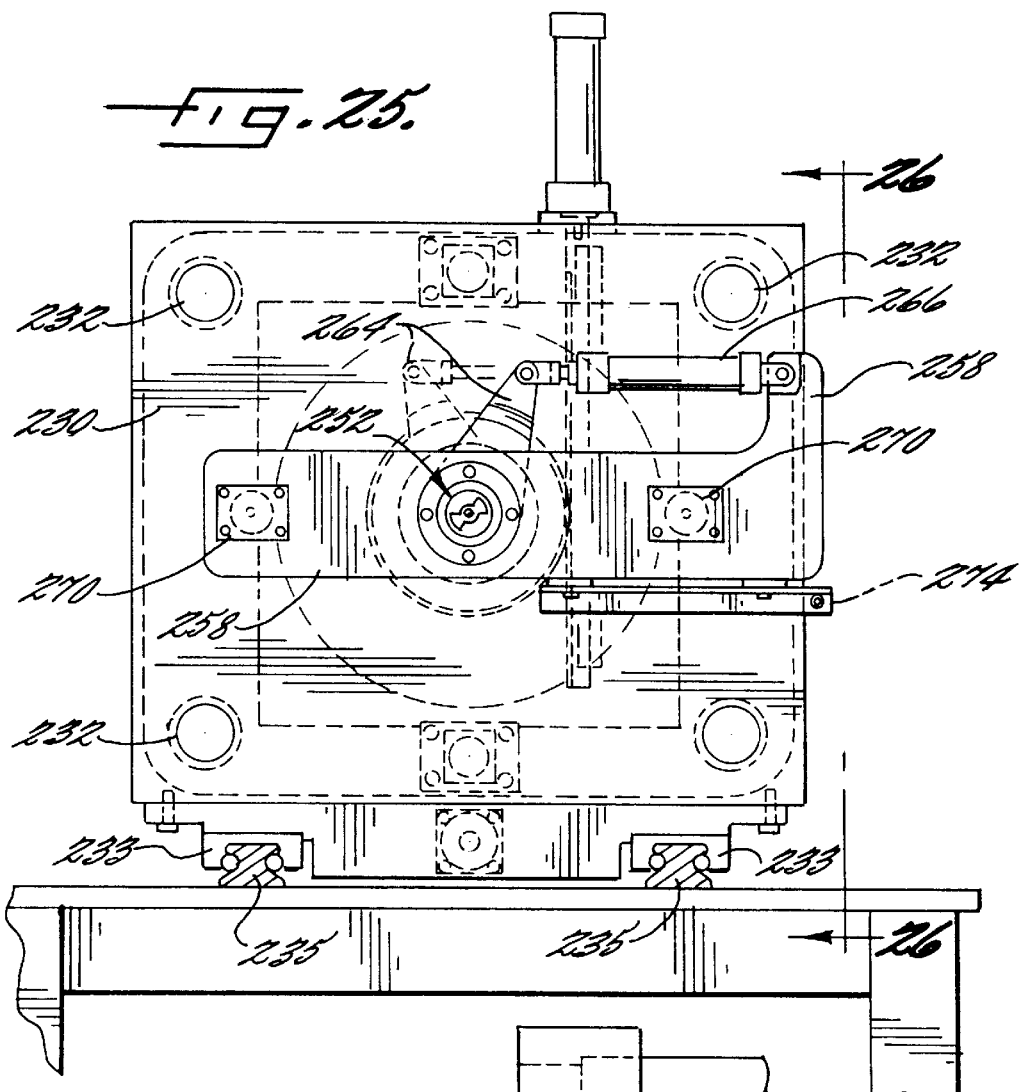

FIG. 25 is an end view of the clamp plate, the downstream blade press clamp and the frame plate of the blade press carriage of one embodiment of the present invention as taken along line 25—25 of FIG. 19.

Figure 26:
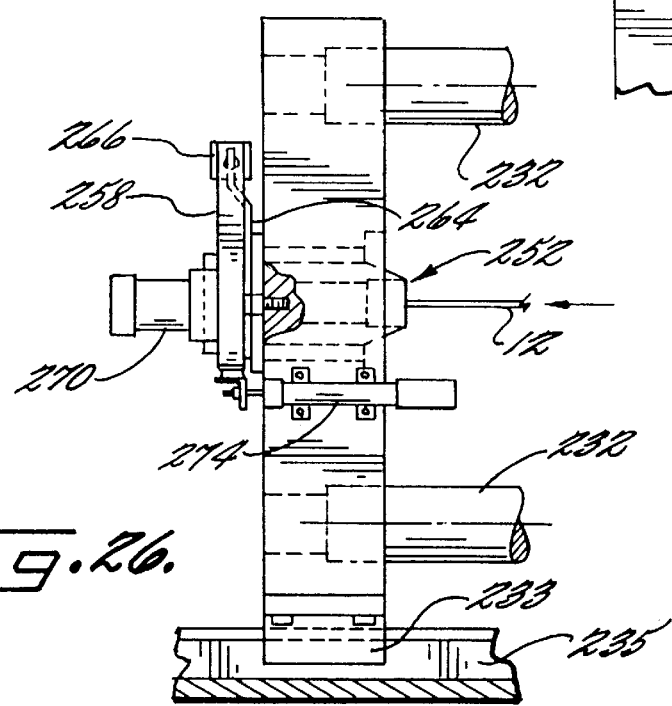

FIG. 26 is a side elevational view of the clamp plate, the downstream blade press clamp and the frame plate of the blade press carriage of one embodiment of the present invention as taken along line 26—26 of FIG. 25.

FIG. 27 is a side elevational view of the spur trimming station, the outer diameter trimming station and the saw station of one embodiment of the present invention.

FIG. 28 is a cross-sectional plan view of the spur trimming station, the outer diameter trimming station and the saw station of one embodiment of the present invention as taken along line 28—28 of FIG. 27.

FIG. 29 is an end view of the saw station of one embodiment of the present invention as taken along line 29—29 of FIG. 27 which illustrates the advancement of the saw through the continuous stock material.

FIG. 30 is a fragmentary cross-sectional side elevational view of the saw station and the size stamp station of one embodiment of the present invention which illustrates the movement of the size stamp station in the longitudinal direction.

FIG. 31 is a fragmentary cross-sectional side elevational view of the size stamp station and a portion of the logo stamp station of one embodiment of the present invention which further illustrates the movement of the size stamp station in the longitudinal direction and the interaction between the size stamp station and the logo stamp station.

FIG. 32 is a cross-sectional end view of the size stamp clamp of one embodiment of the present invention as taken along line 32—32 of FIG. 30 which illustrates the size stamp dies, the alignment fixture and the surrounding closure.

FIG. 33 is a plan view of the size stamp station and a portion of the logo stamp station of the embodiment of the present invention shown in FIG. 30 which further illustrates the movement of the size stamp station in the longitudinal direction and the interaction between the size stamp station and the logo stamp station.

FIG. 34 is a fragmentary cross-sectional side elevational view of a portion of the size stamp station and the logo stamp station of one embodiment of the present invention.

FIG. 35 is a cross-sectional end view of the logo stamp clamp of one embodiment of the present invention as taken along line 35—35 of FIG. 34 which illustrates the logo stamp dies, the alignment fixture and the surrounding closure.

FIG. 36 is a fragmentary cross-sectional plan view of the logo stamp station of the embodiment of the present invention illustrated in FIG. 34 which is taken along line 36—36 therein and which illustrates the ejection of a resulting part by the kicker rod of the logo stamp station.

Figure 37:
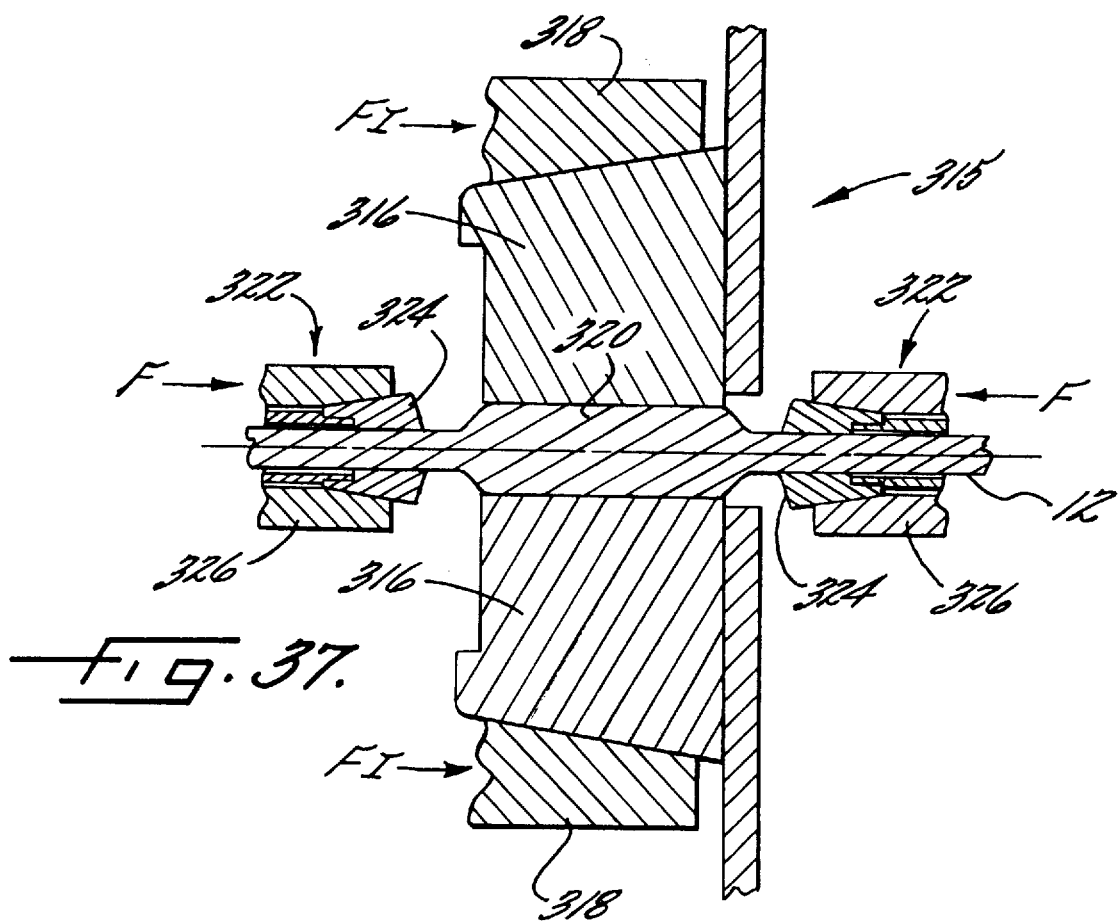

FIG. 37 is a fragmentary cross-sectional side view of a die assembly and surrounding die housing according to another embodiment of the present invention in which opposed clamps are urged toward one another so as to effectively upset the workpiece within the cavity defined by the plurality of forging dies.

FIGS. 38A, 38B, 38C, 38D, 38F, 38G, 38H, 38I, and 38J are flow charts illustrating the operations performed by the forming method and apparatus of one embodiment of the present invention.

Figure 39:
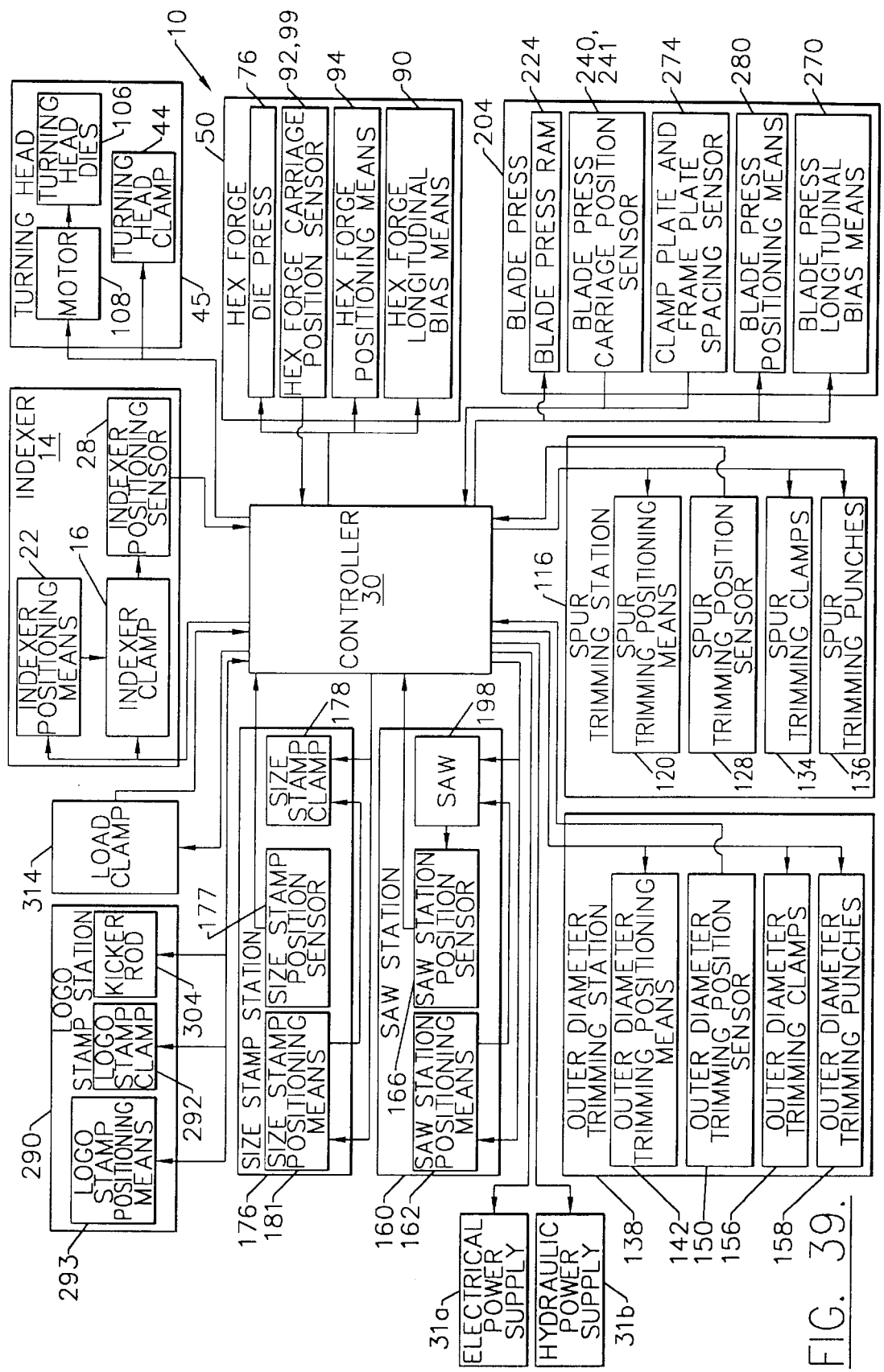

FIG. 39 is a block diagram illustrating the operable connection of the controller to various components of the forming apparatus of one embodiment of the present invention.

Figure 40:
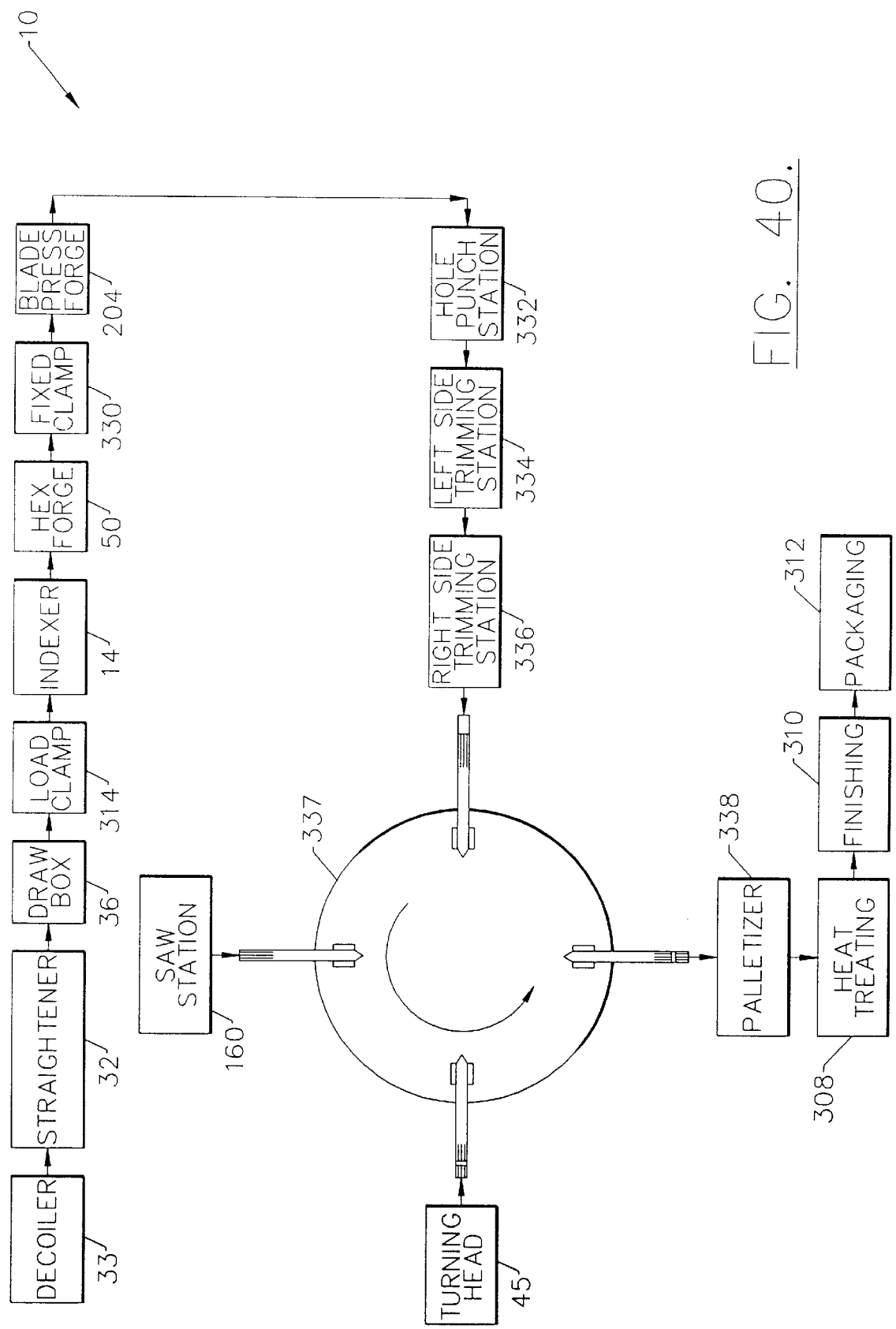

FIG. 40 is a block diagram illustrating the forming method and apparatus of another embodiment of the present invention.

Figure 41:
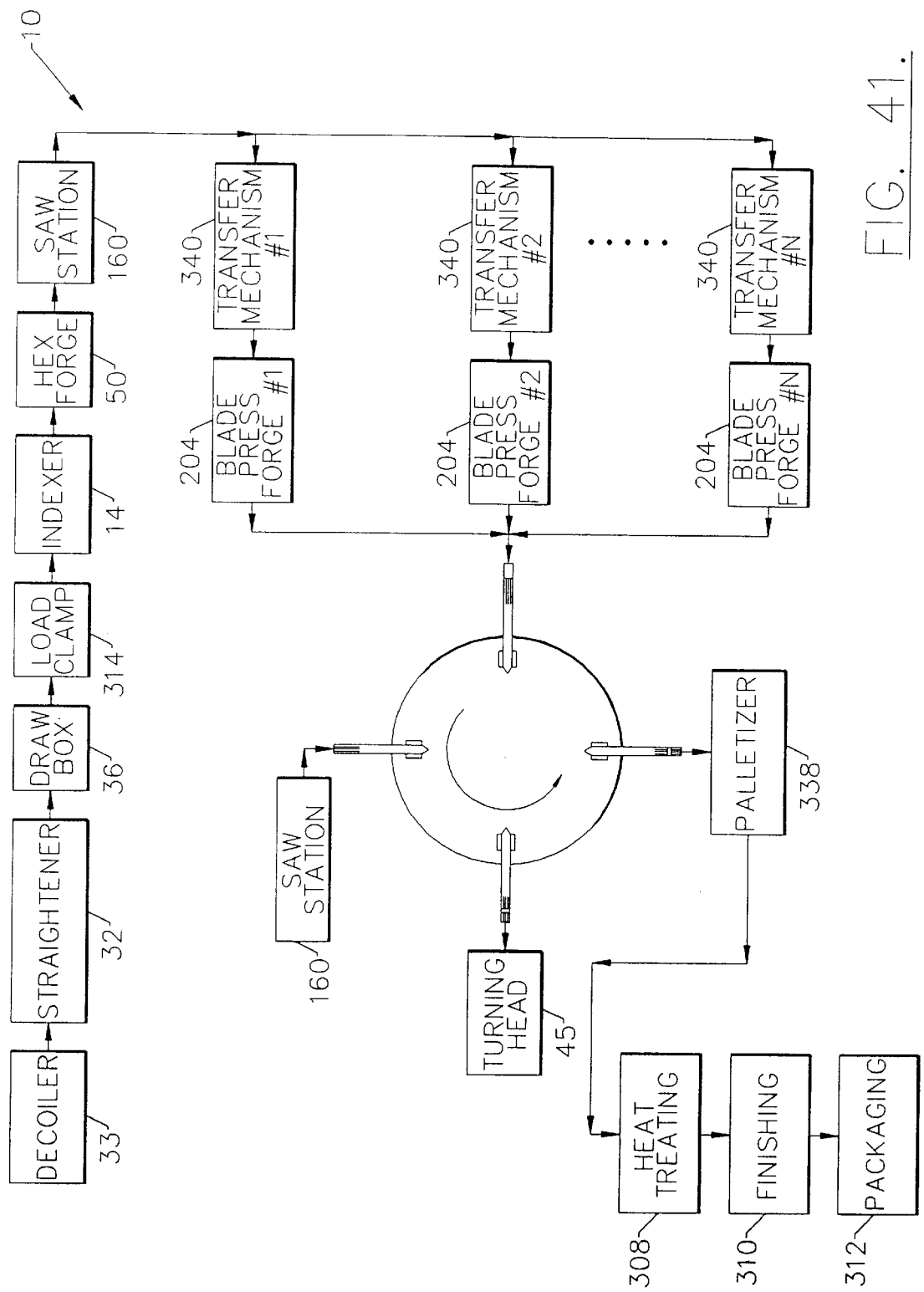

FIG. 41 is a block diagram illustrating the forming method and apparatus of yet another embodiment of the present invention.

DETAILED DESCRIPTION OF THE PREFERRED EMBODIMENTS

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Referring now to FIGS. 1 and 2, a forming apparatus 10 according to one advantageous embodiment of the present invention is illustrated. As described in detail hereinbelow and as illustrated in FIGS. 1 and 2, the forming apparatus and associated method forms a plurality of parts from a continuous stock material 12. For purposes of illustration, however, the forming apparatus and method will be primarily described in conjunction with the formation of a plurality of spade bits from a continuous metal wire, as shown in FIGS. 3–6. However, the forming method and apparatus can be adapted to form a variety of other parts without departing from the spirit and scope of the present invention. For example, the forming method and apparatus of the present invention can form drill bits, router bits, fasteners, percussion bits, jigsaw and reciprocating saw blades, impact wrench anvils, coil and ballpoint chisels, gears, shafts, screwdriver bits, equalizers beams and actuator rods as well as other types of parts, including both those parts which are symmetrical about a central longitudinal axis and those parts which are not symmetrical about a central longitudinal axis, without departing from the spirit and scope of the present invention.

According to the forming method and apparatus 10 of the present invention, the plurality of parts are formed from a continuous length of stock material 12. Typically, the continuous stock material is comprised of a steel alloy. However, the continuous stock material can be comprised of any forgeable material known to those skilled in the art. For example, the continuous stock material can be comprised of copper, aluminum, titanium, zinc, brass or alloys thereof. In addition, the continuous stock material can be comprised of a combination of materials. For example, the continuous stock material can include metal powder and/or resin disposed within a metallic or plastic carrier tube. Accordingly, the forming method and apparatus of the present invention can form the carrier tube, including the metal powder and/or resin disposed therein, into a plurality of parts of a predetermined shape without departing from the spirit and scope of the present invention. Still further, the continuous stock material could be formed of a plurality of individual parts, potentially of greatly different cross-sectional shapes and sizes, which may be joined, such as by welding or other means, in an end-to-end relationship.

While principally described hereinbelow as a cold forming method, the continuous stock material 12 can be heated prior to the forging step, such as with in-line induction or infrared heating devices, such that the forming method is a warm or hot forging method. The temperature ranges to which each of the various materials from which the continuous stock material can be formed must be heated in order to be cold, warm or hot forged depend, among other things, upon the strength and internal properties of the respective material, and are known to those skilled in the art. For example, continuous stock material comprised of steel alloys typically have a temperature of between room temperature and 300° F. during cold forging operations, a temperature of between 200° F. and 1400° F. during warm forging operations, and a temperature of between 1200° F. and 2200° F. during hot forging operations. In addition, the forming method of the present invention which includes a step of hot forging a workpiece is particularly effective to forge workpieces comprised of a material having a relatively low melting point, such as aluminum, brass, zinc and copper.

Referring now to FIGS. 38A–38J, a flow chart illustrating the operations performed by the forming method and apparatus 10 of the present invention is illustrated. Once the continuous stock material 12 has been loaded as shown in block 500 and as described hereinbelow, the remaining operations of the forming method and apparatus are relatively continuous. Accordingly, the operations illustrated by the flow chart of FIGS. 38A–38J are generally repeated many times. For purposes of illustration, however, the flow chart of FIGS. 38A–38J begins at a point in the continuous forming cycle at which each of the forming operations have been performed on a predetermined portion of the continuous stock material, such that the continuous stock material must now be advanced.

As shown in FIGS. 7 and 8, the forming apparatus 10 preferably includes an indexer 14 which intermittently advances the continuous stock material 12 longitudinally by a predetermined linear distance in a downstream direction. In order to advance the continuous stock material, the indexer preferably includes a clamp 16 for securely gripping a portion of the continuous stock material. As illustrated in FIGS. 7 and 8, the indexer clamp preferably includes an annular collet 18 through which the continuous stock material extends. The indexer clamp can also include an annular closure 20 which defines an internal cavity within which the collet can be received. The shape of the internal cavity defined by the closure is preferably complimentary to the shape of the collet. For example, the collet can be generally frustoconical in shape and the internal cavity defined by the closure can be generally frustoconical in shape. Thus, by urging the closure over the collet, the collet can be closed about the continuous stock material as shown in FIG. 8 and block 502 of FIG. 38A, thereby securely gripping the continuous stock material.

As will be apparent to those skilled in the art, the closure 20 can be urged or displaced over the collet 18 in a variety of manners. For example, the indexer clamp 16 can include an indexer clamp cylinder assembly including an annular piston rod which is operably connected to the closure and which is disposed within an annular cylinder such that, by hydraulic actuation of the indexer clamp cylinder assembly, the annular piston rod is extended and the closure is urged or axially displaced over the collet such that the collet is closed about the continuous stock material 12.

Referring now to FIG. 39, the forming apparatus 10 of the present invention also includes a controller 30, operably connected to the indexer clamp 16, for controlling the hydraulic actuation of the indexer clamp cylinder assembly. The controller 30 is preferably implemented by a combination of hardware and software. For example, the controller can be implemented by one or more controllers or processors and/or one or more programmable logic devices, as well as one or more related memory elements which operate under the control of software to provide monitoring and control described above. The software is typically stored in the microcontroller as well as one or more related memory elements prior to operation of the forming method and apparatus 10 of the present invention. The controller is also operably connected to a hydraulic power source 31b and an electrical power source 31a for providing and allocating hydraulic and electrical power, respectively, for the forming method and apparatus of the present invention as shown schematically in FIGS. 2 and 39 and as described hereinafter.

As will be described hereinafter, the forming apparatus 10 of the present invention preferably includes a number of clamps, other than the indexer clamp 16. In order to advance the continuous stock material 12, however, all of the clamps, other than the indexer clamp, should be opened such that the continuous stock material is free to move in a downstream longitudinal direction therethrough. Thus, as shown in blocks 504–508 of FIG. 38A, once the controller 30 has closed the indexer clamp about the continuous stock material and all of the other clamps have been opened, the indexer 14 advances the indexer clamp longitudinally by a predetermined linear distance from the initial position shown in dashed lines in FIG. 8 to the final position shown in solid lines. As a result of the secure gripping of the continuous stock material by the indexer clamp, however, the indexer also effectively advances the continuous stock material longitudinally by the same predetermined linear distance.

The indexer 14 can longitudinally advance the indexer clamp 16 in a number of manners without departing from the spirit and scope of the present invention. In the exemplary embodiment shown in FIG. 7, however, the indexer includes an indexer cylinder assembly 22. The indexer cylinder assembly includes an annular piston rod 24 disposed within an annular hydraulic cylinder 26. The annular piston rod is operably connected to the indexer clamp such that, upon hydraulic actuation of the indexer cylinder assembly, the annular piston rod and, therefore, the indexer clamp is urged in a downstream longitudinal direction. Alternatively, the indexer can include an AC servomotor and an associated ballscrew for longitudinally advancing the indexer clamp. In order to facilitate longitudinal movement of the indexer clamp, the indexer clamp can also include one or more wheels 25.

The indexer 14 also preferably includes an indexer monitor 28 for monitoring the longitudinal distance by which the indexer has advanced the continuous stock material 12. In one advantageous embodiment, the indexer monitor includes a glass scale, such as an RSF Elektronik type MSA 6706 glass scale, which is operably connected to the annular piston rod of the indexer for effectively measuring the longitudinal displacement of the indexer clamp 16 as a result of the downstream longitudinal extension of the piston rod 24.

The controller 30 is also operably connected to the indexer cylinder assembly 22 and the indexer monitor 28 for controlling the hydraulic actuation of the indexer cylinder assembly. According to the present invention, once the controller determines that the indexer 14 has longitudinally advanced the continuous stock material 12 by the predetermined linear distance, the controller terminates further extension of the annular piston rod by halting the hydraulic actuation of the indexer cylinder assembly.

The forming apparatus 10 also preferably includes a straightener 32 which includes a series of aligned rollers 34 for straightening the continuous stock material 12 prior to forming the continuous stock material into a plurality of parts. In the illustrated embodiment, the straightener includes a two-plane straightener which has a plurality of aligned rollers disposed in two mutually perpendicular planes such that the continuous stock material is straightened in each of the planes. Accordingly, as the indexer 14 intermittently advances the continuous stock material in a downstream longitudinal direction, the stock material is drawn from a supply reel 33 and is straightened by passing through the straightener.

Once the controller 30 has terminated the longitudinal advancement of the continuous stock material 12 by the indexer 14, another clamp, downstream of the indexer clamp 16, is closed to securely grip another portion of the continuous stock material. In the embodiment illustrated in FIGS. 1 and 2 and in block 510 of FIG. 38A, the forming apparatus 10 include a turning head clamp 44 which is adapted to be closed about the continuous stock material following the intermittent advancement of the continuous stock material by the indexer. However, the forming apparatus could include other clamps, not associated with a turning head 45, in order to securely grip another portion of the continuous stock material following the intermittent advancement of the continuous stock material.

As described above in conjunction with the indexer clamp 16 and as shown in FIGS. 8 and 9, the turning head clamp 44 can include an annular collet 46 through which the continuous stock material 12 extends and an annular closure 48 which defines an internal cavity which is adapted to at least partially receive the collet. The turning head clamp also includes a turning head cylinder assembly comprised of an annular cylinder and an annular piston rod disposed within the annular cylinder. According to the present invention, the controller 30 can hydraulically actuate the turning head cylinder assembly such that the annular piston rod is extended. As a result of the operable connection of the piston rod to the annular closure, the extension of the piston rod will urge the closure about the collet in order to at least partially close the collet about the continuous stock material such that the turning head clamp securely grips a portion of the continuous stock material as shown in FIG. 9.

As shown in blocks 512 and 514, once the turning head clamp 44 has been closed for a predetermined dwell time, such as 0.1 seconds in one advantageous embodiment, the controller 30 opens the indexer clamp 14 such that the collet 18 is opened and the continuous stock material 12 is free to move longitudinally therethrough. For example, the controller can hydraulically retract the annular piston rod of the indexer clamp cylinder assembly such that the closure 20 is disengaged from the collet.

As shown in block 516 of FIG. 38C, the indexer 14 and, more particularly, the indexer clamp 16 can then be retracted so as to return the indexer clamp to an initial or rest position, as shown in dashed lines in FIG. 8, at the same time as a portion of the continuous stock material 12 is being formed. In particular, the controller 30 preferably hydraulically actuates the indexer cylinder assembly 22 in order to retract the piston rod 24 and, therefore, the indexer clamp at a first predetermined rate.

Referring now to FIG. 7, the forming apparatus 10 also preferably includes a draw box 36 having a draw die 38 through which the continuous stock material 12 is drawn in order to appropriately size the continuous stock material and to effectively remove the memory of the previously coiled stock material. As known to those skilled in the art, the draw box can also include a predraw die 40 in order to at least partially reduce the size of the continuous stock material and can include a source of lubricant 42 between the predraw die and the draw die in order to facilitate the drawing of the continuous stock material.

The draw box 36 is adapted to move longitudinally in conjunction with the annular piston rod 24 of the indexer cylinder assembly 22 as described below. Thus, the draw box preferably includes one or more slides 37 which ride upon and cooperate with a pair of longitudinally extending, parallel rails or tracks 39. As shown in FIG. 7, the indexer cylinder assembly is preferably double acting. Thus, upon retraction of the annular piston rod as shown in block 516 of FIG. 38C, the draw box is also urged or axially displaced in an upstream longitudinal direction. As such, the draw box is urged or pushed over the continuous stock material so as to effectively draw and, therefore, size the continuous stock material prior to subsequent forming operation.

As will be apparent to those skilled in the art, the draw box 36 can be designed to draw the continuous stock material 12 to any reasonable size desired. In the embodiment in which the forging method and apparatus 10 is adapted to fabricate spade bits 410, the draw box and, more particularly, the draw die 38 is preferably designed such that the size or diameter of the drawn stock material can be varied based upon the outer diameter of the blade portion 418 of the resulting spade bit, as exemplified by the following table:

| SPADE BIT DIAMETER | ORIGINAL WIRE DIAMETER | DRAWN WIRE DIAMETER |
| --- | --- | --- |
| 1¼"–1½" | 0.490" | 0.484" |
| 15⁄16"–1⅛" | 0.380" | 0.375" |
| 11⁄16"–⅞" | 0.325" | 0.320" |
| ⅜"–⅝" | 0.288" | 0.284" |

While the indexer clamp 16 is being retracted, the forming method and apparatus 10 of the present invention preferably forges a portion of the continuous stock material 12 into a first predetermined shape. For example, for the illustrated embodiment of the forming method and apparatus which is adapted to form a plurality of spade bits 410, the forming method and apparatus can form a portion of the continuous stock material so as to have a hexagonal cross-sectional shape, thereby forming the rear portion 416 of the shank 412 of the resulting spade bit.

According to the present invention, the forming apparatus 10 includes a forge and, in one advantageous embodiment, a hex forge 50 for forming a portion of the continuous stock material 12 into the first predetermined shape, namely, a hexagonal cross-sectional shape as shown in FIG. 3A. As shown in FIGS. 8–11, the hex forge preferably includes a plurality of forging dies 52 disposed about the continuous stock material. For example, the plurality of forging dies of one embodiment includes six forging dies which cooperate to define a cavity which, in turn, defines at least a portion of the predetermined shape of the resulting part, such as the rear portion 416 of the shank 412 of the spade bit 410 which has a hexagonal cross-sectional shape.

The plurality of forging dies 52 can be at least partially disposed within an alignment fixture 54, such as a spider, which maintains the forging dies in a predetermined aligned relationship. See, for example, FIGS. 11A and 11B. Thus, the combination of the plurality of forging dies and the alignment fixture comprise a hex forge die assembly. As described hereinafter, the die assembly has a predetermined shape, such as a predetermined frustoconical shape in one advantageous embodiment.

As shown in FIGS. 8–10, the hex forge die assembly is preferably spring-loaded, such as with springs 56. As shown, the springs extend in a radial direction within the alignment fixture 54 and are at least partially disposed within respective pockets 58 defined by the forging dies. Accordingly, the springs urge the forging dies in a radially outward direction relative to the alignment fixture, such that the forging dies are in an open position, as shown in FIG. 8, in the absence of additional countervailing forces.

The forging apparatus 10 and, more particularly, the hex forge 50 of this aspect of the present invention also includes means, such as a die housing 60, for radially closing the plurality of forging dies 52. As described in detail below, the forging dies move radially inward in a predetermined direction shown by the arrows of FIGS. 9 and 11 upon relative movement between the die housing and the plurality of forging dies.

At least one and, more preferably, each forging die 52 advantageously includes a contact surface 62 which defines a portion of the cavity through which the continuous stock material 12 extends. Each contact surface is adapted to contact and shape the workpiece into the predetermined shape defined by the cavity. As shown in FIGS. 10 and 11, the contact surface of at least one of the forging dies preferably defines a contact plane 64 which is oblique to the predetermined direction in which the forging dies are closed. Thus, the contact planes of the forging dies impart both axial and radial forces to the workpiece which, in turn, result in compressive, tensile and shear stresses within the workpiece during the deformation process. The resulting compressive and shear force components deform the workpiece outwardly into the predetermined shape defined by the forging dies. More particularly, the resulting compressive and shear force components deform the workpiece plastically and irreversibly into the predetermined shape defined by the forging dies in the closed or operative position.

More particularly, an angle 66 is defined between the respective contact planes and a reference plane 68 perpendicular to the predetermined direction in which the forging dies move as shown in FIG. 11. In a preferred embodiment, the angle is between about 10° and about 20° and, in one exemplary embodiment, is about 15°.

As used herein, the term "compressive force" includes those forces in the predetermined direction in which the forging dies 52 move, and the term "shear force" includes those lateral forces which tend to deform the workpiece radially outward. Thus, for a given amount of input energy, the amount of shear force and compressive force imparted to the workpiece increases and decreases, respectively, as the angle 66 defined between a respective contact plane 64 and the reference plane 68 increases. Likewise, for a given amount of input power, the amount of shear force and compressive force imparted to the workpiece decreases and increases, respectively, as the angle defined between a respective contact plane and the reference plane decreases.

Those portions of the workpiece which are subjected to shear force, and hence shear stress, are more readily deformed since the shear strength of most common workpieces, i.e., most metallic materials, is significantly less than the compressive strength of the same material. Typically, the shear strength of metallic materials is approximately 60% of the compressive strength of the same material. For example, during the formation of a spade bit according to the forming method and apparatus 10 of the present invention, both side segments are preferably subjected to relatively high shear stresses for producing the maximum lateral displacement from a continuous stock material 12 of the smallest initial diameter.

Thus, significantly less input energy is required to deform a workpiece with shear forces than with compressive forces. In addition, the application of shear forces which more readily deform a workpiece radially outward allows the ratio of the thickness of a part to the width or diameter of a part to be decreased such that thin parts having a relatively large diameter, such as a spade bit, can be readily forged according to this aspect of the present invention. Accordingly, this aspect of the present invention enables the ratio of the newly generated product surface area to a minimum product thickness to be optimized.

However, the application of shear force to deform a workpiece significantly increases the forces which the forging dies 52 and die housing 60 must withstand during the forging process and, accordingly, has been avoided in conventional forging processes in which the forging dies are closed in a rectilinear manner to impart compressive forces on the workpiece. In order to withstand the increased forces, the plurality of forging dies and the die housing are comprised, in one preferred embodiment, of a high speed steel and, more preferably, are comprised of CPM® REX™ M4 high speed steel, or an equivalent, marketed by Colt Industries Crucible Specialty Metals Division of Syracuse, N.Y. and described in more detail in a publication entitled Crucible Data Sheet by Colt Industries Crucible Specialty Metals Division bearing document number D88 308-SM-776.

As also shown in FIGS. 8, 9, 12A and 12B, the means for closing the plurality of forging dies 52 preferably includes a die housing 60 which defines an internal cavity 70 therein. The internal cavity of the die housing is preferably shaped and sized in a complimentary fashion to the shape and size of the die assembly. For example, the die housing can define an internal cavity having a frustoconical shape in order to receive and circumferentially encompass a frustoconical die assembly. Thus, by advancing or urging the die housing over the die assembly, the die housing forces the plurality of forging dies radially inward so as to close about the continuous stock material 12 which extends therethrough. The strength of the die assembly and its resulting ability to withstand forces generated during the deformation of the continuous stock material with axial and compressive forces which, in turn, generate compressive, tensile and shear stresses is further enhanced by the radial direction in which the die assembly is closed and the surrounding relationship of the die housing to the die assembly.

According to one advantageous embodiment shown in FIGS. 10 and 11, each forging die 52 includes not only an inner contact surface 62 for contacting and shaping the workpiece but also an opposed outer surface 63 having a predetermined shape for operably contacting the die housing 60. The predetermined shape of the outer surface of each forging die is preferably different than the predetermined shape of the internal cavity 70 of the die housing when the plurality of forging dies are in the open position as shown in FIGS. 8 and 12A. However, the forging dies not only move radially inward, but also rotate in the general direction indicated by arrow 67 in FIG. 11 upon insertion into the die housing. Thus, the predetermined shape of the outer surface of each forging die preferably corresponds to the predetermined shape of the internal cavity of the die housing once the forging dies are in the operative or closed position as shown in FIGS. 9 and 12B.

In order to fabricate a plurality of parts from a continuous stock material according to the forming method and apparatus 10 of the present invention, the hex forge 50 is preferably designed such that the continuous stock material 12 can extend longitudinally therethrough. In particular, the plurality of forging dies 52 preferably define an entry port 72 and an exit port 74 which open into the internal cavity defined by the forging dies such that the continuous stock material can extend longitudinally therethrough. In addition, the die housing 60 preferably has an annular configuration so as to permit the continuous stock material to also extend therethrough.

The hex forge 50 also preferably includes means, such as a hydraulically actuated die press 76, for longitudinally advancing the die housing 60 over the plurality of forging dies 52 such that the forging dies are radially closed about the continuous stock material 12. In order to fabricate a plurality of parts from a continuous stock material, the die press of one advantageous embodiment shown in FIGS. 8 and 9 includes an annular piston rod 78 disposed within an annular cylinder 80 which, in turn, defines a lengthwise extending opening through which the continuous stock material extends. In particular, the annular piston rod and the associated piston preferably have a central hole bored therethrough which enables the continuous stock material 10 to pass through the die press. The annular piston rod preferably includes a die press ram 81 which is maintained in operable contact with the die housing such that the controller 30 can hydraulically actuate the die press so as to longitudinally advance the annular piston rod and, correspondingly, the die housing as shown in FIGS. 8 and 9 and as described in block 518 of FIG. 38B.

As shown in FIG. 9, the hex forge 50 preferably includes a frame plate 82 against which the plurality of forging dies 52 are butted, thereby preventing longitudinal advancement of the forging dies. Accordingly, the longitudinal advancement of the annular piston rod 78 forces the die housing 60 over the forging dies such that the forging dies are radially closed about the continuous stock material 12. While the pressure or force required to urge or axially displace the die housing over the forging dies will vary depending upon the processing conditions, including the type of material from which the continuous stock material is formed and the size and shape of the resulting part, a hydraulic press, such as a 500 ton press, has produced spade bits of the present invention from 1050 carbon steel.

Although the die press 76 of the illustrated embodiment includes an annular cylinder 80 and an annular piston rod 78, the die press can include other means of urging or axially displacing the die housing 60 over the plurality of forging dies 52. For example, the hex forge 50 of an alternative embodiment can include a plurality of hydraulic cylinder assemblies disposed concentrically about the continuous stock material 12. According to this embodiment, each of the hydraulic cylinder assemblies may be operably connected to the die housing such that the die housing can be urged over the plurality of forging dies upon actuation of the hydraulic cylinder assemblies.

During the forging operation, the continuous stock material 12 grows longitudinally. In particular, the continuous stock material grows in both an upstream and a downstream longitudinal direction. Thus, the forging apparatus 10 of the present invention preferably includes compensating means for compensating for the longitudinal growth of the continuous stock material. With respect to the hex forge 50 illustrated in FIGS. 8 and 9, the upstream longitudinal growth of the continuous stock material is returned in an upstream direction toward the supply reel 33.

In contrast, the downstream longitudinal growth of the continuous stock material 12, i.e., the longitudinal growth of the continuous stock material between the portion of the continuous stock material which is formed and the fixed portion of the continuous stock material which is clamped by the turning head clamp 44, is compensated for or absorbed by mounting the plurality of forging dies 52, the die housing 60, the frame plate 82 and the die press 76 upon a carriage 84 which is adapted to move longitudinally. In particular, the hex forge 50 preferably includes a carriage which is adapted to move from an initial or rest position in an upstream longitudinal direction by a distance equal to the downstream longitudinal growth of the continuous stock material between the portion of the continuous stock material which is formed and the fixed portion of the continuous stock material which is clamped by the turning head clamp. As a result, the hex forge permits the plurality of forging dies to remain closed about the same portion of the stock material during each respective forming step, while permitting longitudinal growth of the continuous stock material in both longitudinal directions, i.e., in both the upstream and downstream longitudinal directions.

As illustrated in FIGS. 8 and 14, the carriage 84 can include slides 86 which are mounted upon a pair of parallel, longitudinally extending tracks 88 in order to facilitate longitudinal movement of the carriage. In addition, the carriage can be longitudinally biased, such as by a hydraulic spring or other biasing means 90, to prevent excessive movement of the carriage in the upstream longitudinal direction. In particular, the longitudinal biasing of the carriage encourages the portion of the continuous stock material 12 which is formed to expand laterally within the cavity defined by the plurality of forming dies 52 so as to more completely fill the cavity defined thereby.

While the same bias force can be applied to the carriage 84 during the entire forging operation, the controller 30 can be operably connected to the biasing means 90 in order to control the bias force applied thereby. For example, the controller can include a predetermined bias schedule which defines the bias force to be applied over time. Thus, the controller and the biasing means can increase the magnitude of the bias force over time so as to further encourage lateral expansion of the portion of the continuous stock material 12 which is formed.

Figure 38A:
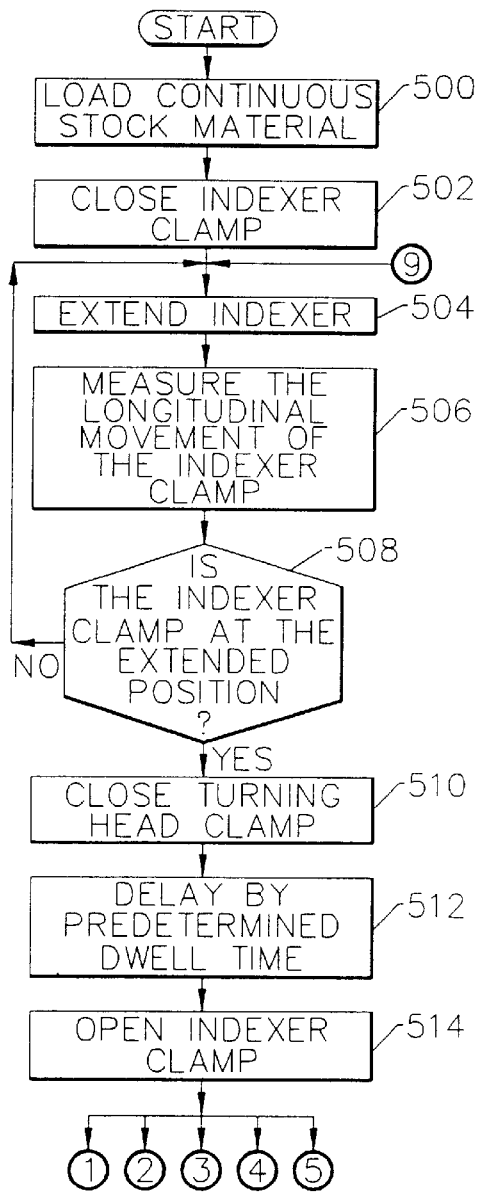
Figure 38B:
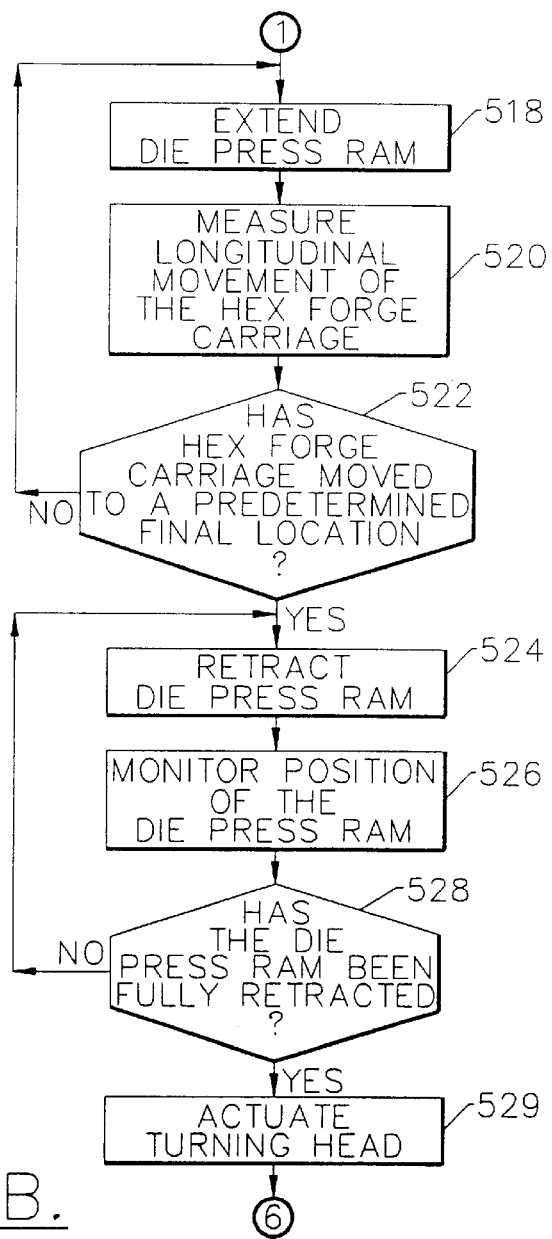
Figure 38G:
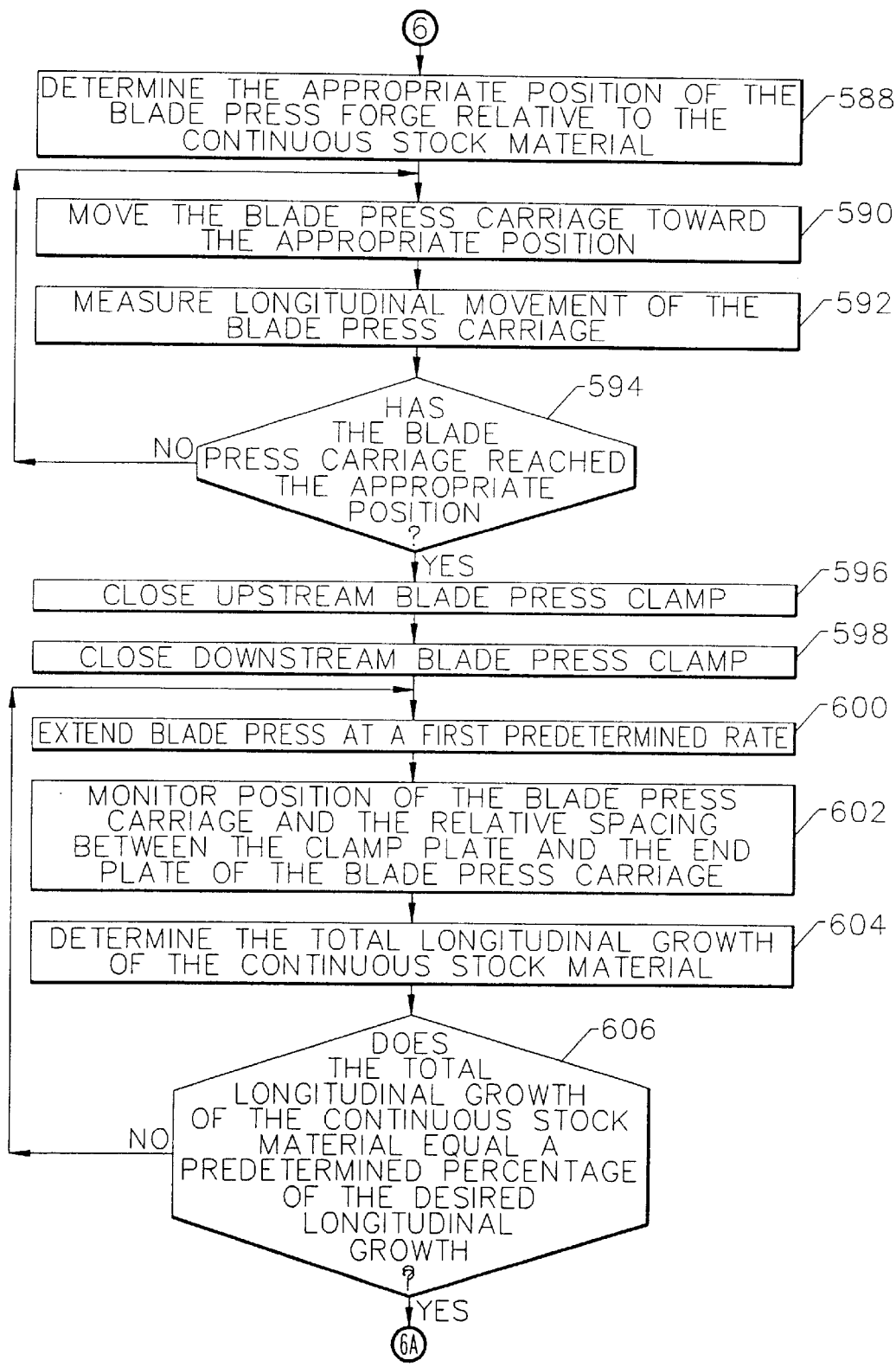
Figure 38H:
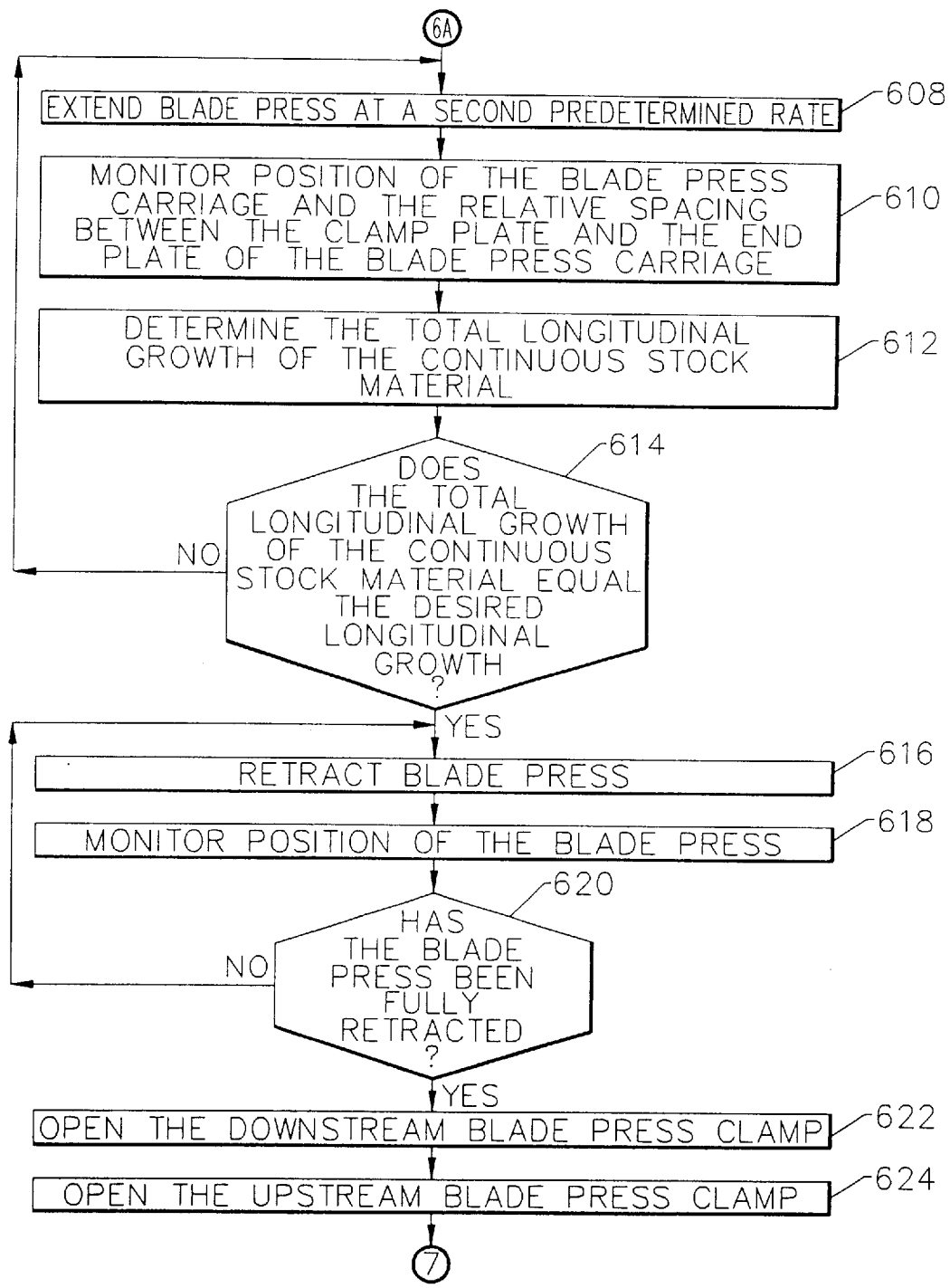
Figure 38I:
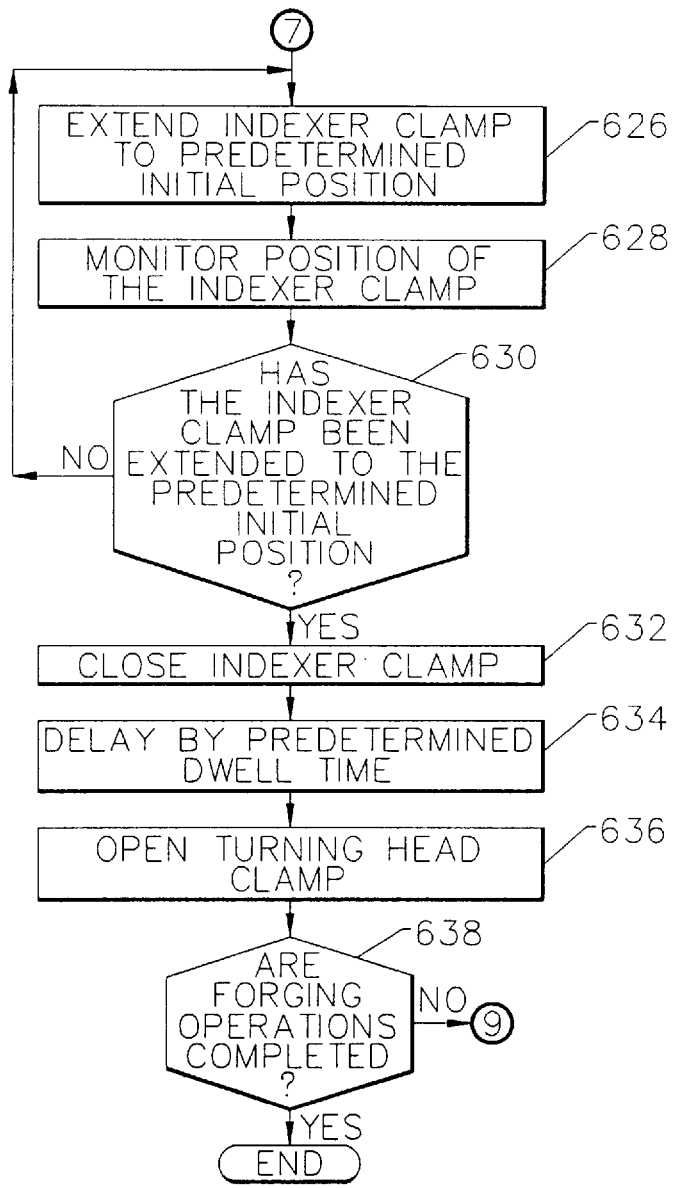

The forming apparatus 10 and, more particularly, the hex forge 50 also preferably includes a hex press position monitor 92, such as an MTS TEMPOSONICS® LP position sensing system, for monitoring the longitudinal position of the carriage 84 as shown in block 520 of FIG. 38B. The controller 30 is also operably connected to the hex press position monitor for determining if the upstream longitudinal movement of the carriage equals or exceeds a predetermined longitudinal growth threshold. Since the longitudinal movement of the carriage equals the longitudinal growth of the continuous stock material 12 in the downstream longitudinal direction which, in turn, is directly related to the extent to which the continuous stock material has been forged, the controller and associated hex press position monitor can effectively monitor the forging operations by measuring the longitudinal growth of the continuous stock material. The controller can then terminate forging operations, such as by ceasing the hydraulic actuation of the die press 76, once longitudinal growth of the continuous stock material is at least as great as a predetermined longitudinal growth threshold, as shown in block 522.

Once the controller 30 has terminated the forging operations, the controller can withdraw the die housing 60 from the plurality of forging dies 52, such as by hydraulically retracting the annular piston rod 78 at least partially within the annular cylinder 80. As described above, the die assembly includes a plurality of springs 56, one of which is associated with each of the plurality of forging dies, for urging the respective forging dies radially outward. Accordingly, upon the removal of the die housing from the plurality of forging dies, the plurality of forging dies are opened such that the continuous stock material 12 can move longitudinally therethrough.

The hex forge 50 can also include positioning means, such as a hydraulic cylinder assembly 94 including a cylinder 96 and an associated piston rod 98, operably connected to the carriage 84 for repositioning the carriage to a predetermined initial or rest position once the plurality of forging dies 52 have been opened. In this regard, the hex forge can include a piston rod monitor 99, such as an MTS TEMPOSONICS® LP position sensing system for monitoring the relative position of the piston rod and, therefore, the hex forge carriage. Accordingly, the controller 30, in response to signals provided by the piston rod monitor, can monitor the relative position of the carriage and can control the positioning means such that the carriage is returned to the predetermined initial or rest position. As will be apparent to those skilled in the art, the positioning means of the hex forge can be implemented in a number of other fashions, such as with an AC servomotor and an associated ballscrew, without departing from the spirit and scope of the present invention.

The hex forge 50 of the illustrated embodiment also preferably includes a die press monitor 100, such as another MTS TEMPOSONICS® LP position sensing system, for monitoring the relative position of the annular piston rod 78 of the die press 76. As described above, the controller 30 is operably connected to the die press monitor so as to determine if the annular piston rod has been retracted to a predetermined initial position. As shown in blocks 524–528 of FIG. 38B, if the annular piston has not been retracted to the predetermined initial position, the controller continues the retraction of the annular piston. Once the annular piston has been retracted to the predetermined initial position, however, the controller halts the retraction of the annular piston.

In addition to terminating forging operations upon detecting that the continuous stock material 12 has grown by a predetermined longitudinal amount, the forging apparatus 10 and, more particularly, the controller 30 preferably increase the rate at which the indexer 14 is retracted once forging operations are terminated. In particular, the controller preferably retracts the annular piston rod 24 of the indexer cylinder assembly 22 and, as a result, the indexer clamp 16 at a second predetermined rate once the forging operations have terminated. Typically, the second predetermined rate is greater than the first predetermined rate. During the retraction of the indexer clamp, the controller, in response to signals provided by the indexer monitor 28, preferably monitors the relative position of the indexer clamp and halts further retraction of the annular piston rod and the indexer clamp once the indexer clamp is at a predetermined retracted position, as shown in blocks 530–534 of FIG. 38C. While the predetermined retracted position can be the same as the predetermined initial or rest position of the indexer, the forming apparatus of one advantageous embodiment preferably retracts the indexer to a retracted position which is longitudinally rearward of the initial or rest position by a relatively small predetermined longitudinal distance, such as 0.005 inch, in order to compensate for additional movement of the continuous stock material once the turning head clamp 44 is released.

Once the controller 30 has terminated forging operations and retracted the die housing 60 of the hex forge 50, the die housing can be rotated relative to the plurality of forging dies 52 such that the wear and degradation of the die housing occasioned by the relative motion of the die housing and the plurality of forging dies is spread relatively evenly about the circumference of the die housing. As shown in FIG. 13, the die housing can include a toothed gear 102 which is adapted to be engaged by a rack 103 once the die housing has been retracted and forging operations have terminated. The rack is preferably rotatably mounted to the carriage such that rotation of the rack, typically under control of the controller 30, will rotate the die housing in a like manner.

Although not illustrated, the hex forge die assembly could be rotated in addition to or instead of rotating the die housing 60. In addition to promoting more even wear of the die housing, rotation of the hex forge die assembly would also allow different parts to be forged into respective predetermined shapes which are disposed at different angular orientations relative to the continuous stock material, thereby further increasing the versatility of the forming method and apparatus 10 of the present invention.

The continuous stock material 12 preferably includes one or more registration features 104 disposed at predetermined locations along its length. See, for example, FIGS. 3A–3G. While the continuous stock material can include the registration features prior to commencing the forming method of the present invention, the forming method and apparatus 10 typically creates or forms the registration features during the fabrication process. For example, while the turning head clamp 44 is securely gripping a fixed portion of the continuous stock material, the forming apparatus 10 of the illustrated embodiment preferably forms a predetermined registration feature on the continuous stock material. The registration feature is preferably defined between each of the plurality of parts which will be formed from the continuous stock material. However, the registration feature can be formed at other predetermined locations without departing from the spirit and scope of the present invention.

While the turning head 45 is described hereinafter as forming the registration feature 104 following the initial forging operation, the turning head can form the registration feature at any time while the turning head clamp 44 securely grips the fixed portion of the continuous stock material 12 without departing from the spirit and scope of the present invention. In addition, the forming method and apparatus 10 can form the registration features in other manners, such as by printing a plurality of longitudinally spaced apart lines on the continuous stock material or by punching a hole in a predetermined portion of each part.

Figure 17:
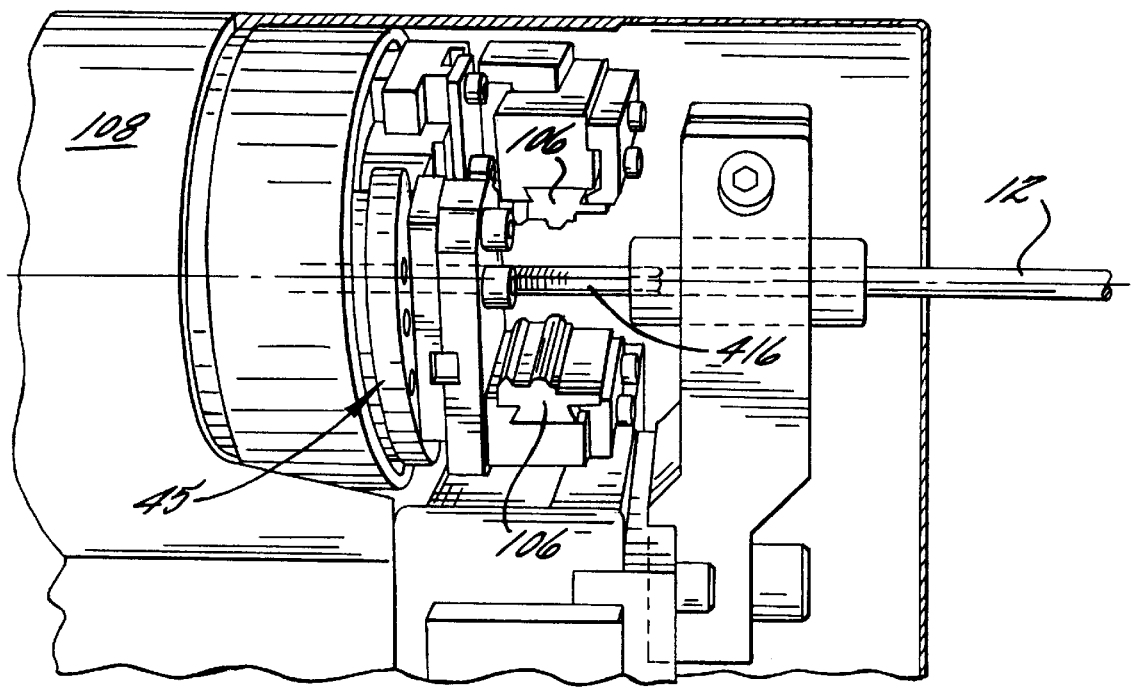
FIG. 17 is a fragmentary perspective view of a portion of the turning head.
Figure 18:
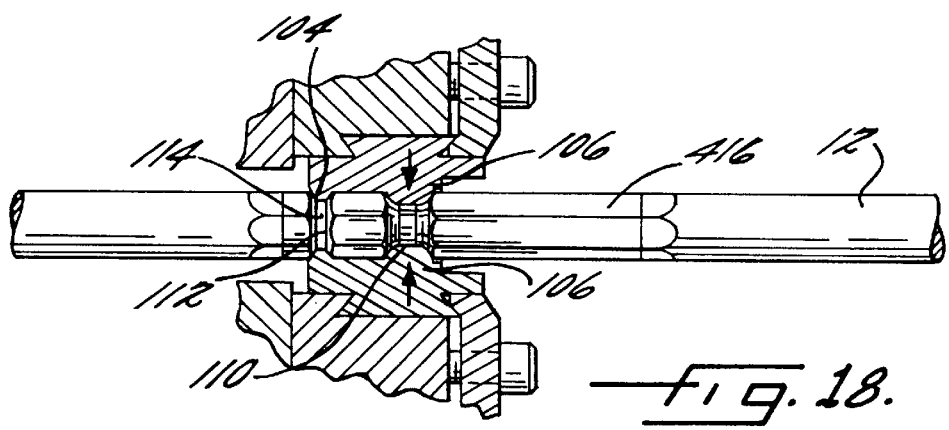
FIG. 18 is a fragmentary cross-sectional view of a portion of the turning head which illustrates the cooperative engagement of the continuous stock material by the turning head dies in order to form a ball groove and chamfered edge on the rear portion of the shank of a spade bit.

According to one embodiment illustrated in FIGS. 15A, 17 and 18 and shown in block 529 of FIG. 38B, the turning head 45, such as a turning head manufactured and sold by Eubama Company of Germany, preferably includes a pair of turning head dies 106 and an associated motor 108 which is adapted to rotate the dies about the continuous stock material 12. The turning head is also adapted to advance the dies in a radially inward direction so as to machine predetermined features into the continuous stock material. For example, the turning head dies can be shaped so as to machine a ball groove 110 within the hexagonally shaped rear portion 416 of the shank 412 of a spade bit 410. In addition, the turning head dies can be shaped so as to machine a chamfered edge 112 on the rearmost portion of the shank of a spade bit. In forming the chamfered edge on the rearmost portion of the shank of the spade bit, the turning head and, in particular, the turning head dies can also form a groove 114 having a sidewall which extends perpendicular to the longitudinal axis of the continuous stock material. As described hereinbelow and as shown in FIG. 3B, the sidewall can thereafter serve as the registration feature 104 during subsequent forming operations.

During the initial forming operation depicted in blocks 518–528, several additional operations can be performed concurrently by the forming method and apparatus 10 of the present invention. These concurrently performed operations are performed, however, on different ones of the parts into which the continuous stock material 12 is formed. In addition, the types of concurrently performed operations will vary depending upon the type of part which is fabricated. For a forming method and apparatus adapted to fabricate a plurality of spade bits 410 from a continuous stock material, however, the spur portion 430 of a first spade bit can be trimmed at the same time as the outer diameter of another spade bit is trimmed. As described hereinbelow, the continuous stock material is still interconnected during these trimming operations. Downstream of and concurrent with these trimming operations, the continuous stock material can be separated into a plurality of discrete parts and, if desired, can be subjected to in-line heat treating either before or after separating the continuous stock material into a plurality of discrete parts.

In order to trim the spur portion 430 of a spade bit 410, the forming method and apparatus 10 of the present invention includes a spur trimming station 116 through which the continuous stock material 12 passes following the forging operations. As shown in FIGS. 27 and 28, the spur trimming station includes a spur trimming station platform 118 and positioning means for controllably positioning the spur trimming station platform such that the appropriate portions of a respective part will be trimmed. While the spur trimming station could be positioned in a variety of manners, such as with an AC servomotor and an associated ballscrew, without departing from the spirit and scope of the present invention, the positioning means of one embodiment includes a hydraulic cylinder assembly 120 including a cylinder 122 and a piston rod 124 which is operably connected to the spur trimming station platform.

As shown in FIG. 28, the spur trimming station 116 also preferably includes a registration monitor 126, such as a photoelectric eye or sensor, which monitors the continuous stock material 12 during the intermittent advancement of the continuous stock material by the indexer 14. The registration monitor is adapted to detect each registration feature 104 defined by the continuous stock material as the continuous stock material is advanced. The spur trimming station also includes a position monitor 128, such as an MTS TEMPOSONIC® LP position sensing system, for monitoring the position of the spur trimming station platform 118.

Both monitors are operably connected to the controller 30. The controller is also operably connected to the indexer monitor 28 so as to determine the additional distance by which the indexer 14 advances the continuous stock material 12 following the detection of the registration feature 104 by the registration monitor 126. Based thereupon, the controller can precisely determine the proper position for the spur trimming station platform 118 during the subsequent trimming operations.

Once the intermittent advance of the continuous stock material 12 has been terminated and the turning head clamp 44 has securely gripped the continuous stock material, the positioning means, under control of the controller 30, can position the spur trimming station platform 118 in a predetermined spaced relationship from the registration feature 104 which was identified by the registration monitor 126 during the most recent advancement of the continuous stock material, as shown in blocks 536–542 of FIG. 38D. In order to facilitate this movement of the spur trimming station platform, the spur trimming station 116 can include a number of slides 130 which cooperate with a pair of longitudinally extending, parallel rails or tracks 132, as shown in FIGS. 27 and 28.

The spur trimming station 116 also includes a pair of opposed spur trim clamps 134 and a pair of opposed spur trim punches 136, all of which are mounted upon the spur trimming station platform 118. Accordingly, once the spur trimming station platform has been appropriately positioned, the controller 30 can extend the opposed spur trim clamps so as to securely hold the stock material 12 in the desired position, as shown in block 544 of FIG. 38D. Each of the opposed spur trim clamps preferably has a contact surface which substantially matches the predetermined shape of the part which is being trimmed, such as the blade portion of a spade bit in one advantageous embodiment.

As shown in block 546, the controller 30 can thereafter extend the opposed spur trim punches so as to selectively remove undesirable portions of the continuous stock material 12. In particular, the spur trim punches are preferably extended past the continuous stock material so as to remove flash and other undesirable portions of the continuous stock material in the vicinity of the spur. Once these undesirable portions have been removed, the spur of the resulting spade bit is more sharply defined as shown in FIG. 3D. As also illustrated in FIG. 3D, however, the spade bit remains attached to other portions of the continuous stock material during the trimming process. Following extension of the spur trim punches, the controller retracts the spur trim punches and the spur trim clamps and the trimmed portions are removed, such as by blowing air thereover for a predetermined period of time, as shown in blocks 548–552. Thereafter, the positioning means, operating under control of the controller, can reposition the spur trimming station platform 118 at a predetermined initial or rest position.

Concurrent with the trimming of the spur of one spade bit, the forming method and apparatus 10 of one advantageous embodiment of the present invention also trims the outer diameter of another spade bit. As described above in conjunction with the spur trimming station 116, the forming method and apparatus of the present invention includes a outer diameter trimming station 138 through which the continuous stock material 12 extends. According to the present invention, the outer diameter trimming station includes an outer diameter trimming station platform 140 and positioning means for controllably positioning the outer diameter trimming station platform such that the appropriate portions of a respective part will be trimmed. While the outer diameter trimming station could be positioned in a variety of manners, such as via an AC servomotor and an associated ballscrew, without departing from the spirit and scope of the present invention, the positioning means of one embodiment includes a hydraulic cylinder assembly 142 including a cylinder 144 and a piston rod 146 which is operably connected to the outer diameter trimming station platform.

As shown in FIG. 28, the outer diameter trimming station 138 also preferably includes a registration monitor 148, such as a photoelectric eye or sensor, which monitors the continuous stock material 12 during the intermittent advancement of the continuous stock material by the indexer 14. The registration monitor detects each registration feature 104 defined by the continuous stock material as the continuous stock material is advanced. The outer diameter trimming station also includes a position monitor 150, such as an MTS Temposonics® LP position sensing system, for monitoring the position of the outer diameter trimming station platform 10. As described above in conjunction with the spur trimming station 116, both monitors are operably connected to the controller 30 such that the controller can precisely determine the location of the registration feature and the relative position of the outer diameter trimming station platform.

Once the intermittent advance of the continuous stock material 12 has been terminated and the turning head clamp 44 has securely gripped the continuous stock material, the positioning means, under control of the controller 30, can position the outer diameter trimming station platform 140 in a predetermined spaced relationship from the registration feature 104 which was identified by the registration monitor 148 during the most recent advancement of the continuous stock material, as shown in blocks 554–560 of FIG. 38E. In order to facilitate this movement of the outer diameter trimming station platform, the outer diameter trimming station 138 can include a number of slides 152 which ride upon and cooperate with a pair of longitudinal extending, parallel rails or tracks 154.

The outer diameter trimming station 138 also includes a pair of opposed outer diameter trim clamps 156 and a pair of opposed outer diameter trim punches 158, all of which are mounted upon the outer diameter trimming station platform 140. Accordingly, once the outer diameter trimming station platform has been appropriately positioned, the controller 30 can extend the opposed outer diameter trim clamps so as to securely hold the stock material 12 in the desired position, as shown in block 562 of FIG. 38E. Each of the opposed outer diameter trim clamps preferably has a contact surface which substantially matches the predetermined shape of the part which is being trimmed, such as the blade portion of a spade bit in one advantageous embodiment.

As shown in block 564, the controller 30 can thereafter extend the opposed outer diameter trim punches 150 so as to selectively remove undesirable portions of the continuous stock material 12. In particular, the outer diameter trim punches are preferably extended past the continuous stock material so as to remove flash and other undesirable portions of the continuous stock material along the outer diameter of the part. Once these undesirable portions have been removed, the outer diameter of the resulting spade bit is more sharply defined as shown in FIG. 3E. As also illustrated in FIG. 3E, however, the spade bit remains attached to other portions of the continuous stock material during the trimming process. Following extension of the outer diameter trim punches, the controller retracts the outer diameter trim punches and the outer diameter trim clamps, as shown in blocks 566–570.

Downstream of both the spur trimming and outer diameter trimming stations, the forming apparatus 10 can include a saw station 160 for separating the continuous stock material 12 into discrete parts. As described above in conjunction with the spur trimming and outer diameter trimming stations and as shown in FIGS. 27 and 28, the saw station preferably includes a saw station platform 161 positioning means for controllably positioning the saw station such that the appropriate portion of the continuous stock material will be cut. While the saw station could be positioned in a variety of manners, such as with an AC servomotor and an associated ballscrew, without departing from the spirit and scope of the present invention, the positioning means of one embodiment includes a hydraulic cylinder assembly 162 including a cylinder 164 and a piston rod 166 which is operably connected to the saw station platform.

The saw station 160 also preferably includes a registration monitor 168, such as a photoelectric eye or sensor, for monitoring the continuous stock material 12 during the intermittent advancement of the stock material. The registration monitor detects each registration features 104 defined by the continuous stock material as the continuous stock material is intermittently advanced. The saw station also preferably includes a position monitor 170, such as an MTS TEMPOSONICS® LP position sensing system, for monitoring the position of the saw station platform 161. As described above in conjunction with the spur trimming station 116, both monitors are operably connected to the controller 30 such that the controller can precisely determine the location of the registration feature and the relative position of the saw station platform.

Once the intermittent advancement of the continuous stock material 12 has been terminated and the turning head clamp 44 has securely gripped the continuous stock material, the positioning means, under control of the controller 30, can position the saw station platform 161 in a predetermined spaced relationship from the most recently identified registration feature 104, as shown in blocks 572–578 of FIG. 38F. In order to facilitate movement of the saw station platform, the saw station 160 can also include a number of slides 172 which ride upon and cooperate with a pair of longitudinally extending, parallel rails or tracks 154.

Referring now to FIGS. 30–33, the forming apparatus 10 of the present invention can also include a size stamp station 176 which includes one or more size stamp clamps 178. For example, the size stamp station can include a size stamp turret which includes a number of size stamp clamps angularly arranged about a central hub. As shown, the size stamp station of this embodiment can include a motor 182 operably connected to the size stamp turret, such as via a belt, and to the controller 30 for controllably rotating the size stamp turret. However, the size stamp platform can be configured in other arrangements without departing from the spirit and scope of the present invention.

The size stamp station 176 also includes positioning means 181, responsive to the controller 30 for controllably positioning the size stamp platform 180. In one embodiment, the positioning means includes a stepper motor 183 which is operably connected to a lead screw 184 for controllably advancing and retracting the lead screw through a fixed nut 186. Since the lead screw is also operably connected to the size stamp platform, relative movement of the lead screw also moves the size stamp platform. According to one embodiment, the stepper motor includes a resolver, operably connected to the controller, for monitoring and controlling the position of the size stamp platform. However, the positioning means can controllably position the size stamp station according to other techniques without departing from the spirit and scope of the present invention.

According to one advantageous embodiment, the size stamp platform 180 is advanced by the positioning means in an upstream longitudinal direction from a predetermined initial position once the saw station platform 161 has been properly positioned. As shown in block 580, the positioning means preferably advances the size stamp platform in an upstream longitudinal direction until the free or leading end of the continuous stock material 12 is received within a size stamp clamp 178. In the illustrated embodiment, the size stamp platform is advanced in an upstream longitudinal direction until the blade portion of the leading spade bit is received within the size stamp clamp.

As shown in FIG. 32, each size stamp clamp 178 includes a size stamp die assembly comprised of a die assembly which includes an alignment fixture 190, such as a spider, and a plurality of size stamp dies 188 which are held within the alignment fixture. The size stamp clamp can also include a closure 192 which is adapted to receive the size stamp die assembly. The size stamp station 176 can also include means, such as a hydraulic cylinder assembly 194 which operates under control of the controller 30, for urging the closure over the size stamp die assembly such that the size stamp dies are closed about the leading end of the continuous stock material as shown in block 582 of FIG. 38F.

The size stamp dies 188 preferably have a shape which matches the shape of the part to be held by the size stamp clamp 178, such as the shape of the blade portion 418 of a spade bit 410. The size stamp dies also preferably include one or more raised numerals for imprinting the size of the respective spade bit upon the blade portion thereof. While size stamp dies are illustrated which are adapted to imprint the size of the respective part upon the part thereon, the size stamp dies need only serve as a clamp for holding or gripping the leading end of the continuous stock material 12. Thus, the size stamp dies may have a shape which matches the shape of the part to be held, but need not include the raised numerals described above.

While the blade portion 418 of the spade bit 410 is held by the size stamp clamp 178, the controller 30 can advance the saw 198 toward the continuous stock material so as to cut through the connector portion 200 of the continuous stock material which interconnects a pair of adjacent parts. As shown in dashed lines in FIG. 29, the saw is rotatably advanced so as to cut through the connector, thereby separating the leading part from the remainder of the connector, as shown in FIG. 3F and in block 584 of FIG. 38F. The saw station 160 can also include a proximity sensor, operably connected to the controller, for detecting the advancement of the saw to a predetermined position. Thereafter, the controller can retract the saw to its initial position as shown in solid lines in FIG. 29.

Once the connector 200 has been cut and the controller 30 has retracted the saw 198, the positioning means of the size stamp station 176, under control of the controller, moves the size stamp station platform 180 in a downstream longitudinal direction, as shown in FIGS. 30, 31 and 33 and in block 586 of FIG. 38F. Preferably, the size stamp station platform is moved in a downstream longitudinal direction by a linear distance which exceeds the longitudinal growth of the continuous stock material 12 in the downstream longitudinal direction during one sequence of forming operations. For example, the size stamp station can be moved in a downstream longitudinal direction by the expected amount of longitudinal growth of the continuous stock material in the downstream direction plus a predetermined additional amount, such as 0.100 inch. As shown in FIGS. 30, 31 and 33, the size stamp platform can be moved from an upstream position as depicted in dashed lines to a downstream position as depicted in solid lines.

Accordingly, additional portions of the continuous stock material 12 can now be forged without contacting the discrete part held by the size stamp clamp 178. Thus, the forming method and apparatus 10 of the present invention can continue to process the discrete part held by the size stamp clamp while forming additional portions of the continuous stock material at the same time.

In particular, the forming apparatus 10 of the present invention can include one or more additional forges, such as a second forge 204 for forming another portion of the continuous stock material 12 into a second predetermined shape, as shown in detail in FIGS. 19 and 20. Thus, the parts formed by the forming method and apparatus of the present invention can include both the first and second shapes imparted by the first and second forges, respectively, at different stages along the forming process. As described above in conjunction with the hex forge 50, the second forge of one advantageous embodiment preferably includes a blade press forge for forming the blade portion of the resulting spade bits as shown in FIG. 3C. However, the second forge can be adapted to form a variety of different features on one or more portions of other types of parts without departing from the spirit and scope of the present invention.

As also described above in conjunction with hex forge 50 and as shown in FIGS. 19–22, the blade press forge 204 preferably includes a pair of opposed forging dies 206 which cooperate to define a cavity having a predetermined shape. The cavity, in turn, defines the shape of at least a portion of the resulting part, such as the blade portion of the resulting spade bit. With respect to the illustrated embodiment of the forming method and apparatus 10 which is adapted to form spade bits, at least one, and, more preferably, each forging die can include a contact surface 208 of a somewhat Z-shaped configuration which defines a portion of the cavity.

As shown in FIGS. 21 and 22, the Z-shaped cavity includes a central portion 210 defining a central plane and opposed side portions or wings 212 extending from opposite sides of the central portion. The opposed side portions define respective lateral planes which are oblique to the central plane. The respective contact surfaces 208 of the opposed forging dies 206 contact and shape the workpiece into the predetermined shape of a portion of the resulting part.

The contact surface 208 of at least one forging die 206 defines at least one contact plane which, according to one embodiment, is oblique to the predetermined direction in which the forging dies are closed. For example, as shown in FIGS. 21 and 22, the center portions 210 of the respective contact surfaces are oblique to the predetermined direction in which the forging dies are closed and define respective contact planes. More particularly, an angle is defined between the respective contact planes and a reference plane perpendicular to the predetermined direction in which the forging dies move as shown in FIG. 22. In a preferred embodiment, the angle is between about 10° and about 20° and, in one specific example, is about 15°.

As a result of the oblique orientation of the respective contact planes to the predetermined direction in which the forging dies 206 are closed, the contact planes of the forging dies impart both axial and radial forces to the workpiece which, in turn, result in compressive, tensile and shear stresses within the workpiece during the deformation process. The resulting compressive, tensile and shear force components deform the workpiece outwardly into the predetermined shape defined by the forging dies.

As described above, the application of shear forces to deform a workpiece significantly increases the forces which the forging dies 206 and a surrounding die housing 218 must withstand during the forging process. In order to withstand the increased forces, the opposed forging dies and the die housing are comprised, in one preferred embodiment, of a high speed steel and, more preferably, are comprised of CPM® REX™ M4 high speed steel, or an equivalent, marketed by Colt Industries Crucible Specialty Metals Division of Syracuse, N.Y.

In addition, the energy required to deform a workpiece with shear forces is generally less than the corresponding energy required to deform a similar workpiece with compressive forces. However, for parts which have a relatively small diameter, such as spade bits having a diameter of about $\frac{3}{8}$ inch or less, in which deformation of the workpiece with shear forces will not conserve a significant amount of input energy, the angle 214 defined between the respective contact planes and the reference plane 216 is decreased, or eliminated, such that increasing amounts of compressive force are imparted to the workpiece and the deformation process proceeds effectively, particularly since the working stroke is generally reduced. In these embodiments, however, shear forces can still be imparted, albeit in lesser amounts, by the contact surfaces which include oblique lateral portions such as illustrated by the Z-shaped cavity of FIGS. 19–22. For parts with a relatively large diameter, such as spade bits having a diameter of about $\frac{7}{16}$ inch or greater, in which deformation of the workpiece with shear force will conserve a significant amount of input energy, the respective contact planes are preferably disposed at an angle, such as 15°, for example, with respect to the reference plane.

The blade press forge 204 also preferably includes an alignment fixture 220, such as a spider, for maintaining the pair of opposed forging dies 206 in a predetermined aligned relationship during the forging process. The alignment fixture and the pair of opposed forging dies comprise a die assembly which, in one preferred embodiment, is frustoconical in shape.

The blade press forge 204 further includes means, such as a die housing 218, for radially closing the opposed forging dies 206. In particular, the forging dies move radially inward in a predetermined direction, as shown by the arrows in FIGS. 20 and 22, upon relative movement between the die housing and the pair of opposed forging dies as described in more detail below. The die housing preferably defines an internal cavity 222 which has a shape, such as frustoconical, which is complimentary to the shape of the die assembly.

As described above in conjunction with the hex forge 50, the die housing 218 is preferably urged over the die assembly so as to close the forging dies 206 about a portion of the continuous stock material 12. As shown in FIG. 19, the blade press forge 204 preferably includes a blade press 224 for urging the die housing over the die assembly. As shown, the blade press can include an annular cylinder 226 and an annular piston rod 228 which is at least partially disposed within the cylinder and through which the continuous stock material extends. One end of the annular piston rod is also operably connected to the die housing such that movement of the annular piston rod also moves the die housing.

As shown in FIGS. 19 and 20, the blade press forge 204 includes a frame plate 230 against which the opposed forging dies 206 are butted, thereby preventing longitudinal advancement of the forging dies. Thus, the controller 30 can extend the annular piston rod 228, such as by hydraulically actuating the blade press 224, to urge the die housing 218 over the die assembly, thereby closing the pair of opposed forging dies about a portion of the continuous stock material 12. While an annular cylinder 226 and an annular piston rod are illustrated and described, the blade press can also include other means for moving the die housing relative to the pair of opposed forging dies, such as a plurality of hydraulic cylinder assemblies which are in operative contact with the die housing and which are concentrically disposed about the continuous stock material. Further, while the pressure or force required to urge or axially displace the die housing over the die assembly will vary depending upon the processing conditions, including the type of material from which the workpiece is formed and the size and shape of the resulting part, a hydraulic blade press, such as a 500 ton press, has produced spade bits of the present invention from 1050 carbon steel.

In order to form parts of the desired shape and size, the blade press forge 204 press preferably acts upon or forges only a predetermined portion of the continuous stock material 12. In particular, the blade press forge preferably only deforms a portion of the continuous stock material which is spaced by a predetermined longitudinal distance from a respective registration feature 104. Thus, the blade press forge and the continuous stock material must be precisely aligned to insure that the blade press forge deforms the proper portion of the continuous stock material. Preferably, the first and second forges, namely, the hex forge 50 and the blade press forge in the exemplary embodiment, both forge portions of the same part, albeit at different stages in the fabrication process. Thus, each part can have both the first and second predetermined shapes imparted by the first and second forges, respectively.

As described above in conjunction with the hex forge 50, the blade press forge 204 preferably includes a carriage 232 on which the blade press 224, the die housing 218, the pair of opposing forging dies 206 and the frame plate 230 are mounted. The blade press carriage is preferably adapted for controlled longitudinal movement. As such, the blade press forge can include one or more slides 233 which ride upon and cooperate with longitudinally extending, parallel rails or tracks 235. In addition, the blade press preferably includes positioning means, such as a hydraulic cylinder assembly 224 including a hydraulic cylinder 226 and a piston rod 228, disposed in operable contact with the blade press carriage and responsive to the controller 30 such that the controller can controllably position the blade press carriage by hydraulically actuating the hydraulic cylinder assembly.

As shown in FIG. 24, the blade press forge 204 also preferably includes a pair of position sensors, such as MTS TEMPOSONICS® LP position sensing systems. These position sensors can include a blade press carriage position sensor 240, for monitoring the relative position of the blade press carriage 232 and for providing the controller 30 with signals indicative of the relative position of the blade press carriage. In addition, the position sensors can include a piston rod position sensor 241 for monitoring the relative position of the piston rod 238 and, therefore, the blade press carriage and for providing the controller with signals indicative of the relative position of the piston rod.

Referring now to FIG. 20, the blade press forge 204 of the present invention also preferably includes a registration monitor 242, such as a photoelectric eye or sensor, which monitors the continuous stock material 12 during the intermittent advancement of the continuous stock material by the indexer 14. The registration monitor detects each registration feature defined by the continuous stock material as the continuous stock material advances. As described above in conjunction with the spur trimming station 116, the controller 30 is preferably operably connected to the registration monitor and the position sensors such that the controller can controllably position the blade press carriage 232 based upon the relative position of the blade press carriage and the location of the registration feature such that the pair of opposed forging dies 206 contact a portion of the continuous stock material which is disposed in a predetermined spaced relationship from the registration feature identified during the most recent advance of the continuous stock material. See blocks 588–594 of FIG. 38G.

Once the blade press carriage 232 has been properly positioned, a portion of the continuous stock material 12 upstream of the forging dies 206 is securely gripped, as shown in block 596. In particular, the blade press forge 204 preferably includes an upstream clamp 244 for securely gripping a portion of the continuous stock material which, in one embodiment, will eventually be a medial portion of the shank of the resulting spade bit. As described above in conjunction with other clamps and as shown in FIG. 20, the upstream clamp preferably includes an annular collet 246 through which the continuous stock material extends. The upstream clamp also preferably includes an annular closure 248 and a hydraulic cylinder assembly 250, operating under control of the controller 30, for urging the annular closure over the annular collet such that the collet is closed about and securely grips the continuous stock material extending therethrough.

Thereafter, a portion of the continuous stock material 12 downstream of the forging dies 206 is securely gripped. In particular, the blade press forge 204 also preferably includes a downstream clamp 252 for securely gripping a portion of the continuous stock material downstream of the forging dies as shown in block 598. In particular, the downstream clamp preferably grips the connector 200 which extends between and joins a pair of adjacent parts, such as a pair of adjacent spade bits.

While the downstream clamp 252 can be configured in a variety of manners without departing from the spirit and scope of the present invention, the downstream clamp of one advantageous embodiment is shown in FIG. 22 and includes a pair of dies 254 disposed within a respective alignment fixture 256. The alignment fixture, in turn, is mounted to and extends outwardly in an upstream longitudinal direction from a clamp plate 258 as illustrated in FIGS. 19, 20 and 23. As shown in FIG. 23, the clamp plate includes a cam sleeve 259 which receives the alignment fixture and which defines a pair of opposed pockets 260 which are adapted to receive outer portions of the dies. As also shown in FIG. 23, the outer portions of the dies which are disposed within respective pockets preferably include a respective outer cam surface 262. Thus, upon rotation of the cam sleeve relative to the alignment fixture and the dies, the outer cam surfaces of the dies and the pockets defined by the cam sleeve will cooperate to force the dies inward toward the continuous stock material 12 so as to securely grip the continuous stock material therebetween.

As shown in FIGS. 19, 20, 25 and 26, the blade press forge 204 can include a lever arm 264 which is operably connected to both the alignment fixture 256 and the controller 30. Accordingly, the controller can rotate the lever arm by a predetermined amount, such as by hydraulic actuation of an associated hydraulic cylinder assembly 266. By rotating the lever arm, the alignment fixture is correspondingly rotated relative to the clamp plate 258. The blade press forge can also include a proximity sensor, operably connected to the controller, for detecting that the lever arm has been rotated by the predetermined amount. Alternatively, the blade press forge can include a pressure switch, operably connected to the hydraulic cylinder assembly and the controller, for detecting the hydraulic pressure supplied to rotate the lever arm. In either instance, the controller can then halt further rotation of the lever arm upon the detection of sufficient rotation of the lever arm or of a sufficient supply of hydraulic pressure since the downstream clamp 252 should already be securely gripping the continuous stock material 12.

Once the upstream and downstream clamps have been closed about the continuous stock material 12, the blade press 224 preferably urges the die housing 218 about the die assembly such that the pair of opposed forging dies 206 are radially closed about the continuous stock material. While the part is forged, the continuous stock material grows in both the upstream and downstream longitudinal directions, as described above. In particular, the portion of the continuous stock material between the forged portion and the downstream clamp 252 will grow in a downstream longitudinal direction, while the portion of the continuous stock material between the forged portion and the upstream clamp 244 will grow in the upstream longitudinal direction.

The blade press forge 204 of the present invention compensates for the longitudinal growth of the continuous stock material 12 in the upstream longitudinal direction by permitting the blade press carriage 232 to move in a downstream longitudinal direction. In particular, the blade press carriage will move in a downstream longitudinal direction by a linear distance equal to the growth of the continuous stock material in the upstream longitudinal direction. Preferably, the blade press forge includes means, such as one or more hydraulic springs 268, for longitudinally biasing the blade press carriage so as to retard the downstream longitudinal movement of the blade press carriage, thereby encouraging lateral expansion of the forged portion of the continuous stock material such that the forged portion fills the cavity defined by the pair of opposed forging dies 206.

As illustrated in FIGS. 20, 25 and 26, the clamp plate 258 in which the downstream clamp 252 is disposed is mounted to the frame plate 228 of the blade press carriage 232. In particular, the clamp plate is preferably mounted to the frame plate of the blade press carriage in such a manner that the spacing or the distance between the clamp plate and the frame plate can be varied. In particular, the clamp plate is preferably biased toward the frame plate of the blade press carriage, such as with one or more hydraulic springs 270.

By overcoming the bias force applied by the hydraulic springs 270, however, the clamp plate 258 and, therefore, the downstream clamp 252 can be urged further away from the frame plate 228 of the blade press carriage 232. According to the present invention, the growth of the continuous stock material 12 in the downstream longitudinal direction during forging operations will supply a sufficient force to the downstream clamp and, as a result, to the clamp plate so as to overcome the predetermined bias force and to force the clamp plate further away from the frame plate of the blade press carriage, thereby compensating for longitudinal growth of the continuous stock material on the downstream longitudinal direction during the forging operation.

As described above in conjunction with the hex forge 50, the controller 30 can be operably connected to one or more of the hydraulic springs 270 such that the predetermined longitudinal bias force supplied by the respective hydraulic springs can be varied over time according to a predetermined schedule. For example, the controller can gradually increase the predetermined longitudinal bias force over time to ensure that the portion of the continuous stock material 12 which is forged will expand laterally to fill the cavity defined by the forging dies 206, while at the same time compensating for longitudinal growth of the continuous stock material during the forging operation.

The blade press forge 204 also preferably includes a pair of growth sensors for monitoring the longitudinal growth of the continuous stock material 12. As shown in FIGS. 19 and 24, the blade press carriage position sensor 240 measures the longitudinal growth of the continuous stock material in the upstream longitudinal direction by monitoring the downstream longitudinal movement of the blade press carriage 232. As shown in FIGS. 25 and 26, the blade press forge also preferably includes a downstream growth sensor 274 which measures the longitudinal growth of the continuous stock material in the downstream longitudinal direction by monitoring the relative spacing of the clamp plate 258 from the frame plate 230 of the blade press carriage.

The controller 30 is operably connected to both the upstream and downstream growth sensors such that by summing the respective longitudinal growth measured by both the growth sensors, the controller can determine the total longitudinal growth of the continuous stock material 12 in both longitudinal directions. Since the longitudinal growth of the continuous stock material is directly related to the extent of forging, the longitudinal growth of the continuous stock material measured by the upstream and downstream growth sensors is, in effect, a measurement of the extent of the forging which has been conducted.

During forging operations of one advantageous embodiment, the blade press 224 initially urges the die housing 218 over the die assembly at a relatively rapid first predetermined rate, as shown in block 600. As the forging operations continue, however, the blade press preferably urges the die housing over the die assembly at a slower second predetermined rate. For example, the blade press of one advantageous embodiment preferably urges the die housing over the die assembly at a relatively rapid rate until the controller 30 and the growth sensors determine that the combined longitudinal growth of the continuous stock material 12 in both the upstream and downstream longitudinal directions equals a predetermined percentage, such as 90%, of the entire longitudinal growth of the continuous stock material anticipated during the blade press forging operation. Once the predetermined percentage, such as 90%, of the total expected longitudinal growth of the continuous stock material is reached, the blade press preferably slows the advancement of die housing over the die assembly, while continuing to monitor the longitudinal growth of the continuous stock material in both the upstream and downstream longitudinal directions. Once the controller and the growth sensors determine that the longitudinal growth of the continuous stock material in both the upstream and downstream longitudinal directions equals the total anticipated longitudinal growth of the continuous stock material, the controller can halt further advancement of the die housing over the die assembly, thereby terminating the forging of the blade portion of the spade bit. See blocks 602–614 of FIGS. 38G and 38H.

Once the controller 30 has terminated forging operations, the blade press 224 retracts or withdraws the die housing 218 from the die assembly 206 as shown in block 616. As described above in conjunction with the hex forge 50, the die assembly preferably includes a plurality of springs 276, one of which is associated with each of the forging dies, for urging the respective forging dies in a radially outward direction. Therefore, as the blade press retracts the die housing, the pair of opposed forging dies open or move radially outward so as to permit the continuous stock material 12 to move longitudinally therethrough.

As shown in FIG. 15B, the blade press forge also preferably includes a sensor 278, such as an MTS TEMPOSONICS® LP position sensing system, for monitoring the relative position of the annular piston rod 228 of the blade press 224. As shown in blocks 618 and 620, the controller 30 is also operably connected to the sensor so as to terminate the retraction of the annular piston rod once the annular piston rod has returned to a predetermined rest or initial position. Thereafter, the controller can open the downstream clamp 252 by hydraulically rotating the lever arm 264 such that the lever arm is also returned to its predetermined initial or rest position. Subsequently, the controller can open the upstream clamp 244 by hydraulically retracting the upstream closure 248. See blocks 622 and 624 of FIG. 36.

As illustrated in FIGS. 19 and 24, the blade press forge 204 can also include positioning means, such as an AC servomotor and an associated ballscrew or, as illustrated, a hydraulic cylinder assembly 280 including a hydraulic cylinder 282 and a piston rod 284, operably connected to the blade press carriage 232 and responsive to commands from the controller 30. Accordingly, the controller can return the blade press carriage to a predetermined initial or starting position by hydraulically actuating the cylinder assembly and by repeatedly monitoring the position of the piston rod and, therefore, the blade press carriage with the piston rod position sensor 241, as shown in blocks 626–630.

As shown in FIGS. 15B and 16, the blade press forge 204 can also include upstream clamp positioning means, such as a hydraulic cylinder assembly 286, operably connected to the upstream clamp 244 and responsive to commands from the controller 30. Based upon the output of the sensor 278, the controller can monitor the position of the annular piston rod 228 and, therefore, the position of the upstream clamp. Accordingly, the controller can controllably position the upstream clamp prior to the forging operations. For example, the controller can adjust the position of the upstream clamp and, therefore, the longitudinal spacing between the upstream and downstream clamps such that parts of different lengths can be engaged and forged. In particular, the controller can move the upstream clamp in an upstream longitudinal direction in order to forge longer parts as shown in dashed lines in FIG. 15B, and can move the downstream clamp in a downstream longitudinal direction in order to forge shorter parts as shown in solid lines in FIG. 15B. As a result, the hydraulic cylinder assembly of the upstream clamp positions means preferably includes one or more wheels 289 for facilitating this longitudinal movement. Although the forming apparatus 10 of the illustrated embodiment includes a separate indexer 14, it is contemplated that the upstream clamp, the upstream clamp positioning means and the upstream clamp monitor could also perform the functions of the indexer, if so desired.

In the illustrated embodiment, however, once all of the forging operations have been completed, the controller 30 can extend the annular piston rod of the indexer 14 such that the indexer clamp 16 is brought to a predetermined starting or initial position. Thereafter, the controller can close the indexer clamp as described above so as to securely grip a portion of the continuous stock material and, following a predetermined dwell time, such as 0.1 seconds, the controller can release the turning head clamp 44. See blocks 632–636 of FIG. 38I. Thereafter, the steps of the forging method of the present invention which are described above and illustrated in FIGS. 38A–38J can be repeated. See block 638.

Following separation of a forged part from the continuous stock material 12, the part preferably undergoes a number of finishing operations. In order to further increase the efficiency of the forming method and apparatus 10 of the present invention, these finishing steps can be conducted at the same time as the second or blade forging operations. However, these finishing operations can also be performed at a later time without departing from the spirit and scope of the present invention.

These finishing operations typically include an additional sawing step as shown in FIGS. 3G and 30. Thus, once the controller 30 has moved the size stamp station platform 180 in the downstream longitudinal direction, the controller also preferably moves the saw station platform 161 in the downstream longitudinal direction, such as by hydraulically actuating the cylinder assembly 162 of the saw station 160. During this movement, the controller preferably monitors the relative position of the saw station platform by means of the saw station position sensor 170. The controller preferably moves the saw station platform such that the saw 198 is aligned with a predetermined portion of the part, such as the rearmost portion of the resulting spade bit, as shown in blocks 640–646 of FIG. 38J. The controller generally determines the position to which the saw station is moved based upon two factors, namely, the linear distance by which the size stamp station platform was moved in the downstream longitudinal direction and the relative position of the registration feature 104 of the now separated part which was identified by the registration monitor 168 during the most recent advancement of the continuous stock material 12.

Figure 38J:
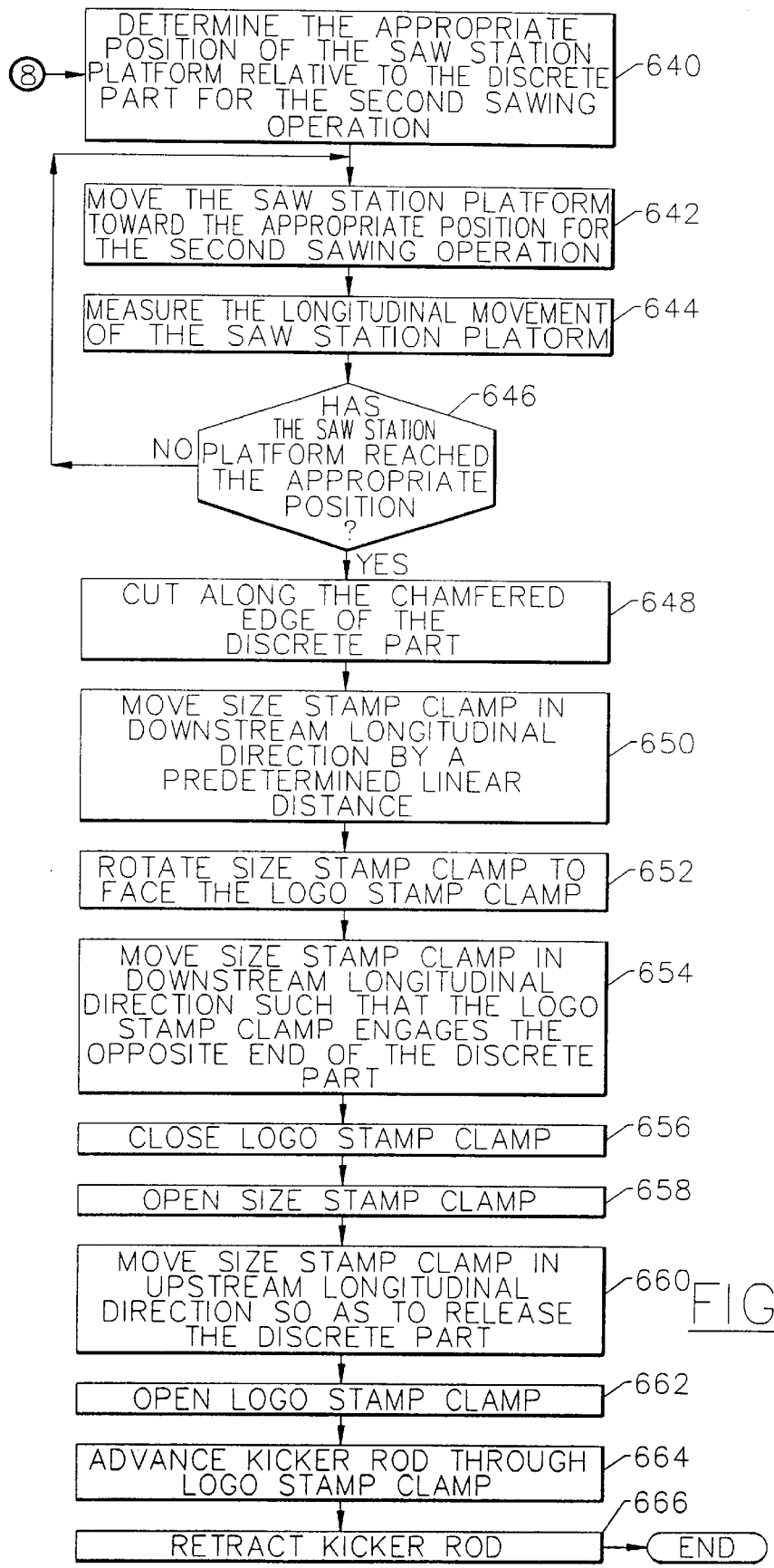

Once the saw station platform 161 has been properly positioned, the controller 30 advances the saw 198 so as to cut a predetermined portion of the part, as shown in dashed lines in FIG. 29 and in block 648 of FIG. 38J. For example, the saw can be advanced so as to cut the part at a point adjacent the chamfered edge which defines the rearmost portion of the shank of the resulting spade bit. Once the saw has been fully advanced, as identified by the proximity sensor, the controller retracts the saw and moves the size stamp station platform 180, by means of the size stamp positioning means, further downstream by a predetermined linear distance, as shown in block 650.

According to the embodiment illustrated in FIGS. 31, 33, 34 and 36, the forming apparatus 10 also includes a logo stamp station 290 for imprinting the logo, name or other identification of the manufacturer of the part thereupon. However, the forging apparatus need not include a logo stamp station if the part need not be imprinted with the identity of the manufacturer. As shown, however, the forming apparatus can include a logo stamp station downstream of the size stamp station 176. Thus, the size stamp clamp is preferably positioned, such as by rotating the size stamp turret as shown in block 652, such that the portion of the part which protrudes from the size stamp clamp 178 extends toward the logo stamp station.

As shown in block 654, the positioning means 181 of the size stamp station 176, under control of the controller 30, can then move the size stamp station platform 180 in a downstream longitudinal direction. In addition, the logo stamp station 290 preferably includes positioning means, such as a hydraulic cylinder assembly 293 or an AC servomotor and an associated ballscrew, for moving the logo stamp station in an upstream longitudinal direction. In order to facilitate this longitudinal movement, the logo stamp station can include one or more slides 295 which ride upon and cooperate with a pair of longitudinally extending, parallel rails 297. The logo stamp station can also include a position monitor 299, such as an MTS TEMPOSONICS® LP position sensing system, for monitoring the relative position of the logo stamp platform. Alternatively, the logo stamp station can employ fixed stops, such as fully extended or fully retracted, to set the position of the logo stamp station. The controller 30 is operably connected to the hydraulic cylinder assembly and the position sensor, if any, so as to control and monitor the movements of the size stamp station and/or the logo stamp station such that the stations are longitudinally moved until the portion of the part which protrudes beyond the size stamp clamp 176, such as the hexagonally shaped rear portion of the shank of the resulting spade bit, is received and engaged by the logo stamp station 290.

The logo stamp station 290 includes a logo stamp clamp 292. As shown in FIG. 32, the logo stamp clamp includes an annular die assembly which, in turn, preferably includes one or more logo stamp dies 296 which have a contact surface with a shape which matches the shape of the part to be stamped and which further includes a raised logo or other predetermined indicia of the manufacturer of the part. The die assembly also preferably includes an alignment fixture 294, such as a spider, in which the logo stamp dies are disposed. The logo stamp clamp also includes an annular logo stamp closure 300 and a hydraulic cylinder assembly 302 for urging the logo stamp closure over the die assembly so as to force the logo stamp dies to move radially inward and into contact with the part. As shown in block 656, once the part is inserted within the logo stamp clamp, the controller 30 actuates the hydraulic cylinder assembly so as to close the logo stamp dies about the part, thereby imprinting the logo or other predetermined indicia on the part so as to identify the manufacturer of the part.

While the part is securely held by the logo stamp clamp 292, the controller 30 preferably opens the size stamp clamp 178, such as by hydraulically retracting the size stamp closure 192, such that the spring-loaded size stamp dies 296 will open. Thereafter, the positioning means of the size stamp station 176, under control of the controller, moves the size stamp station platform 180 in an upstream longitudinal direction such that the part remains held only by the logo stamp clamp. See blocks 658 and 660 of FIG. 38J.

As shown in block 662, the controller 30 thereafter opens the logo stamp clamp 292, such as by hydraulically retracting the logo stamp closure 300 such that the spring-loaded logo stamp dies 296 move radially outward. As shown in FIG. 36, the controller then discharges the resulting part by advancing a kicker rod 304 through the logo stamp station 290 in an upstream longitudinal direction such that the kicker rod contacts an end portion of the resulting part and forces the resulting part out of the logo stamp die assembly. For example, the logo stamp station 290 can include a kicker hydraulic cylinder assembly 305 which operates under control of the controller for advancing and subsequently retracting the kicker rod upon command. Once the part is ejected, the controller can retract the kicker rod and can reposition the logo stamp station platform 291 in its initial or rest position. See blocks 664 and 666.

As shown schematically in FIGS. 1 and 2, the forming apparatus 10 of one embodiment of the present invention can include a conveyor 306 or other type of collection system for collecting and transporting the resulting parts in a controlled fashion. According to one embodiment of the present invention, the resulting parts are thereafter heat treated and shot blasted, prior to undergoing finishing operations and being packaged for shipment and sale. See blocks 308–312 of FIG. 1. These finishing operations can include grinding operations and rust inhibiting operations. The grinding operations are typically performed by a numerically controlled grinder which, in one embodiment, serves to further sharpen and define the forward cutting edges of the resulting spade bit.

As depicted in block 500 of FIG. 38A, the forming apparatus 10 must be initially loaded prior to commencing the forming operations. Thus, the forming apparatus preferably includes a load clamp 314 for securely gripping the continuous stock material 12 during loading operations. As shown in FIG. 7, the load clamp preferably includes an annular collet through which the continuous stock material extends. The load clamp can also include a load closure and a hydraulic cylinder assembly, operably connected to the load closure and responsive to commands from the controller 30. In order to load the continuous stock material into the forming apparatus of this advantageous embodiment, the controller can close the load clamp, such as by hydraulically advancing the load closure over the load collet such that the load collet moves radially inward and securely grips the continuous stock material. The controller also preferably opens all of the other clamps, such as the indexer clamp 16, the turning head clamp 44 and the upstream and downstream blade press clamps 244 and 252, such that the continuous stock material can be extended therethrough.

The forming apparatus 10 and, more particularly, the controller 30 then advances the load clamp 314 by a predetermined linear distance in a downstream longitudinal direction such that the continuous stock material 12 is also advanced by the predetermined linear distance in the downstream longitudinal direction as shown in dashed lines in FIG. 7. In particular, the annular indexer piston rod can be operably connected to the load clamp such that hydraulic actuation of the indexer clamp cylinder can advance the load clamp in the downstream longitudinal direction. In this regard, the load clamp can include one or more slides 315 which ride upon or cooperate with the longitudinally extending, parallel rails or tracks 317.

The controller 30 then opens the load clamp 314, such as hydraulically retracting the load closure such that the annular load collet opens. Once the load clamp has been opened, the controller moves the load clamp by the same predetermined linear distance in the upstream longitudinal direction such that the load clamp returns to a predetermined initial or rest position as shown in solid lines in FIG. 7. For example, in the illustrated embodiment, the controller can hydraulically actuate the indexer clamp cylinder so as to urge the annular indexer piston rod and, therefore, the load clamp in an upstream longitudinal direction. The controller can then repeat the steps of closing the load clamp about the continuous stock material, advancing the load clamp in the downstream longitudinal direction, opening the load clamp and returning the load clamp to the predetermined initial or rest position for as many cycles as required in order to feed the leading end of the continuous stock material 12 through the forming apparatus 10.

Although the forming method and apparatus 10 of one embodiment of the present invention has been described above in considerable detail, it should be apparent to those skilled in the art that various modifications can be made to the forming method and apparatus without departing from the spirit and scope of the present invention. For example, one alternative embodiment of the forming method and apparatus of the present invention is illustrated in FIG. 40. As shown in FIG. 40 and described hereinafter, the turning head 45 of the forming apparatus of this embodiment is no longer disposed between the hex forge 50 and the blade press forge 204. Instead, the turning head is disposed downstream of the forging, trimming and sawing operations such that the turning head can machine the ball groove 110 and chamfered edge 112 in an extremely precise manner with respect to one end, typically the rear end, of the resulting part. Although the turning head is disposed downstream of the forging, trimming and sawing operations, the forming apparatus of this embodiment preferably includes a clamp 330 disposed between the hex forge and the blade press forge so as to clamp a fixed portion of the continuous stock material 12 during the forging and trimming operations. Thus, the fixed clamp functions in a similar fashion to the turning head clamp 44 of the embodiment described hereinabove.

For a forming apparatus 10 adapted to fabricate parts of a predetermined length, the initial or rest position of the blade press forge 204 can be fixed and need not be adjusted to compensate for the longitudinal growth of the continuous stock material 12 created during the hex forging operations. Instead, the separation between the respective initial or rest positions of the hex forge 50 and the blade press forge 204 can be determined based upon the length of the resulting part, the stroke of the indexer 14 and the anticipated longitudinal growth of the continuous stock material in a downstream longitudinal direction during the hex forging operations. Preferably, the separation between the hex forge and the blade press forge is minimized in order to further improve the quality and tolerance control of the resulting parts. For example, the hex forge and the blade press forge of one advantageous embodiment are separated by about 24 inches.

As described above, the predetermined initial or rest position of the blade press forge 204 of the embodiment of the forming method and apparatus 10 shown in FIG. 40 need not be adjusted to compensate for variations in the growth of the continuous stock material 12 in the downstream longitudinal direction which were created during the hex forging operations, such as by detecting a registration feature 104 and adjusting the position of the blade press forge relative to the detected registration feature. If desired, however, the continuous stock material can include a plurality of registration features spaced longitudinally along its length which can be detected by the blade press forge in the manner described above. Thus, the forming apparatus of the embodiment shown in FIG. 40 can include a blade press forge which is adapted to detect registration features during the intermittent advance of the continuous stock material and to adjust its position relative to the most recently detected registration feature prior to blade press forging operations.

For example, the forming method and apparatus 10 of the embodiment illustrated in FIG. 40 can include an ink jet printer for printing a predetermined registration feature 104, such as a line, on the continuous stock material at predetermined longitudinally spaced intervals. Accordingly, the blade press forge 204 of this embodiment can include a registration monitor 242 for detecting the printed registration feature such that the relative position of the blade press forge can be thereafter adjusted relative to the detected registration feature in a similar manner to that described above.

Although one advantageous set of trimming and sawing operations has been described above, the forming method and apparatus 10 of the present invention can include a variety of trimming operations without departing from the spirit and scope of the present invention. For example, the forming method and apparatus of the embodiment of FIG. 40 includes a hole punch station 332, downstream of the blade press forge 204, for punching a hole 454 through the resulting part. Preferably, the hole punch station punches the hole in a predetermined portion of the resulting part, such as a predetermined portion of the central segment of a spade bit fabricated according the forming method and apparatus of the present invention.

Downstream of the hole punch station 332, the forming method and apparatus 10 of the embodiment shown in FIG. 40 can also include a left side trimming station 334 and a right side trimming station 336 for trimming the left and right sides of the resulting part, respectively. For example, for a forming method and apparatus adapted to fabricate spade bits, the left and right side trimming stations can trim the left and right sides, respectively, of the blade portion of the spade bit, including the left and right sides, respectively, of the spur. Thus, upon the completion of the final trimming operation, such as the right side trimming operation in the illustrated embodiment, the resulting part will be separated from the preceding or downstream part and the leading end of the part, such as the spur, will be completely trimmed.

As described above, the left and right side trimming stations 332 and 334 preferably include respective registration monitors, such as photosensors, for detecting the hole punched in the part. The left and right side trimming stations also preferably include means, such as a hydraulic cylinder assembly or an AC servomotor and an associated ballscrew, for moving the respective stations in a longitudinal direction relative to the detected hole such that the left and right side trimming stations are precisely aligned with the portion of the part to be trimmed. As also described above, the hole punch station 332, the left side trimming station and the right side trimming station can all be operating on different ones of the plurality of parts at the same time.

Downstream of the right side trimming station 336, the forming method and apparatus 10 of the embodiment of FIG. 40 can include a turntable 337 which includes means, such as a clamp, for gripping a portion of the resulting part, such as the blade portion of a resulting spade bit following the trimming operations. As shown in FIG. 40, the turntable can thereafter be rotated, such as in a counterclockwise direction, such that the part is transported, in turn, to a saw station 160, a turning head 45 and a palletizer 338. According to one advantageous embodiment, the turntable can be disposed in a substantially vertical direction and is adapted to rotate about a substantially horizontal axis so as to transport the part to the various processing stations.

In the exemplary embodiment in which the forming method and apparatus 10 is adapted to fabricate a spade bit, the saw station 160 can cut the spade bit to the desired length. Thereafter, the turning head 45 can form the ball groove 110 and chamfered edge 112 in the hexagonally shaped rear portion of the shank of the spade bit. Since the saw station has already cut the resulting spade bit to size, however, the turning head can precisely position the ball groove and the chamfered edge with respect to the rear end of the spade bit.

Following the formation of the ball groove 110 and chamfered edge 112, the resulting part can be released by the turntable 337 and gripped by a palletizer 338, such as a robotic palletizer which includes a clamp for gripping the resulting part. The palletizer can appropriately load the resulting part in a heat treating fixture 308 for subsequent heat treating. For example, the palletizer can place the resulting part in a predetermined position upon a stacked wire grid within a heat treating fixture such that the resulting part can be subjected to a batch heat treating operation. Alternatively, the resulting parts can undergo an in-line heat treating process. Thereafter, the heat treated parts can undergo finishing and packaging operations as described above and as shown schematically in blocks 310 and 312.

For embodiments of the forming method and apparatus 10 which are adapted to fabricate spade bits, it has been observed that the blade forging operation requires a significantly longer time to complete than the other operations which are performed. Thus, even though the above-described forming method and apparatus is particularly well suited for processing a continuous stock material 12, it is contemplated that the forming method and apparatus of one embodiment could include a plurality of blade press forges 204. As shown in FIG. 41 and described hereinbelow, the plurality of blade press forges can operate in parallel in order to increase the throughput of the resulting forming apparatus. Alternatively, the plurality of blade press forges can be disposed in series such that different ones of the forges operate on different ones of the parts.

Therefore, as shown schematically in FIG. 41, the saw station 160 of the forming apparatus 10 of this embodiment can be disposed downstream of the hex forge 50 so as to separate the continuous stock material 12 into a number of discrete, partially formed parts. The forming apparatus of this embodiment can also include a plurality of transfer mechanisms 340 which engage respective ones of the discrete parts and which transfer the respective parts to corresponding blade press forges 204. For example, the transfer mechanism can include a clamp for engaging a predetermined portion of the partially formed part. Thereafter, the transfer mechanism can either transport the respective part to the corresponding blade press forge or, alternatively, the respective blade press forge can be moved into engagement with the respective part. Since the transfer mechanism has already engaged a predetermined portion of the respective part, such as the connector 200 which extends between adjacent parts, the transfer mechanism can serve as the downstream blade press clamp during the ensuing blade forging operations. Thereafter, the forged parts can be trimmed and processed as described above. For example, the forged parts can be trimmed and processed by a single trimming and processing line, disposed downstream at the plurality of blade press forges, as illustrated in FIG. 41. Alternatively, the forged parts can be trimmed and processed in parallel by separate trimming and processing lines without departing from the spirit and scope of this aspect of the present invention.

The die assemblies of the present invention can also be employed in another manner in order to also form a part of a predetermined shape. For example, a plurality of forging dies, such as the forging dies 316 illustrated in FIG. 37, can be inwardly biased with a predetermined bias force. As described above, the predetermined inward bias force $F_I$ can be applied by a die housing 318 which is urged at least partially over the die assembly, such as by a hydraulic cylinder assembly.

As also described above, the forming dies 316 define a cavity 320 which is open at both ends such that the workpiece can extend therethrough. According to this embodiment of the present invention, the forming apparatus 315 can include first and second clamps 322 disposed at opposite ends of the plurality of forming dies for clamping respective portions of the workpiece which extend beyond the respective ends of the plurality of forming dies. The forming apparatus of this embodiment can include various types of clamps, such as the clamps which include an annular collet 324 and a surrounding annular closure 326 as illustrated in FIG. 37 and as described above.

Thereafter, the forming apparatus 315 urges at least one of the clamps 322, such as by means of a hydraulic cylinder assembly, toward the other of the clamps with sufficient force F to overcome the predetermined inward bias force $F_I$ imposed upon the plurality of forming dies 316. As a result, the portion of the workpiece disposed within the cavity 320 defined by the plurality of forming dies is upset and expands outwardly, thereby forcing the plurality of forming dies to move outwardly so as to define a larger cavity. As used herein, the terms "upset" or "upsetting" are used generically to include both upsetting and gathering operations as known to those skilled in the art. In one advantageous embodiment, the forming apparatus and, more particularly, a controller is adapted to move both clamps towards each other with the same force in order to upset the portion is of the workpiece disposed within the cavity in a more symmetrical manner. As a result, the forming apparatus of this embodiment can produce parts having a diameter following the upsetting step which is significantly larger than the initial diameter of the workpiece by reducing the tendency of the workpiece to buckle during the upsetting step.

While the forming method and apparatus 10 of the present invention can be employed to manufacture a number of different types of parts, the forming method and apparatus of one advantageous embodiment fabricates a plurality of spade bits 410 from a continuous stock material 12. Thus, a spade bit which could be manufactured according to one advantageous embodiment of the present invention will be described in more detail hereinbelow.

As illustrated in FIGS. 4–6, a spade bit 410 of the present invention includes an elongate shank 412 defining a central longitudinal axis 414. The rear portion 416 of the shank is adapted to be received and held by a drill (not illustrated). For example, the elongate shank typically includes a cylindrical forward portion and a rear portion that is hexagonal in transverse cross-section so as to be securely received and held by the chuck of a drill (not illustrated).

The spade bit 410 also includes a blade portion 418 joined to a forward end of the elongate shank 412. The blade portion includes a pair of generally flat side segments 420 which extend laterally in opposite directions from the central longitudinal axis 414. The side segments preferably define respective lateral planes which are parallel to each other and the central longitudinal axis. According to this embodiment of the present invention, the blade portion also includes a generally flat central segment 424 disposed along the central longitudinal axis and defining a central plane. More particularly, the central segment includes opposite sides 428 which are parallel to the central longitudinal axis, a rear end which is continuous with the forward end of the shank and an opposite forward end. According to this embodiment, the pair of side segments or wings are continuous with the central segment along respective sides of the central segment. In particular, the pair of side segments are continuous with respective sides of the central segment such that lateral planes defined by the respective side segments intersect the central plane defined by the central segment at an oblique angle.

Each side segment 420 can also include a respective chamfered corner portion 435. Each chamfered corner portion includes a chamfered edge which extends both axially rearward and laterally outward from the respective forward cutting edge 434. In particular, the forward cutting edge of each side segment typically extends laterally outward from an inner portion to an outer portion. Accordingly, the chamfered edge of each chamfered corner portion preferably extends both axially rearward and laterally outward from the outer portion of the respective forward cutting edge.

By extending both axially rearward and laterally outward from the respective forward cutting edge 434, the chamfered corner portions 435 can repeatedly cut the peripheral wall of the resulting hole as the spade bit 410 of the present invention is rotatably advanced through the workpiece. Therefore, the spade bit of the present invention can efficiently produce high-quality holes having smooth peripheral walls and relatively clean entry and exit points.

The blade portion 418 also includes a spur 430 extending axially from the forward end of the blade portion to center and to guide the spade bit 410 during drilling operations. As best illustrated in FIG. 6, the spur of this embodiment is of a generally triangular shape and extends to a spur point on the central longitudinal axis 414. The spur also includes a pair of spur cutting edges 432 extending along opposite sides of the spur between the spur point and a base of the spur at the forward end of the blade portion. The spur cutting edges are positioned to initially contact the workpiece during rotation of the spade bit in the predetermined direction of rotation as indicated by the counterclockwise arrow in FIG. 4.

Each side segment 420 also includes a respective forward cutting edge. According to one advantageous embodiment, the respective forward cutting edges of each side segment are preferably axially offset. In other words, the spade bit of one advantageous embodiment includes an axially advanced forward cutting edge 434 and an axially rearward cutting edge 436. In particular, the respective forward cutting edges of the side segments are preferably axially offset by a predetermined axial amount D, such as between about 0.010 inch and about 0.012 inch in one advantageous embodiment. Typically, the axial offset of the respective forward cutting edges is ground into the forward cutting edges during grinding operations following the forming method and apparatus 10 described above. By being axially offset, the respective forward cutting edges contact and remove material in an efficient manner as the spade bit 410 rotates in a predetermined direction of rotation during drilling operations. In addition, since the forward cutting edges are axially offset, the spade bit of this advantageous embodiment of the present invention preferably has a relatively long life due to the efficient removal of material as a spade bit advances through a workpiece.

The alignment of the forward cutting edges of the side segments 420 along a centerline that passes through the central longitudinal axis 414 further improves the performance of the spade bit 410 by directing the removed chip swarf perpendicularly from the cutting edge and upwardly, and not radially outwardly. As a result, the chip swarf does not hinder subsequent rotation of the spade bit by binding between the spade bit and the sidewalls of the hole formed thereby. Accordingly, the longevity of the spade bit is increased by reducing the wear on the spade bit and the efficiency with which the spade bit drills a hole of a predetermined diameter is enhanced.

According to one advantageous embodiment, each spur cutting edge 432 preferably extends radially outward of at least an innermost portion of the forward cutting edge of the adjacent side segment 420. Thus, each spur cutting edge is radially separated from the forward cutting edge of the adjacent side segment. In addition, the spur 430 preferably defines a spur plane which is oblique to the respective lateral planes defined by the side segments such that each spur cutting edge is also preferably angularly offset from the forward cutting edge of the adjacent side segment in the predetermined direction of rotation of the spade bit 410 when viewed along the central longitudinal axis 414. In particular, each spur cutting edge is positioned angularly rearward of the forward cutting edge of the adjacent side segment in the predetermined direction of rotation. Thus, each spur cutting edge is also angularly separated from the forward cutting edge of the adjacent side segment. Further, at least a portion of each spur cutting edge extends axially rearward of the forward cutting edge of the adjacent side segment in the longitudinal direction so that each spur cutting edge is also axially separated from the forward cutting edge of the adjacent side segment.

A forward portion of each side segment preferably defines a cutting plane. The cutting plane intersects the lateral plane defined by the respective side segment 420 to define a hook angle therebetween. Preferably, the hook angle is between about 10° and about 20° and, more preferably, is about 15°. The forward cutting edges of the illustrated embodiment are disposed angularly in advance of the lateral planes of the respective side segments in the predetermined direction of rotation of the spade bit 410 when viewed along the central longitudinal axis 414. Chips removed from the workpiece by the forward cutting edge are thereby directed upwardly or rearwardly along the spade bit and away from the cutting surface by further rotation of the spade bit, and, in part, by the hook angle defined between the cutting plane and the lateral plane.

Further, each side segment 420 of the spade bit 410 can also include a forward end having a forward end surface 442 extending between the respective forward cutting edge and a rear edge 444. Advantageously, the forward end surface slopes rearwardly from the forward cutting edge to the rear edge such that only the forward cutting edge contacts the cutting surface during drilling operations. Thus, the drag or other frictional forces generated between the rotating spade bit and the workpiece are reduced and the efficiency with which the spade bit of the present invention drills is further improved.

Each forward end surface preferably includes first and second forward end planes which intersect a plane perpendicular to the central longitudinal axis 414 to define primary and secondary lip clearance angles, respectively, therebetween. The secondary lip clearance angle is typically larger than the primary lip clearance angle in order to further reduce drag or other frictional forces generated between the rotating spade bit and the workpiece. For example, in one embodiment, the primary and secondary lip clearance angles are about 5° and 8°, respectively. However, the primary and secondary lip clearance angles can be varied without departing from the spirit and scope of the present invention. In addition, the forward end surface need not include both first and second forward end planes as illustrated, but can, instead, include a single forward end plane without departing from the spirit and scope of the present invention.

Still further, each side segment 420 of the illustrated embodiment of the spade bit 410 of the present invention includes a first side joined to the central segment 424 along a side 428 thereof, and an opposed second side 452 defining a second or outer side surface. The second or outer side surface extends between respective forward and rear edges and preferably follows the arc of a circle in lateral cross-section to further reduce the drag or other frictional forces generated by the rotation of the spade bit within the hole. Alternatively, the side surface can taper radially inwardly from the forward edge to the rear edge such that only the forward edge of the side surface of the side segment contacts the sidewalls of the hole to thereby further reduce binding of the spade bit.

The second sides 452 of the respective side segments 420 also preferably taper inwardly in an axial direction from the forward end to the rear end of the blade portion 418. Thus, a side surface taper angle, typically, about one-half of 1°, or ½°, is defined between the side surface plane and a line parallel to the central longitudinal axis 414. By tapering the second sides of the side segments inwardly, the side surfaces preferably only contact the workpiece near the cutting surface such that drag or other frictional forces are still further reduced.

While one particularly advantageous spade bit 410 is illustrated in FIGS. 4–6 and described herein, the spade bit can have many other configurations without departing from the spirit and scope of the present invention. In this regard, copending U.S. patent application Ser. No. 08/366,986 and copending U.S. patent application Ser. No. 08/514,071, the contents of both of which are expressly incorporated by reference herein, describe several other embodiments of a spade bit which could also be fabricated by the forming method and apparatus 10 of the present invention.

Regardless of the type of part, the forming method and apparatus 10 of the present invention provides numerous advantages over conventional fabrication processes. In particular, by processing the plurality of parts while still joined by the continuous stock material 12, the amount of handling and transporting of discrete parts is significantly reduced. In addition, the forming method and apparatus of the present invention is able to maintain a precise alignment between the partially formed parts and the various stations of the forming apparatus so as to produce high quality parts having sharply defined features, such as, for example, the above-described radial, angular and longitudinal separation of the spur cutting edge 432 from the forward cutting edges 434 and 435 of the respective side segments 420 of the blade portion 418 of the spade bit 410 of the present invention. By altering the stroke of the indexer 14, parts of various lengths can be produced from the same continuous metal stock, such as spade bits having an elongate shank of various lengths. Moreover, since the forming method and apparatus of the present invention performs several operations at the same time, albeit on different parts at different positions along the fabrication line, the forming method and apparatus can efficiently form a plurality of parts of a predetermined shape.

In the drawings and the specification, there has been set forth a preferred embodiment of the invention and, although specific terms are employed, the terms are used in a generic and descriptive sense only and not for purpose of limitation, the scope of the invention being set forth in the following claims.

That which is claimed is:

1. A method of forming a plurality of parts from a continuous stock material, the method comprising the steps of:

intermittently advancing the continuous stock material along a predetermined path such that the stock material advances longitudinally in a downstream direction;

clamping a fixed portion of the continuous stock material following at least one of said advancing steps so as to securely hold the fixed portion of the continuous stock material;

forming a portion of the continuous stock material into a first predetermined shape during said clamping step while the fixed portion of the continuous stock material is clamped, wherein the fixed portion of the continuous stock material is disposed in a predetermined longitudinal direction from the formed portion of the continuous stock material, and wherein said forming step comprises the step of causing longitudinal growth of the continuous stock material; and at least partially compensating for the longitudinal growth of the continuous stock material caused during said forming step by allowing movement of the continuous stock material in a longitudinal direction away from the formed portion of the continuous stock material and opposite the predetermined longitudinal direction.

2. A forming method according to claim 1 wherein said forming step includes a step of at least partially closing a plurality of dies about the continuous stock material, wherein the plurality of closed dies define a cavity of a predetermined shape which defines the shape of at least a portion of the resulting part, and wherein the plurality of at least partially closed dies define entry and exit ports through which the continuous stock material extends during said forming step.

3. A forming method according to claim 2 wherein said step of at least partially closing the plurality of dies comprises the step of inserting the plurality of dies into an internal cavity defined by a die housing which circumferentially encompasses the plurality of dies.

4. A forming method according to claim 3 further comprising the steps of:

at least partially withdrawing the plurality of dies from the internal cavity defined by the die housing following said forming step; and rotating the die housing relative to the plurality of at least partially withdrawn dies prior to reinserting the plurality of dies within the internal cavity defined by the die housing during a subsequent forming step.

5. A forming method according to claim 2 wherein the plurality of dies are mounted on a carriage which is adapted to move longitudinally, and wherein the forming method further comprises the step of additionally compensating for the longitudinal growth of the continuous material by mounting the carriage such that the longitudinal growth of the continuous stock material between the formed portion of the continuous stock material and the fixed portion of the continuous stock material causes the carriage to move in a longitudinal direction opposite the predetermined longitudinal direction such that the plurality of dies remain at least partially closed about the same portion of the stock material during said forming step.

6. A forming method according to claim 5 further comprising the step of longitudinally biasing the carriage on which the plurality of dies are mounted with a predetermined longitudinal bias force so as to retard longitudinal movement of the carriage.

7. A forming method according to claim 6 wherein said longitudinal biasing step comprises the step of altering the longitudinal bias force applied to the carriage according to a predetermined schedule.

8. A forming method according to claim 2 further comprising the steps of:

opening the plurality of dies after forming a portion of the stock material;

releasing the clamped portion of the stock material such that the continuous stock material can be advanced along the predetermined path; and repeating the steps of the method to form at least a portion of another part.

9. A forming method according to claim 1 further comprising the steps of:

monitoring the longitudinal growth of the continuous stock material; and terminating said forming step once the longitudinal growth of the continuous stock material is at least as great as a predetermined longitudinal growth threshold.

10. A forming method according to claim 1 further comprising the steps of:

forming another portion of the continuous stock material into a second predetermined shape while the fixed portion of the continuous stock material is clamped;

releasing the fixed portion of the continuous stock material following both said forming steps such that the continuous stock material can be advanced along the predetermined path; and repeating the steps of the method such that the resulting parts have both the first and second predetermined shapes imparted by said forming steps.

11. A forming method according to claim 1 further comprising the steps of:

trimming predetermined portions of each part following said forming step; and cutting each part from the continuous stock material following said forming and trimming steps to thereby separate the continuous stock material into a plurality of discrete parts.

12. A forming method according to claim 1 further comprising the steps of:

forming a registration feature in a predetermined portion of each part during said clamping step; and trimming predetermined portions of each part following said forming steps, wherein said trimming step comprises trimming predetermined portions of each part which are disposed in a predetermined positional relationship to the registration feature.

13. A forming method according to claim 12 wherein said step of forming a registration feature comprises the step of punching a hole in a predetermined portion of each part, and wherein the forming method further comprises the step of identifying the relative position of the hole prior to said trimming step such that those portions of each part which are disposed in the predetermined positional relationship to the hole are trimmed.

14. A forming method according to claim 1 wherein the plurality of parts comprise a plurality of spade-type boring bits, and wherein said forming step comprises a step of forming a portion of the continuous stock material into a blade portion of the respective spade-type boring bit.

15. A method of forming a plurality of parts from a continuous stock material which includes a plurality of longitudinally spaced apart registration features, the method comprising the steps of:

intermittently advancing the continuous stock material along a predetermined path such that the stock material advances longitudinally in a downstream direction;

forming a portion of the continuous stock material into a predetermined shape following at least one advancing step, wherein said forming step comprises the step of selecting the portion of the continuous stock material which is formed such that the formed portion is longitudinally spaced from a registration feature by a predetermined distance; and at least partially compensating for longitudinal growth of the continuous stock material created during said forming step by allowing longitudinal movement of the continuous stock material.

16. A forming method according to claim 15 further comprising a step of identifying a registration feature during said at least one advancing step and prior to said forming step.

17. A forming method according to claim 15 further comprising the step of clamping a portion of the continuous stock material, following said at least one advancing step and prior to said forming step, so as to hold a fixed portion of the continuous stock material, wherein said clamping step comprises the step of selecting the fixed portion of the continuous stock material such that the fixed portion is longitudinally spaced from the registration feature by a predetermined distance, and wherein the fixed portion of the continuous stock material is disposed in a predetermined longitudinal direction from the formed portion of the continuous stock material.

18. A forming method according to claim 17 wherein said forming step includes a step of at least partially closing a plurality of dies about the continuous stock material, wherein the plurality of closed dies define a cavity of a predetermined shape which defines the shape of at least a portion of the resulting part, and wherein the plurality of at least partially closed dies define entry and exit ports through which the continuous stock material extends during said forming step.

19. A forming method according to claim 17 wherein the plurality of dies are mounted on a carriage which is adapted to move longitudinally, and wherein the forming method further comprises the step of additionally compensating for the longitudinal growth of the continuous material by mounting the carriage such that the longitudinal growth of the continuous stock material between the formed portion of the continuous stock material and the fixed portion of the continuous stock material causes the carriage to move in a longitudinal direction opposite the predetermined longitudinal direction such that the plurality of dies remain at least partially closed about the same portion of the stock material during said forming step.

20. A forming method according to claim 17 further comprising the step of longitudinally biasing the carriage on which the plurality of dies are mounted with a predetermined longitudinal bias force so as to retard longitudinal movement of the carriage.

21. A forming method according to claim 20 wherein said longitudinal biasing step comprises the step of altering the longitudinal bias force applied to the carriage according to a predetermined schedule.

22. A forming method according to claim 17 further comprising the steps of:

opening the plurality of dies after forming a portion of the stock material;

releasing the clamped portion of the stock material such that the continuous stock material can be advanced along the predetermined path; and repeating the steps of the method to form at least a portion of another part.

23. A forming method according to claim 17 further comprising the steps of:

forming another portion of the continuous stock material into a second predetermined shape while the fixed portion of the continuous stock material is clamped;

releasing the fixed portion of the continuous stock material following both said forming steps such that the continuous stock material can be advanced along the predetermined path; and repeating the steps of the method such that the resulting parts have both the first and second predetermined shapes imparted by said forming steps.

24. A forming method according to claim 15 further comprising the steps of:

monitoring the longitudinal growth of the continuous stock material; and terminating said forming step once the longitudinal growth of the continuous stock material is at least as great as a predetermined longitudinal growth threshold.

25. A forming method according to claim 15 further comprising the step of trimming predetermined portions of each part following said forming step, wherein said trimming step comprises the step of selecting the predetermined portions of each part to trim such that those portions which are trimmed are longitudinally spaced from the registration feature by a predetermined distance.

26. A forming method according to claim 15 further comprising the step of cutting each part from the continuous stock material following said forming step to thereby separate the continuous stock material into a plurality of discrete parts, wherein said cutting step comprises the step of selecting the portion of the continuous stock material to be cut such that the portion of the continuous stock material which is cut is longitudinally spaced from the registration feature by a predetermined distance.

27. A forming method according to claim 15 wherein the plurality of parts comprise a plurality of spade-type boring bits, and wherein said forming step comprises a step of forming a portion of the continuous stock material which is longitudinally spaced from a registration feature by a predetermined distance into a blade portion of the respective spade-type boring bit.

28. A part manufactured from a continuous stock material according to the forming method of claim 15.

29. A part according to claim 28 wherein the part is a spade-type boring bit having a lengthwise extending shank and a blade portion extending from one end of said shank.

30. An apparatus for forging a plurality of parts from a continuous stock material, the apparatus comprising:

an indexer which intermittently advances the continuous stock material along a predetermined path such that the stock material advances longitudinally in a downstream direction through the forging apparatus;

a clamp which clamps and securely holds a fixed portion of the continuous stock material following at least one intermittent advance of the continuous stock material; and a forge which forges a portion of the continuous stock material into a first predetermined shape while the fixed portion of the continuous stock material is clamped, wherein the fixed portion of the continuous stock material is disposed in a predetermined longitudinal direction from the forged portion of the continuous stock material, wherein the forging apparatus at least partially compensates for longitudinal growth of the continuous stock material created by said forge by allowing movement of the continuous stock material in a longitudinal direction away from said forge and opposite the predetermined longitudinal direction.

31. A forging apparatus according to claim 30 wherein said forge comprises:
   a plurality of dies disposed about the continuous stock material; and
   means for at least partially closing said plurality of dies about the continuous stock material,
   wherein said plurality of dies define a cavity of a predetermined shape which defines the shape of at least a portion of the resulting part, and wherein said plurality of dies define entry and exit ports through which the continuous stock material extends.

32. A forging apparatus according to claim 31 wherein said forge further comprises a carriage on which said plurality of dies are mounted, and wherein said carriage is mounted so that the longitudinal growth of the continuous stock material between the forged portion of the continuous stock material and the fixed portion of the continuous stock material causes said carriage to move in a longitudinal direction opposite the predetermined longitudinal direction such that said plurality of dies remain at least partially closed about the same portion of the stock material during forming of the continuous stock material.

33. A forging apparatus according to claim 32 wherein said forge further comprises biasing means for longitudinally biasing said carriage with a predetermined longitudinal bias force so as to retard longitudinal movement of said carriage.

34. A forging apparatus according to claim 30 wherein the continuous stock material includes a plurality of longitudinally spaced apart registration features, wherein the forging apparatus further comprises a sensor for identifying a registration feature on the continuous stock material, and wherein said forge further comprises positioning means, responsive to said sensor, for positioning said forge such that the forged portion of the continuous stock material is longitudinally spaced from the registration feature by a predetermined distance.

35. A forging apparatus according to claim 30 wherein the continuous stock material includes a plurality of longitudinally spaced apart registration features, wherein the forging apparatus further comprises a sensor for identifying a registration feature on the continuous stock material, and wherein said clamp further comprises positioning means, responsive to said sensor, for positioning said clamp such that the fixed portion of the continuous stock material which is clamped is longitudinally spaced from the registration feature by a predetermined distance.

36. A forging apparatus according to claim 30 wherein the continuous stock material includes a plurality of longitudinally spaced apart registration features, wherein the forging apparatus further comprises a trimming station, downstream of said forge, for trimming predetermined portions of each part, and wherein said trimming station comprises:
   a trimmer, downstream of said forge, for trimming predetermined portions of each part;
   a sensor for identifying a registration feature on the continuous stock material; and
   positioning means, responsive to said sensor, for positioning said trimmer such that the predetermined portions which are trimmed are longitudinally spaced from the registration feature by a predetermined distance.

37. A forging apparatus according to claim 36 further comprising means for forming a registration feature in a predetermined portion of each part.

38. A forging apparatus according to claim 37 wherein said means for forming a registration feature comprises a hole punch for punching a hole through a predetermined portion of each part, and wherein said sensor identifies the hole punched in each part.

39. A forging apparatus according to claim 36 wherein said trimmer separates each part from a preceding part by trimming the predetermined portions of the part, and wherein the forging apparatus further comprises:
   a saw station for cutting each part to size; and
   a turntable assembly, downstream of said trimming station, for engaging each part following trimming of predetermined portions of each part by said trimmer and for rotatably advancing each part from said trimming station to said saw station.

40. A forging apparatus according to claim 30 wherein the continuous stock material includes a plurality of longitudinally spaced apart registration features, wherein the forging apparatus further comprises a saw station, downstream of said forge, for cutting each part from the continuous stock material to thereby separate the continuous stock material into a plurality of discrete parts, and wherein said saw station comprises:
   a cutter, downstream of said forge, for cutting each part from the continuous stock material;
   a sensor for identifying a registration feature on the continuous stock material; and
   positioning means, responsive to said sensor, for positioning said cutter such that the portion of the continuous stock material which is cut is longitudinally spaced from the registration feature by a predetermined distance.

41. A forging apparatus according to claim 30 further comprising a second forge, longitudinally spaced from said first forge, which forges another portion of the continuous stock material into a second predetermined shape while the fixed portion of the continuous stock material is clamped such that the resulting parts have both the first and second predetermined shapes imparted by said first and second forges, respectively.

42. An apparatus according to claim 30 further comprising:
   a longitudinal growth monitor for monitoring the longitudinal growth of the continuous stock material during forging of the continuous stock material into the first predetermined shape; and
   a controller, responsive to said longitudinal growth monitor, for terminating forming operations once the longitudinal growth of the continuous stock material is at least as great as a predetermined longitudinal growth threshold.

43. An apparatus for forging a plurality of parts formed from a continuous stock material which includes a plurality of longitudinally spaced apart registration features, the forging apparatus comprising:
   an indexer which intermittently advances the continuous stock material along a predetermined path such that the stock material advances longitudinally in a downstream direction; and
   a forge station comprising:
      a forge, downstream of said indexer, which forges a portion of the continuous stock material into a first predetermined shape;

a sensor for identifying a registration feature on the continuous stock material; and positioning means, responsive to said sensor, for positioning said forge such that the forged portion is longitudinally spaced from the registration feature by a predetermined distance.

44. A forging apparatus according to claim 43 further comprising a trimming station comprising:

a trimmer, downstream of said forge, for trimming predetermined portions of each part;

a sensor for identifying a registration feature on the continuous stock material; and positioning means, responsive to said sensor of said trimming station, for positioning said trimmer such that the predetermined portions which are trimmed are longitudinally spaced from the registration feature by a predetermined distance.

45. A forging apparatus according to claim 43 further comprising a saw station comprising:

a cutter, downstream of said forge, for cutting each part from the continuous stock material to thereby separate the continuous stock material into a plurality of discrete parts;

a sensor for identifying a registration feature on the continuous stock material; and positioning means, responsive to said sensor of said saw station, for positioning said cutter such that the portion of the continuous stock material which is cut is longitudinally spaced from the registration feature by a predetermined distance.

46. A forging apparatus according to claim 43 further comprising a second forge, longitudinally spaced from said first forge, which forges another portion of the continuous stock material into a second predetermined shape such that the resulting parts have both the first and second predetermined shapes imparted by said first and second forges, respectively.

47. An apparatus for trimming a plurality of parts formed from a continuous stock material which includes a plurality of longitudinally spaced apart registration features, the trimming apparatus comprising:

an indexer which intermittently advances the continuous stock material along a predetermined path such that the stock material advances longitudinally in a downstream direction; and a trimming station comprising:
a trimmer, downstream of said indexer, for trimming predetermined portions of each part;
a sensor for identifying a registration feature on the continuous stock material; and
positioning means, responsive to said sensor, for positioning said trimmer such that the predetermined portions which are trimmed are longitudinally spaced from the registration feature by a predetermined distance.

48. A trimming apparatus according to claim 47 further comprising means for forming a registration feature in a predetermined portion of each part.

49. A trimming apparatus according to claim 48 wherein said means for forming a registration feature comprises a hole punch for punching a hole through a predetermined portion of each part, and wherein said sensor identifies the hole punched in each part.

50. An apparatus for separating a plurality of parts formed from a continuous stock material which includes a plurality of longitudinally spaced apart registration features, the apparatus comprising:

an indexer which intermittently advances the continuous stock material along a predetermined path such that the stock material advances longitudinally in a downstream direction; and a saw station comprising:
a cutter, downstream of said indexer, for cutting each part from the continuous stock material to thereby separate the continuous stock material into a plurality of discrete parts;
a sensor for identifying a registration feature on the continuous stock material; and
positioning means, responsive to said sensor, for positioning said cutter such that the portion of the continuous stock material which is cut is longitudinally spaced from the registration feature by a predetermined distance.

51. An apparatus for forging a plurality of parts from a continuous stock material, the apparatus comprising:

indexing means for intermittently advancing the continuous stock material along a predetermined path such that the stock material advances longitudinally in a downstream direction through the forging apparatus;

clamping means for clamping a portion of the continuous stock material, following at least one intermittent advance of the continuous stock material, so as to hold the clamped portion of the continuous stock material at a fixed location;

forging means for forging a portion of the continuous stock material while the continuous stock material is clamped and held at the fixed location, wherein the fixed location established by said clamping means is disposed in a predetermined longitudinal direction from the forged portion of the continuous stock material; and compensating means for at least partially compensating for longitudinal growth of the continuous stock material created by said forging means by allowing movement of the continuous stock material in a longitudinal direction away from said forging means and opposite the predetermined longitudinal direction.

52. A forging apparatus according to claim 51 wherein said forging means comprises:

a plurality of dies disposed about the continuous stock material; and means for at least partially closing said plurality of dies about the continuous stock material, wherein said plurality of dies define a cavity of a predetermined shape which defines the shape of at least a portion of the resulting part and wherein said plurality of dies define entry and exit ports through which the continuous stock material extends.

53. A forging apparatus according to claim 52 wherein said forging means further comprises a carriage on which said plurality of dies are mounted, and wherein said carriage is mounted so that the longitudinal growth of the continuous stock material between the forged portion of the continuous stock material and the fixed portion of the continuous stock material causes said carriage to move in a longitudinal direction opposite the predetermined longitudinal direction such that said plurality of dies remain at least partially closed about the same portion of the stock material during forging of the continuous material.

54. A forging apparatus according to claim 53 wherein said forging means further comprises biasing means for longitudinally biasing said carriage with a predetermined bias force so as to retard longitudinal movement of said carriage.

55. A forging apparatus according to claim 51 wherein the continuous stock material includes a plurality of longitudinally spaced apart registration features, wherein the forging apparatus further comprises sensing means for identifying a registration feature on the continuous stock material, and wherein said forging means further comprises positioning means, responsive to said sensing means, for positioning said forging means such that the forged portion of the continuous stock material is longitudinally spaced from the registration feature by a predetermined distance.

56. A forging apparatus according to claim 51 wherein the continuous stock material includes a plurality of longitudinally spaced apart registration features, wherein the forging apparatus further comprises sensing means for identifying a registration feature on the continuous stock material, and wherein said clamping means further comprises positioning means, responsive to said sensing means, for positioning said clamping means such that the fixed portion of the continuous stock material which is clamped is longitudinally spaced from the registration feature by a predetermined distance.

57. A forging apparatus according to claim 51 wherein the continuous stock material includes a plurality of longitudinally spaced apart registration features, wherein the forging apparatus further comprises trimming means, downstream of said forging means, for trimming predetermined portions of each part, and wherein said trimming means comprises:

sensing means for identifying a registration feature on the continuous stock material; and positioning means, responsive to said sensing means, for positioning said trimming means such that the predetermined portions which are trimmed are longitudinally spaced from the registration feature by a predetermined distance.

58. A forging apparatus according to claim 57 further comprising means, upstream of said trimming means, for forming a registration feature in a predetermined portion of each part.

59. A forging apparatus according to claim 58 wherein said means for forming a registration feature comprises means for punching a hole through a predetermined portion of each part, and wherein said sensing means of said trimming means identifies the hole punched in each part.

60. A forging apparatus according to claim 57 wherein said trimming means separates each part from a preceding part by trimming the predetermined portions of the part, and wherein the forging apparatus further comprises:

cutting means for cutting each part to size; and a turntable assembly, downstream of said trimming means, for engaging each part following trimming of predetermined portions of each part by said trimming means and for rotatably advancing each part to said cutting means.

61. A forging apparatus according to claim 51 wherein the continuous stock material includes a plurality of longitudinally spaced apart registration features, wherein the forging apparatus further comprises cutting means, downstream of said forging means, for cutting each part from the continuous stock material to thereby separate the continuous stock material into a plurality of discrete parts, and wherein said cutting means further comprises:

sensing means for identifying a registration feature on the continuous stock material; and positioning means, responsive to said sensing means, for positioning said cutting means such that the portion of the continuous stock material which is cut is longitudinally spaced from the registration feature by a predetermined distance.

62. A forging apparatus according to claim 51 further comprising second forging means, longitudinally spaced from said first forging means, which forges another portion of the continuous stock material into a second predetermined shape while the fixed portion of the continuous stock material is clamped such that the resulting parts have both the first and second predetermined shapes imparted by said first and second forging means, respectively.

63. A forging apparatus according to claim 51 further comprising:

longitudinal growth monitoring means for monitoring the longitudinal growth of the continuous stock material during forging of the continuous stock material; and controlling means, responsive to said longitudinal growth monitoring means, for terminating forging operations once the longitudinal growth of the continuous stock material is at least as great as a predetermined longitudinal growth threshold.

64. An apparatus for forging a plurality of parts from a continuous stock material, the forging apparatus comprising:

an indexer for intermittently advancing the continuous stock material along a predetermined path such that the stock material advances longitudinally in a downstream direction through the forging apparatus;

a first forge which forges a portion of the continuous stock material into a first predetermined shape following at least one intermittent advance of the continuous stock material, wherein said first forge creates longitudinal growth of the continuous stock material while forging the portion of the continuous stock material into the first predetermined shape; and a second forge, downstream of said first forge, which forges another portion of the continuous stock material into a second predetermined shape following the at least one intermittent advance of the continuous stock material such that the resulting parts have both the first and second predetermined shapes imparted by said first and second forges, respectively, wherein said second forge also creates longitudinal growth of the continuous stock material while forging the other portion of the continuous stock material into the second predetermined shape, wherein the forging apparatus at least partially compensates for longitudinal growth of the continuous stock material created by said first and second forges by allowing movement of the continuous stock material in a longitudinal direction away from the respective forge.

65. A forging apparatus according to claim 64 further comprising a clamp, disposed between said first and second forges, for clamping a portion of the continuous stock material, following the at least one intermittent advance of the continuous stock material, so as to hold the clamped portion of the continuous stock material at a fixed location while said first and second forges forge respective portions of the continuous stock material into the first and second predetermined shapes, respectively.

66. A forging apparatus according to claim 64 further comprising a trimming station, downstream of said second forge, for trimming predetermined portions of each part.

67. A forging apparatus according to claim 66 wherein the continuous stock material includes a plurality of longitudinally spaced apart registration features, and wherein said trimming station comprises:

a trimmer, downstream of said second forge, for trimming predetermined portions of each part;

a sensor for identifying a registration feature on the continuous stock material; and positioning means, responsive to said sensor, for positioning said trimmer such that the edge portions which are trimmed are longitudinally spaced from the registration feature by a predetermined distance.

68. A forging apparatus according to claim 67 further comprising means for forming a registration feature in a predetermined portion of each part.

69. A forging apparatus according to claim 68 wherein said means for forming a registration feature comprises a hole punch for punching a hole through a predetermined portion of each part, and wherein said sensor of said trimming station identifies the hole punched in each part.

70. A forging apparatus according to claim 67 wherein said trimmer separates each part from a preceding part by trimming the predetermined portions of the part, and wherein the forging apparatus further comprises:

a saw station for cutting each part to size; and a turntable assembly, downstream of said trimming station, for engaging each part following trimming of predetermined portions of each part by said trimmer and for rotatably advancing each part from said trimming station to said saw station.

71. A forging apparatus according to claim 64 further comprising a saw station, downstream of said second forge, for cutting each part from the continuous stock material to thereby separate the continuous stock material into a plurality of discrete parts.

72. A forging apparatus according to claim 71 wherein the continuous stock material includes a plurality of longitudinally spaced apart registration features, and wherein said saw station comprises:

a cutter, downstream of said second forge, for cutting each part from the continuous stock material;

a sensor for identifying a registration feature on the continuous stock material; and positioning means, responsive to said sensor, for positioning said cutter such that the portion of the continuous stock material which is cut is longitudinally spaced from the registration feature by a predetermined distance.

73. An apparatus for forging a part of a predetermined shape from a workpiece, the forging apparatus comprising:

a plurality of forging dies which cooperate to define a cavity which defines at least a portion of the predetermined shape of the resulting part, wherein at least one forging die includes a contact surface which defines a portion of the cavity for contacting and shaping the workpiece into the predetermined shape of the resulting part; and a die housing defining an internal cavity for receiving and circumferentially encompassing said plurality of forging dies, wherein said plurality of forging dies are at least partially closed upon their insertion into said die housing such that said forging dies move inward in a predetermined direction, wherein the predetermined direction is oblique to the respective contact planes of said forging dies such that the respective contact surfaces impart both axial and radial forces to at least portions of the workpiece to generate compressive and shear forces within the workpiece and to form at least a portion of the part within the cavity defined between said plurality of forging dies, and wherein said circumferentially encompassing die housing reinforces said opposed forging dies against forces imparted upon insertion of said opposed dies in said die housing.

74. A forging apparatus according to claim 73 further comprising an alignment fixture for maintaining said plurality of forging dies in a predetermined aligned relationship while said forging dies are at least partially closed.

75. A forging apparatus according to claim 74 wherein said plurality of forging dies and said alignment fixture define a frustoconical die assembly, and wherein the internal cavity defined by said die housing is frustoconical in shape for receiving the complimentarily-shaped conical die assembly such that by inserting the die assembly into said die housing, said plurality of forging dies are at least partially closed.

76. A forging apparatus according to claim 73 wherein the contact plane of at least one forging die and a reference plane perpendicular to the predetermined direction of movement of said at least one forging die define an angle of between about 10° and about 20° therebetween.

77. A forging apparatus according to claim 73 wherein said plurality of forging dies define entry and exit ports through which a continuous stock material extends such that a plurality of parts of the predetermined shape can be forged.

78. A forging apparatus according to claim 77 further comprising an annular piston rod disposed at least partially within an annular cylinder housing which defines a lengthwise extending opening through which the continuous stock material extends, wherein said annular piston rod is maintained in operable contact with said die housing for urging said die housing about said plurality of forging dies.

79. A method of forging a part of a predetermined shape from a workpiece comprising the steps of:

at least partially closing a plurality of forging dies such that the forging dies move inward in a predetermined direction to contact the workpiece, wherein the plurality of forging dies cooperate to define a cavity therebetween which defines at least a portion of the predetermined shape of the resulting part;

applying axial and radial forces to the workpiece with the radially closing forging dies, wherein said applying step includes the step of generating compressive and shear stresses within the workpiece such that the workpiece deforms outwardly to the predetermined shape defined by the opposed forging dies; and structurally reinforcing the plurality of forging dies during the application of compressive and shear forces with a die housing which receives and circumferentially encompasses the plurality of forging dies during the forging process.

80. A method of forging a part of a predetermined shape according to claim 79 wherein said step of at least partially closing the plurality of forging dies includes a step of maintaining the plurality of forging dies in a predetermined aligned relationship while the forging dies are at least partially closed.

81. A method of forging a part of a predetermined shape according to claim 79 wherein said step of at least partially closing the plurality of forging dies includes a step of inserting the plurality of forging dies at least partially within the die housing.

82. An apparatus for forging a part of a predetermined shape from a workpiece, the forging apparatus comprising:

a plurality of forging dies which cooperate to define a cavity therebetween which defines at least a portion of the predetermined shape of the resulting part; and a die housing defining an internal cavity of a predetermined shape for receiving and circumferentially encompassing said plurality of forging dies, wherein said plurality of forging dies are at least partially closed from an open position to an operative position upon the insertion of said plurality of forging dies into said die housing, wherein each forging die includes an inner contact surface for contacting and shaping the workpiece and an opposed outer surface having a predetermined shape for operably contacting said die housing, wherein the predetermined shape of the outer surface of each forging die is different than the predetermined shape of the internal cavity of said die housing when said plurality of forging dies are in the open position, and wherein said forging dies rotate upon insertion into said die housing such that the predetermined shape of the outer surface of each forging die corresponds to the predetermined shape of the internal cavity of said die housing once said forging dies are in the operative position.

83. A forging apparatus according to claim 82 wherein said plurality of forging dies define entry and exit ports through which a continuous stock material extends such that a plurality of parts of the predetermined shape can be forged.

84. A forging apparatus according to claim 83 further comprising an annular piston rod disposed at least partially within an annular cylinder housing which defines a lengthwise extending opening through which the continuous stock material extends, wherein said annular piston is maintained in operable contact to said die housing for urging said die housing about said plurality of forging dies.

85. A method of forging a part of a predetermined shape from a workpiece comprising the steps of:

providing a plurality of forging dies which cooperate to define a cavity which defines at least a portion of the predetermined shape of the resulting part; and inserting the plurality of forging dies into an internal cavity of a predetermined shape defined by a die housing which circumferentially encompasses the plurality of forging dies, wherein said inserting step comprises the step of at least partially closing the plurality of forging dies from an open position to an operative position, wherein each forging die includes an inner contact surface for contacting and shaping the workpiece and an opposed outer surface having a predetermined shape for operably contacting the die housing, wherein the predetermined shape of the outer surface of each forging die is different than the predetermined shape of the internal cavity of the die housing when the plurality of forging dies are in the open position, and wherein said step of at least partially closing the plurality of forging dies comprises the step of rotating the forging dies upon insertion into the die housing such that the predetermined shape of the outer surface of each forging die corresponds to the predetermined shape of the internal cavity of the die housing once the forging dies are in the operative position.

86. A method of forging a part of a predetermined shape according to claim 85 wherein the workpiece is a continuous stock material, wherein the plurality of forging dies define entry and exit ports which open into the cavity defined by the forging dies, and wherein the method further comprises the step of extending the continuous stock material through the entry and exit ports and through the cavity defined by the plurality of forging dies such that a plurality of parts of the predetermined shape can be forged.

87. An apparatus for forming a part of a predetermined shape from a workpiece, the forming apparatus comprising:

a plurality of forming dies which cooperate to define a cavity which defines at least a portion of the predetermined shape of the resulting part, wherein the cavity defined by said plurality of forming dies is open at both ends such that the workpiece can extend therethrough;

means for inwardly biasing said plurality of forming dies;

first and second clamps disposed on opposite ends of said plurality of forming dies for clamping respective portions of the workpiece which extend beyond the respective uses of said plurality of forming dies; and means for urging at least one of said clamps toward the other of said clamps with sufficient force to overcome the inward biasing of said plurality of forming dies such that the portion of the workpiece disposed within the cavity defined by said plurality of forming dies is upset and expands outwardly, thereby forcing said plurality of forming dies to move outwardly so as to define a larger cavity.

88. A method of forming a part of a predetermined shape from a workpiece comprising the steps of:

providing a plurality of forming dies which cooperate to define a cavity which defines at least a portion of the predetermined shape of the resulting part, wherein the cavity defined by the plurality of forming dies is open at both ends;

extending the workpiece through the cavity defined by the plurality of forming dies such that portions of the workpiece extend beyond each end of plurality of forming dies;

clamping respective portions of the workpiece which extend beyond the respective ends of the plurality of forming dies;

inwardly biasing the plurality of forming dies; and upsetting the portion of the workpiece which is disposed within the cavity defined by the plurality of forming dies such that the workpiece expands outwardly, thereby forcing the plurality of forming dies to move outwardly so as to define a larger cavity, wherein said upsetting step comprises the step of urging one of the portions of the workpiece which is clamped toward the other of the portions of the workpiece which is clamped with sufficient force to overcome the inward biasing of the plurality of forming dies.

89. A method according to claim 88 wherein said urging step comprises a step of urging both of the portions of the workpiece which are clamped toward each other with the same force.

90. A spade-type boring bit comprising:

an elongate shank defining a central longitudinal axis; and a blade portion joined at a rear end to one end of said shank along the central longitudinal axis, said blade portion including:

a central segment being disposed along the central longitudinal axis and defining a central plane; and a pair of generally flat side segments which extend laterally in opposite directions from opposite sides of said central segment, said side segments defining respective lateral planes which are parallel to each other and the central longitudinal axis and which intersect the central plane at an oblique angle, said side segments including respective forward cutting edges which are axially offset relative to each other such that one of said forward cutting edges is axially rearward of the other one of said forward cutting edges; and a spur extending axially from a forward end of said blade portion opposite the rear end.

91. A spade-type boring bit according to claim 90 wherein said forward cutting edges are axially offset relative to each other by a predetermined axial offset of about 0.010 inch to about 0.012 inch.

92. A spade-type boring bit according to claim 90 wherein said respective forward cutting edges of said side segments are aligned with each other along a centerline which passes through the central longitudinal axis of said elongate shaft.

93. A spade-type boring bit according to claim 90 wherein said spur is of a generally triangular shape extending in the central plane to a spur point on the central longitudinal axis, said spur including a pair of spur cutting edges extending along opposite sides of said spur between the spur point and the forward end of said central segment such that each spur cutting edge extends radially outward of at least an innermost portion of the forward cutting edge of the adjacent side segment, and wherein each spur cutting edge is angularly offset from the forward cutting edge of the adjacent side segment in a predetermined direction of rotation of the spade-type boring bit when viewed along the central longitudinal axis, such that each spur cutting edge is both radially and angularly separated from the forward cutting edge of the adjacent side segment.

94. A spade-type boring bit according to claim 93 wherein at least a portion of each spur cutting edge extends axially rearward of the forward cutting edge of the adjacent side segment such that each spur cutting edge is axially separated from the forward cutting edge of the adjacent side segment.

95. A method of drilling a hole in a workpiece with a spade-type boring bit having an elongate shank defining a central longitudinal axis, a blade portion joined to one end of the elongate shank and a spur extending axially from the blade portion wherein the blade portion includes a central segment which defines a central plane and a pair of generally flat side segments which extend laterally in opposite directions from the central segment wherein the side segments define respective lateral planes which are parallel to each other and which define an oblique angle with the central plane, and wherein said side segments also include respective forward cutting edges which are axially offset relative to each other to thereby define an axially advanced forward cutting edge and an axially rearward forward cutting edge, the method comprising the steps of:

entering the workpiece with the spade-type drill bit such that the spur guides the spade-type drill bit into the workpiece;

rotating the spade-type drill bit in a predetermined direction to form a hole in the workpiece such that the spade-type drill bit longitudinally advances in a forward direction wherein said rotating step comprises the steps of engaging and removing portions of the workpiece with both the axially advanced forward cutting edge and the axially rearward forward cutting edge, thereby creating chip swarf; and directing the chip swarf created during said rotating step in a longitudinally rearward direction, opposite the forward direction in which the spade-type drill bit is advanced, such that the chip swarf is removed from the surface of the workpiece engaged by the spade-type drill bit.

\* \* \* \* \*

UNITED STATES PATENT AND TRADEMARK OFFICE
CERTIFICATE OF CORRECTION

PATENT NO. : 5,842,267

DATED : December 1, 1998

INVENTOR(S) : Biederman et al.

It is certified that error appears in the above-identified patent and that said Letters Patent is hereby corrected as shown below:

In the Drawings, Sheets 19 and 20 are reversed.

Column 10, line 15, after "38D," insert --38E,--.

On the title page, Item [56],
References Cited, U.S. PATENT DOCUMENTS, , column 2, line 28, "5,099,993" should read --5,099,933--; line 34, "5,229,441 7/1993" should read --5,299,441 4/1994--.

Signed and Sealed this

Eighth Day of June, 1999

*Attest:*

Q. TODD DICKINSON

*Attesting Officer*  Acting Commissioner of Patents and Trademarks